(12) United States Patent
Huber

(10) Patent No.: US 11,054,035 B2
(45) Date of Patent: Jul. 6, 2021

(54) PIPE CONNECTOR SYSTEMS, DEVICES AND METHODS

(71) Applicant: QuickHub, LLC, Tacoma, WA (US)

(72) Inventor: Donald Gene Huber, Tacoma, WA (US)

(73) Assignee: QuickHub, LLC, Tacoma, WA (US)

( * ) Notice: Subject to any disclaimer, the term of this patent is extended or adjusted under 35 U.S.C. 154(b) by 380 days.

(21) Appl. No.: 15/996,397

(22) Filed: Jun. 1, 2018

(65) Prior Publication Data

US 2018/0274698 A1    Sep. 27, 2018

Related U.S. Application Data

(63) Continuation-in-part of application No. 15/916,984, filed on Mar. 9, 2018, now Pat. No. 10,557,578,
(Continued)

(51) Int. Cl.
*F16J 15/10* (2006.01)
*F16J 15/02* (2006.01)
(Continued)

(52) U.S. Cl.
CPC .......... *F16J 15/104* (2013.01); *F16J 15/022* (2013.01); *F16L 21/002* (2013.01); *F16L 21/005* (2013.01); *F16L 21/06* (2013.01)

(58) Field of Classification Search
CPC ......... F16L 21/005; F16L 21/08; F16L 17/04; F16J 15/104; F16J 15/022; F16J 15/0881;
(Continued)

(56) References Cited

U.S. PATENT DOCUMENTS 2,517,290 A   8/1950   Moude et al.
2,752,174 A   6/1956   Frost
(Continued)

FOREIGN PATENT DOCUMENTS

CN   103299117 A    9/2013
WO   WO2012009236   1/2012

OTHER PUBLICATIONS

"Gill Ajit Singh Files Chinese Patent Application for Arcuate Snap Coupler," Global IP News, Pipe Patent News [New Delhi] Feb. 2, 2014.
(Continued)

*Primary Examiner* — Zachary T Dragicevich
(74) *Attorney, Agent, or Firm* — Knobbe, Martens, Olson & Bear, LLP

(57) ABSTRACT

Systems, devices and methods for pipe connectors and associated components are disclosed. Features for no hub clamps, for locking mechanisms on no hub clamps, for tools for no hub clamps, and for gaskets are described. The gaskets may be hourglass-shaped or otherwise taper outward near the ends to facilitate assembly onto pipe ends and that compress inward when a clamp is secured over the gasket. The gaskets may reduce in circumference at the gasket ends upon contraction of the gasket by a clamp onto two pipe ends. The gaskets may include collapsible sections that collapse upon contraction of the gasket by a clamp onto two pipe ends. The gaskets may include wedges at the collapsible regions that extend axially and protrude into the channel.

20 Claims, 43 Drawing Sheets

Related U.S. Application Data which is a continuation-in-part of application No. 15/077,082, filed on Mar. 22, 2016, now Pat. No. 10,100,956, which is a continuation-in-part of application No. 14/853,669, filed on Sep. 14, 2015, now Pat. No. 10,253,885.

(60) Provisional application No. 62/210,912, filed on Aug. 27, 2015, provisional application No. 62/137,682, filed on Mar. 24, 2015, provisional application No. 62/469,290, filed on Mar. 9, 2017, provisional application No. 62/540,403, filed on Aug. 2, 2017.

(51) Int. Cl.
*F16L 21/06* (2006.01)
*F16L 21/00* (2006.01)

(58) Field of Classification Search
CPC ...... F16J 15/0887; F16J 15/024; F16J 15/068; F16B 1/00; B25B 13/5091; B25B 13/48; B25B 13/065
USPC ............... 285/236, 369, 373, 420, 910, 918; 277/602, 607, 608, 611, 641, 642, 626, 277/332
See application file for complete search history.

(56) References Cited

U.S. PATENT DOCUMENTS

| | | | |
|---|---|---|---|
| 3,229,998 A | 1/1966 | Pennington |
| 3,441,294 A | 4/1969 | Krieg |
| 3,633,947 A | 1/1972 | Nelson |
| 3,682,503 A | 8/1972 | Bloom |
| 3,711,632 A | 1/1973 | Ghirardi |
| 3,748,697 A | 7/1973 | Hildebrandt et al. |
| 3,905,623 A | 9/1975 | Cassel |
| 4,056,273 A | 11/1977 | Cassel |
| 4,168,091 A | 9/1979 | Boomgarden et al. |
| 4,174,125 A | 11/1979 | Wyss |
| 4,183,120 A | 1/1980 | Thorne |
| 4,240,655 A | 12/1980 | Rascher et al. |
| 4,273,367 A | 6/1981 | Keeney et al. |
| 4,372,565 A | 2/1983 | Lien |
| 4,470,622 A | 9/1984 | Pate et al. |
| 4,488,388 A | 12/1984 | Schmidt |
| 4,546,522 A | 10/1985 | Gygax |
| 4,590,649 A | 5/1986 | Neilson, Jr. |
| 4,881,305 A | 11/1989 | Rivera |
| 5,026,096 A | 6/1991 | Lutz, II |
| 5,086,547 A | 2/1992 | Ziemelis |
| 5,099,551 A | 3/1992 | Hyun |
| 5,505,497 A | 4/1996 | Shea et al. |
| 5,630,593 A | 5/1997 | Swensen et al. |
| 5,722,666 A | 3/1998 | Sisk |
| 5,722,702 A | 3/1998 | Washburn |
| 5,988,694 A | 11/1999 | Brushaber |
| 6,206,434 B1 | 3/2001 | Schreiter |
| 6,470,538 B2 | 10/2002 | Richter |
| 6,719,299 B2 | 4/2004 | Mühle |
| 7,563,050 B2 | 7/2009 | Strait |
| 8,201,852 B2 | 6/2012 | Linhorst |
| 8,500,174 B2 | 8/2013 | Gibb |
| 8,608,205 B2 | 12/2013 | Lai |
| 8,615,865 B2 | 12/2013 | Vandal et al. |
| 8,739,369 B2 | 6/2014 | Kaltenrieder et al. |
| 8,794,637 B2 | 8/2014 | Martin et al. |
| 2004/0032126 A1 | 2/2004 | Mackle et al. |
| 2005/0230972 A1 | 10/2005 | Owen et al. |
| 2006/0061104 A1 | 3/2006 | Jungers |
| 2009/0302601 A1 | 12/2009 | Sarkisian et al. |
| 2009/0322078 A1 | 12/2009 | Wern et al. |
| 2010/0320758 A1 | 12/2010 | Sisk |
| 2012/0098259 A1 | 4/2012 | Sarkisian et al. |
| 2012/0227221 A1 | 9/2012 | Whitaker et al. |
| 2013/0067695 A1 | 3/2013 | Giotto et al. |
| 2014/0068896 A1 | 3/2014 | Cheng |

OTHER PUBLICATIONS

"IPS Carbon Steel Pipe—Grooved Couplings," Lenntech, Nov. 2001, (also available at http://www.lenntech.com/Data-sheets/Style%2078.pdf, accessed Mar. 13, 2016).

Crisp, Excerpt from "How to Install Enviro-Septic Pipe Couplings & Adaptors," https://snapguide.com/guides/install-enviro-septic-pipe-couplings-adaptors/, accessed Feb. 12, 2015.

Crisp, "How to Install Enviro-Septic Pipe Couplings & Adaptors," https://snapguide.com/guides/install-enviro-septic-pipe-couplings-adaptors/, accessed Mar. 29, 2018.

"Watch Clasps," excerpt from http://ilovewatches.com/pages/watch-clasps#5, re-directed from http://precisiontimeco.com/watch-clasps#5, accessed Feb. 11, 2015.

"Watch Clasps," Wayback Machine Internet Archive of http://ilovewatches.com/pages/watch-clasps#5, re-directed from http://precisiontimeco.com/watch-clasps#5, available at https://web.archive.org/web/20150725032253/https://ilovewatches.com/pages/watch-clasps Jul. 25, 2015.

International Search Report and Written Opinion dated Aug. 18, 2016 in PCT Application No. PCT/US16/23552.

"Watch Clasps," http://ilovewatches.com/pages/watch-clasps#5, re-directed from http://precisiontimeco.com/watch-clasps#5, accessed Feb. 11, 2015.

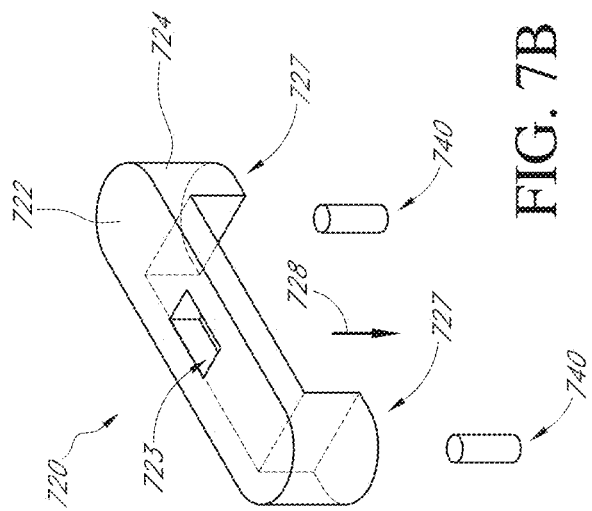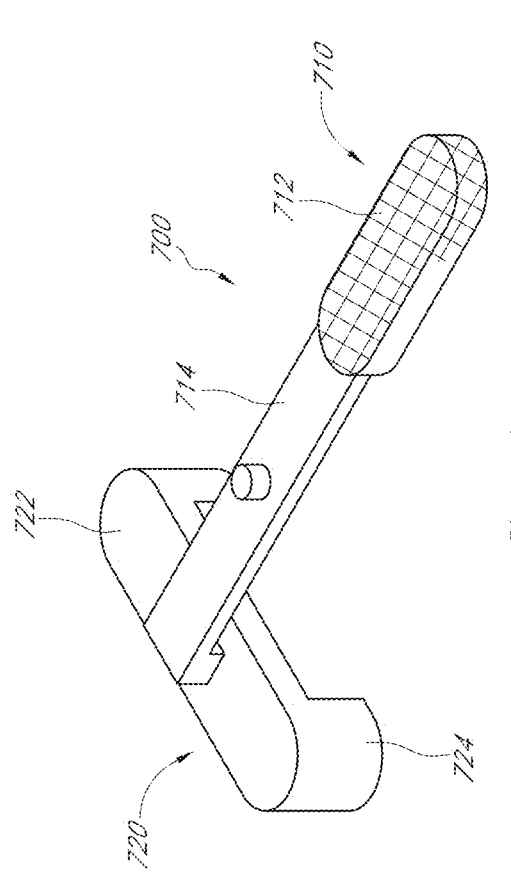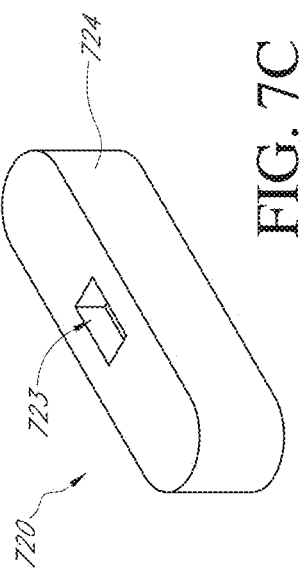
FIG. 7A
FIG. 7B
FIG. 7C

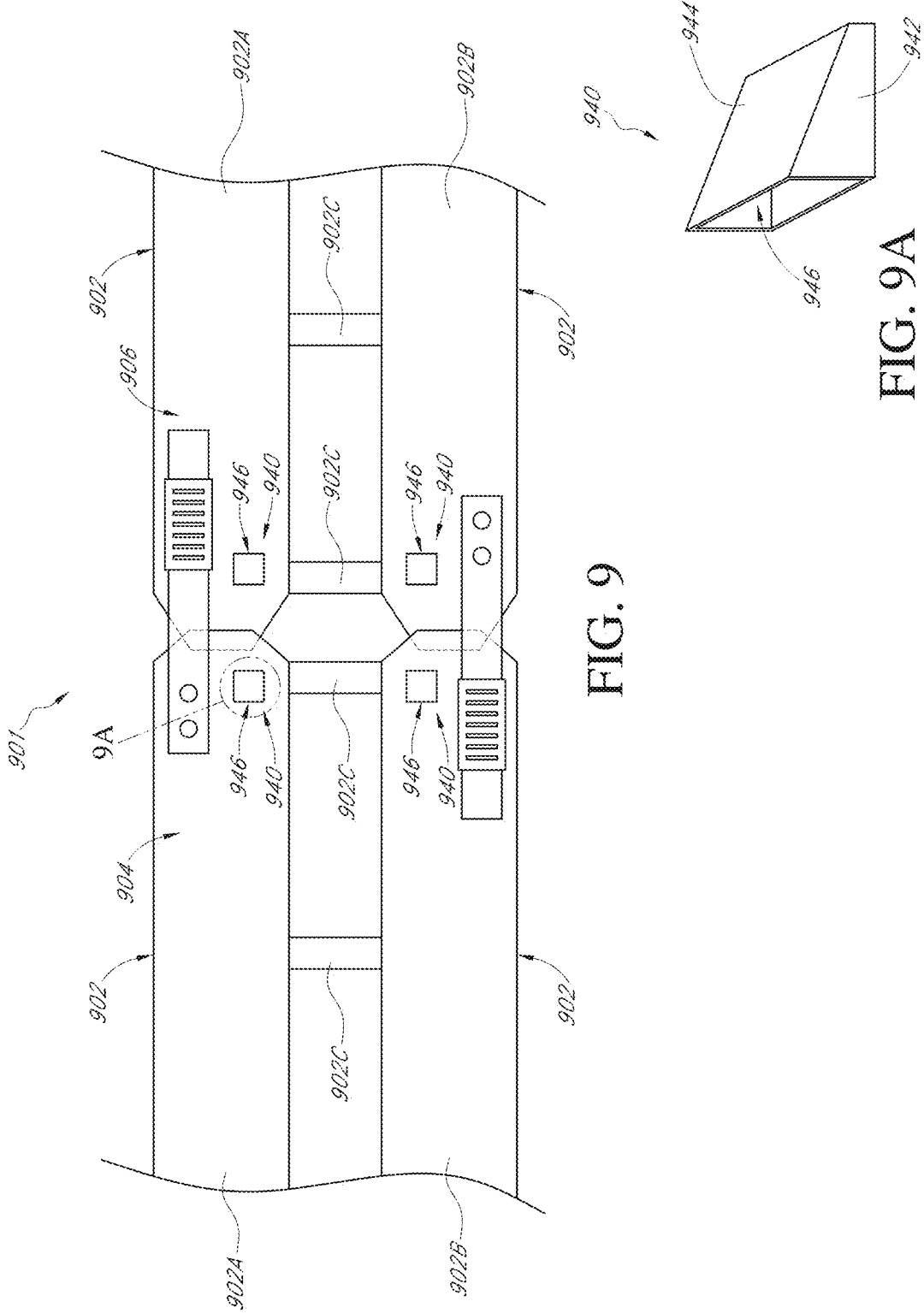

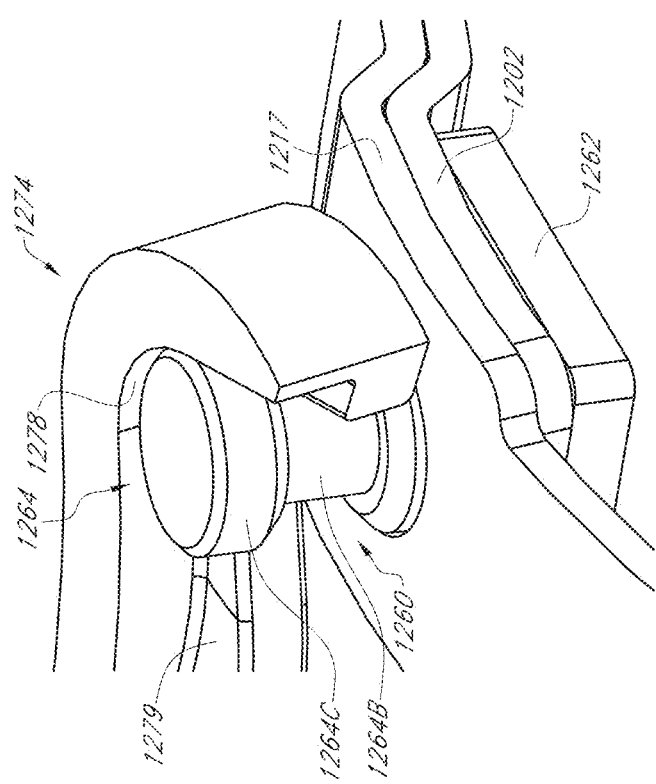

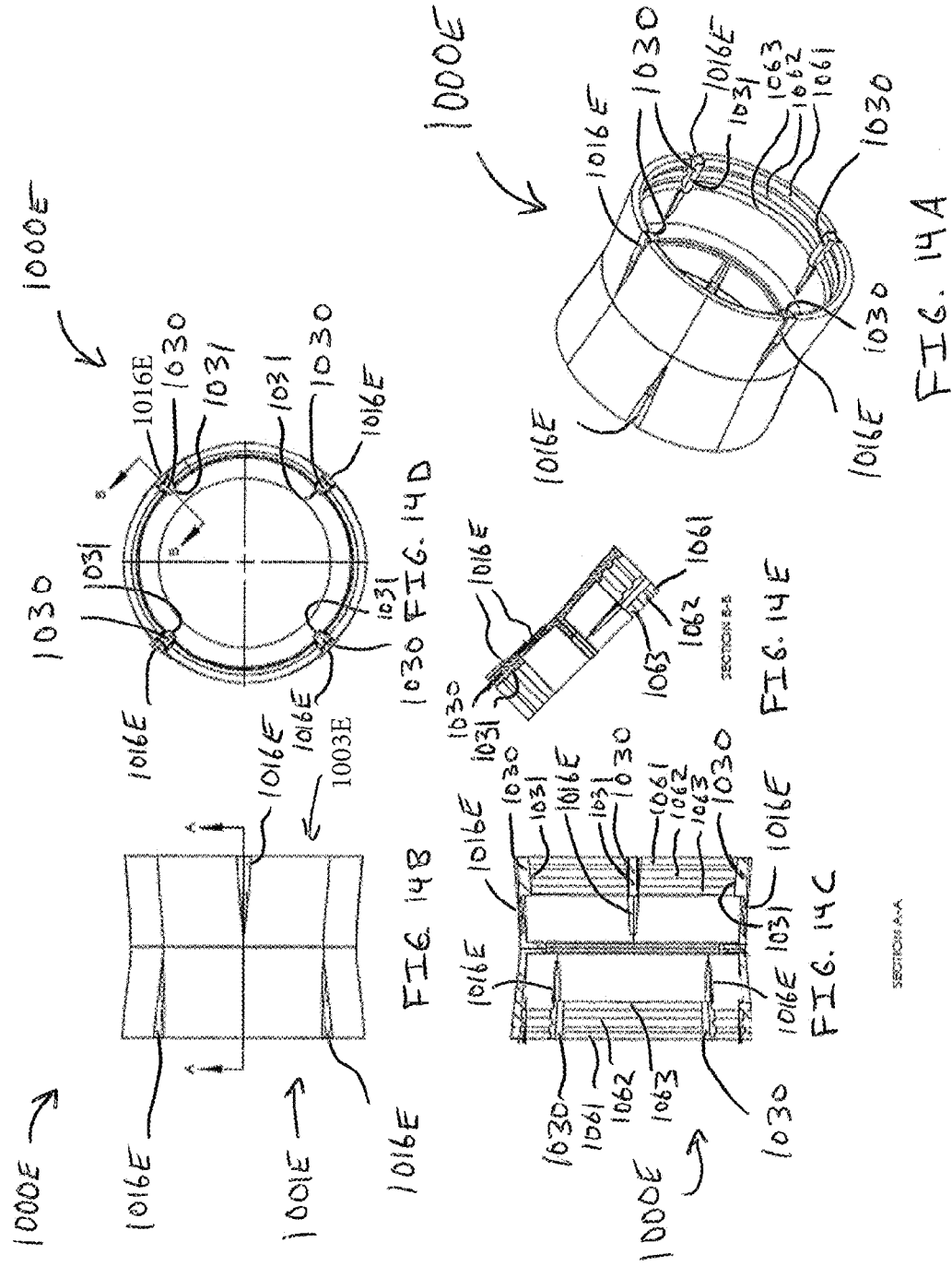

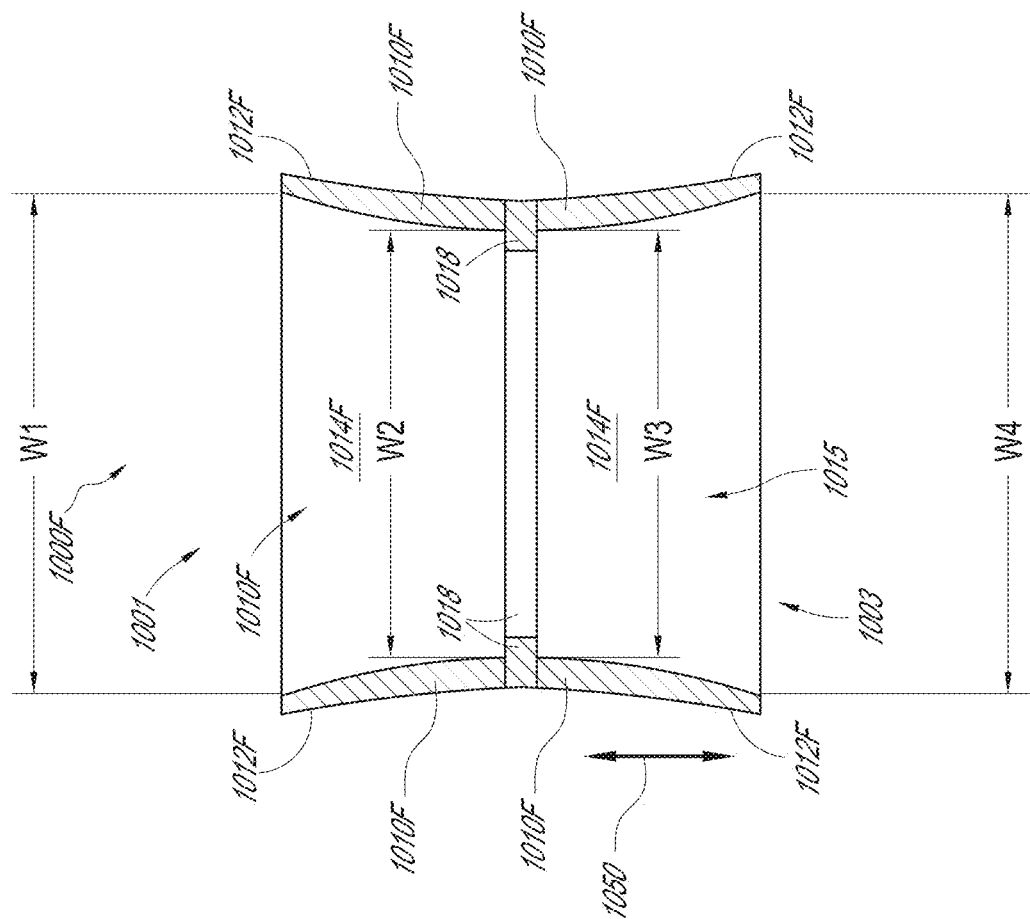
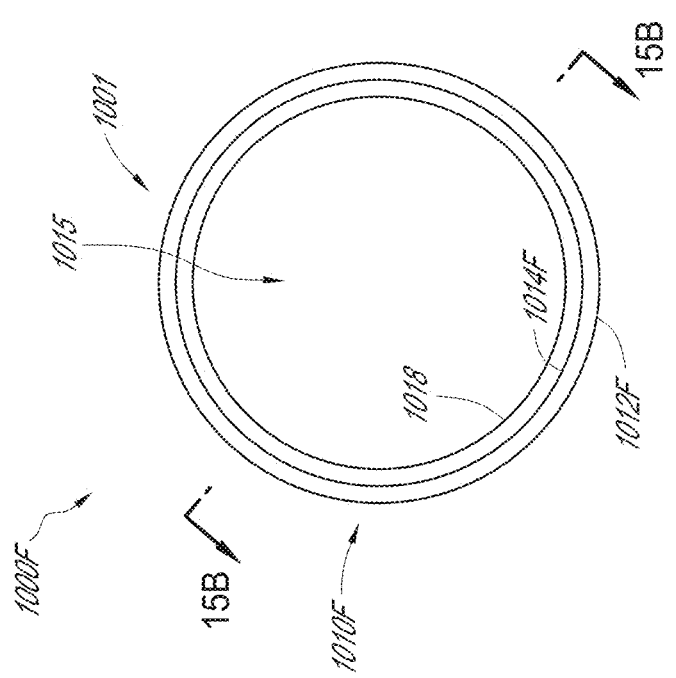
FIG. 15B
FIG. 15A

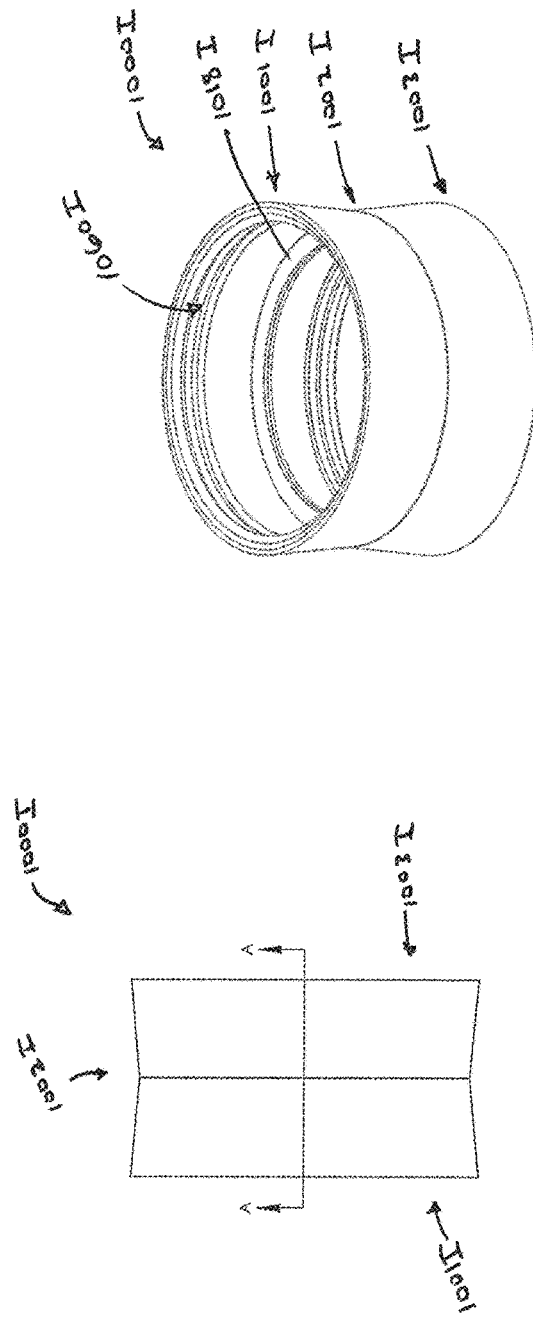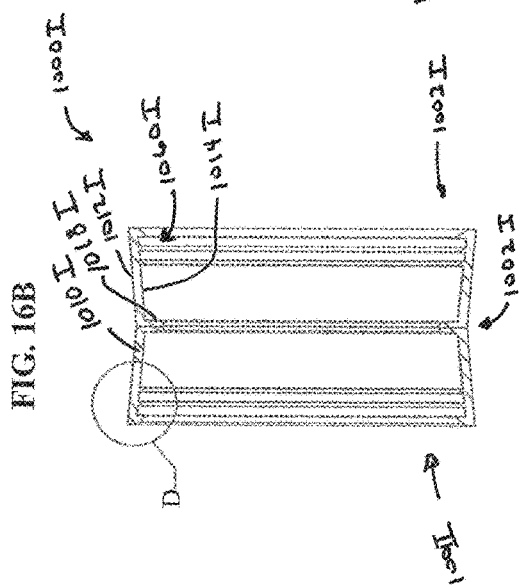
FIG. 16A
FIG. 16B
FIG. 16C
FIG. 16D

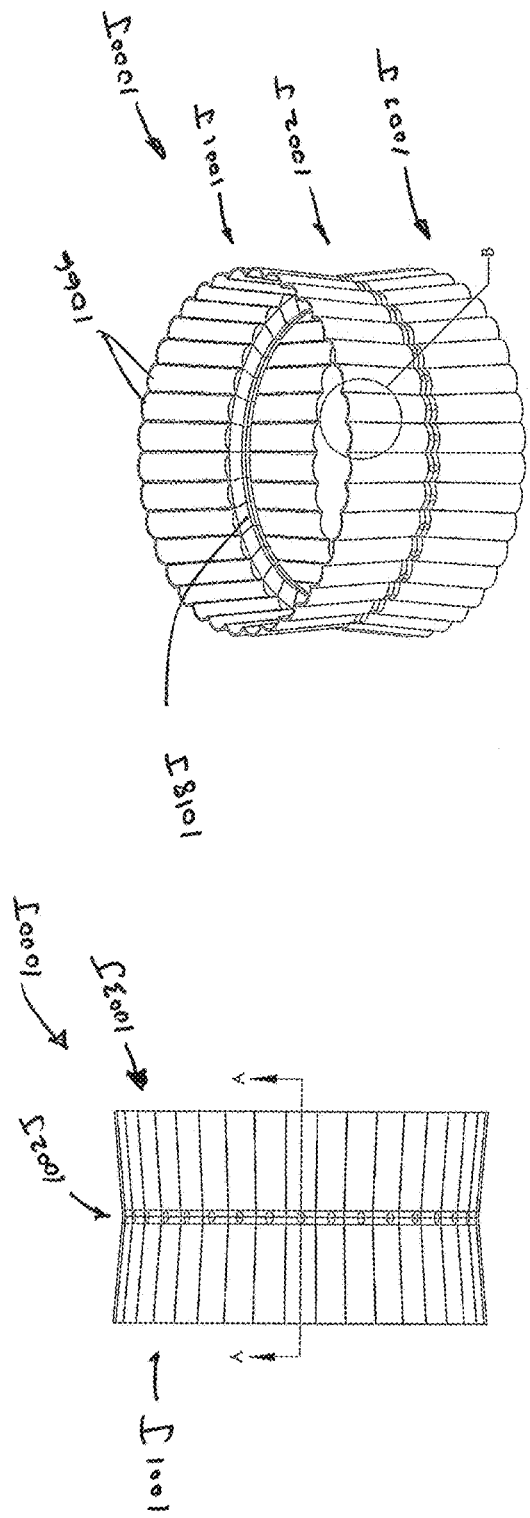
FIG. 17A
FIG. 17C
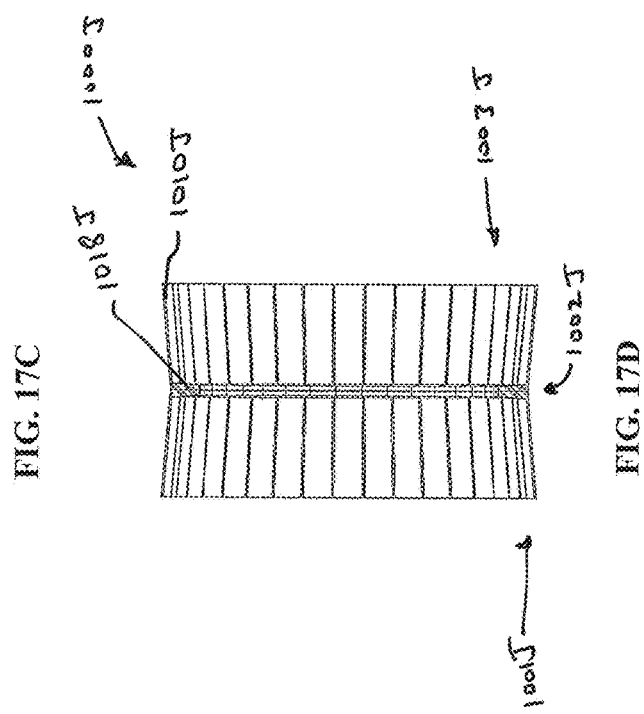
FIG. 17B
FIG. 17D

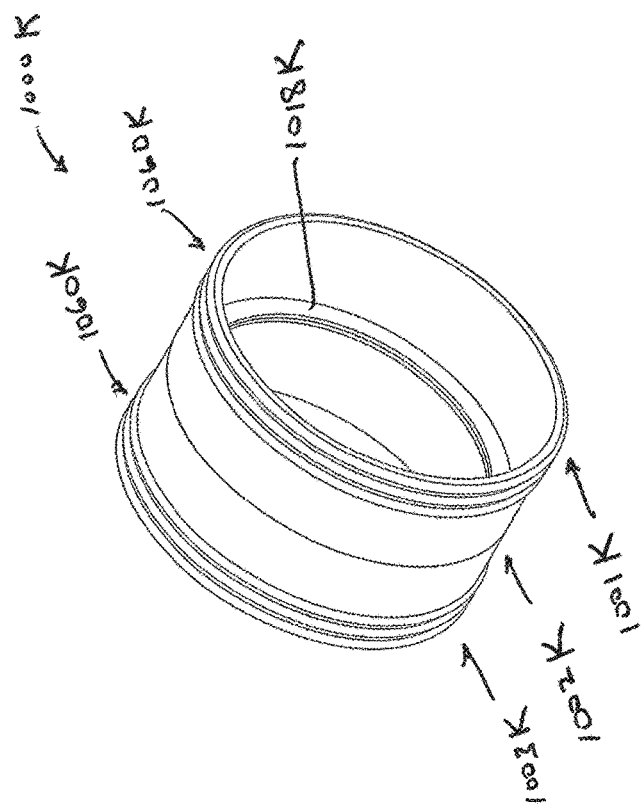
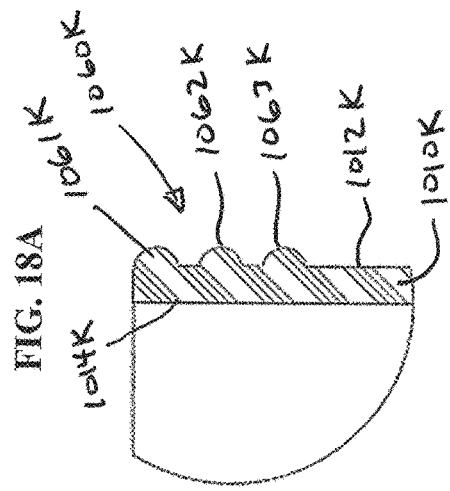
FIG. 18A
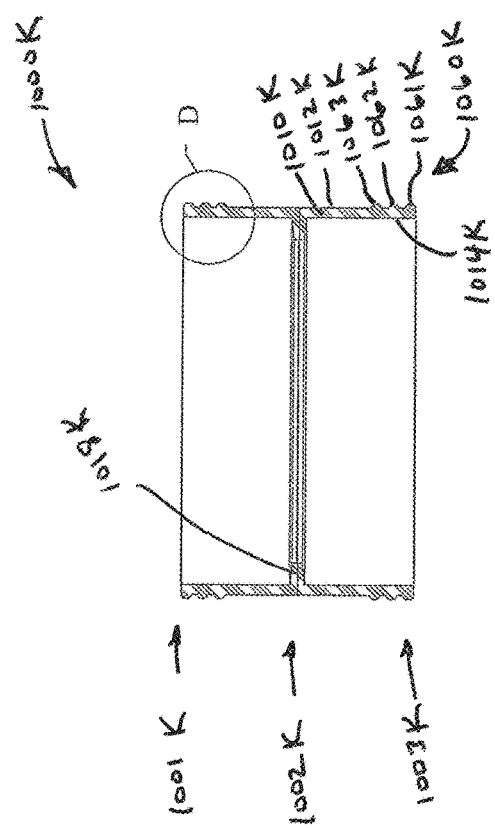
FIG. 18D
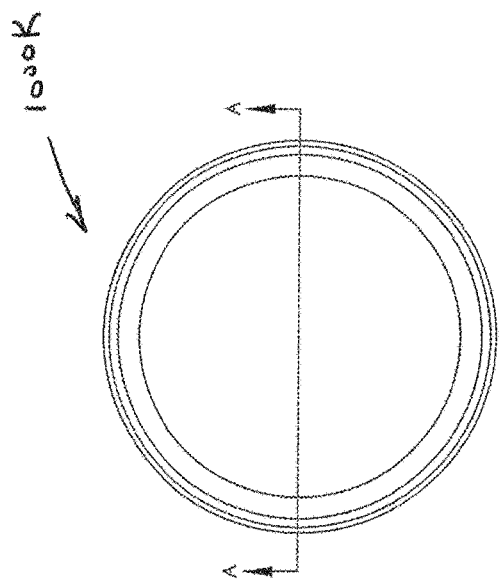
FIG. 18B
FIG. 18C

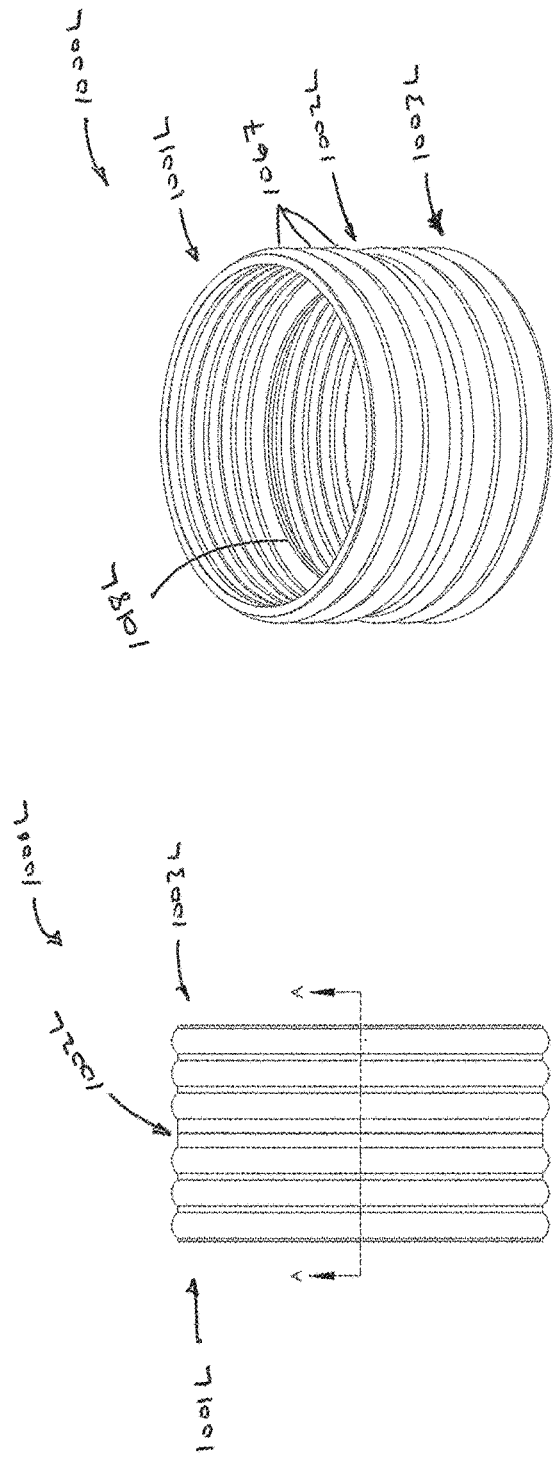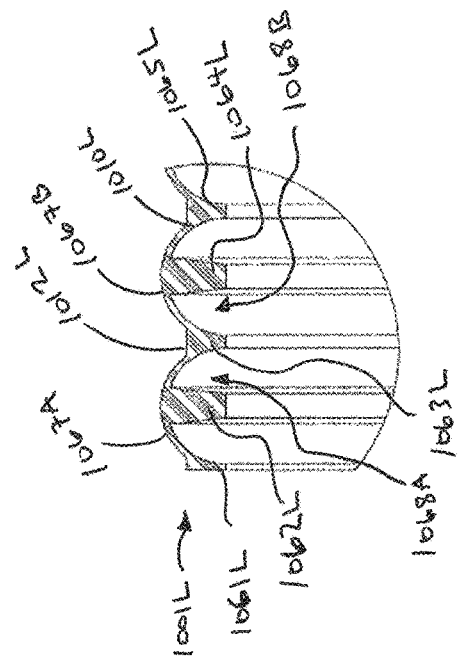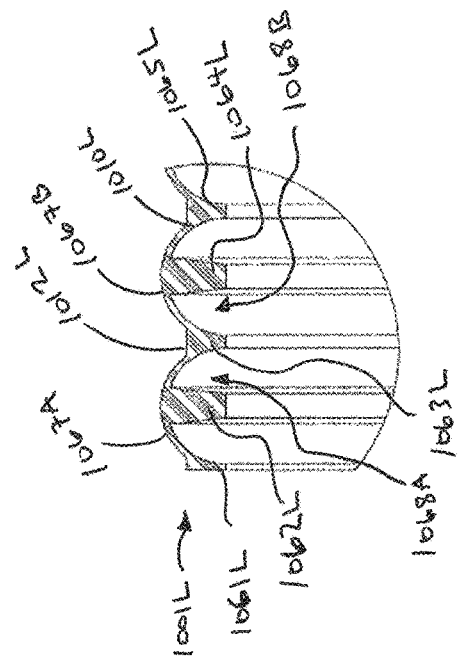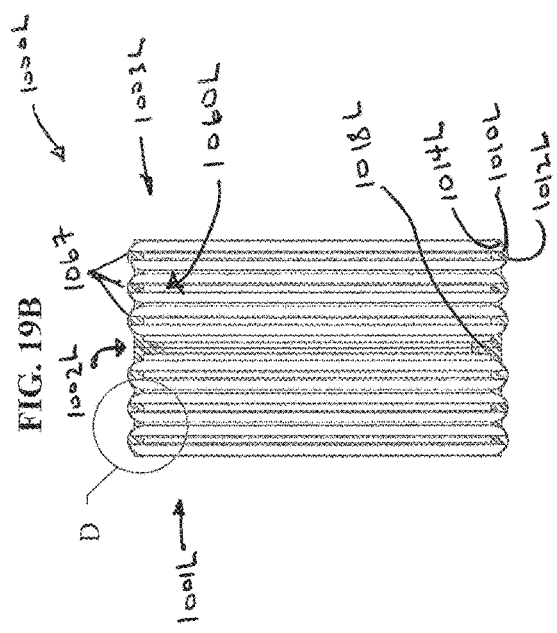

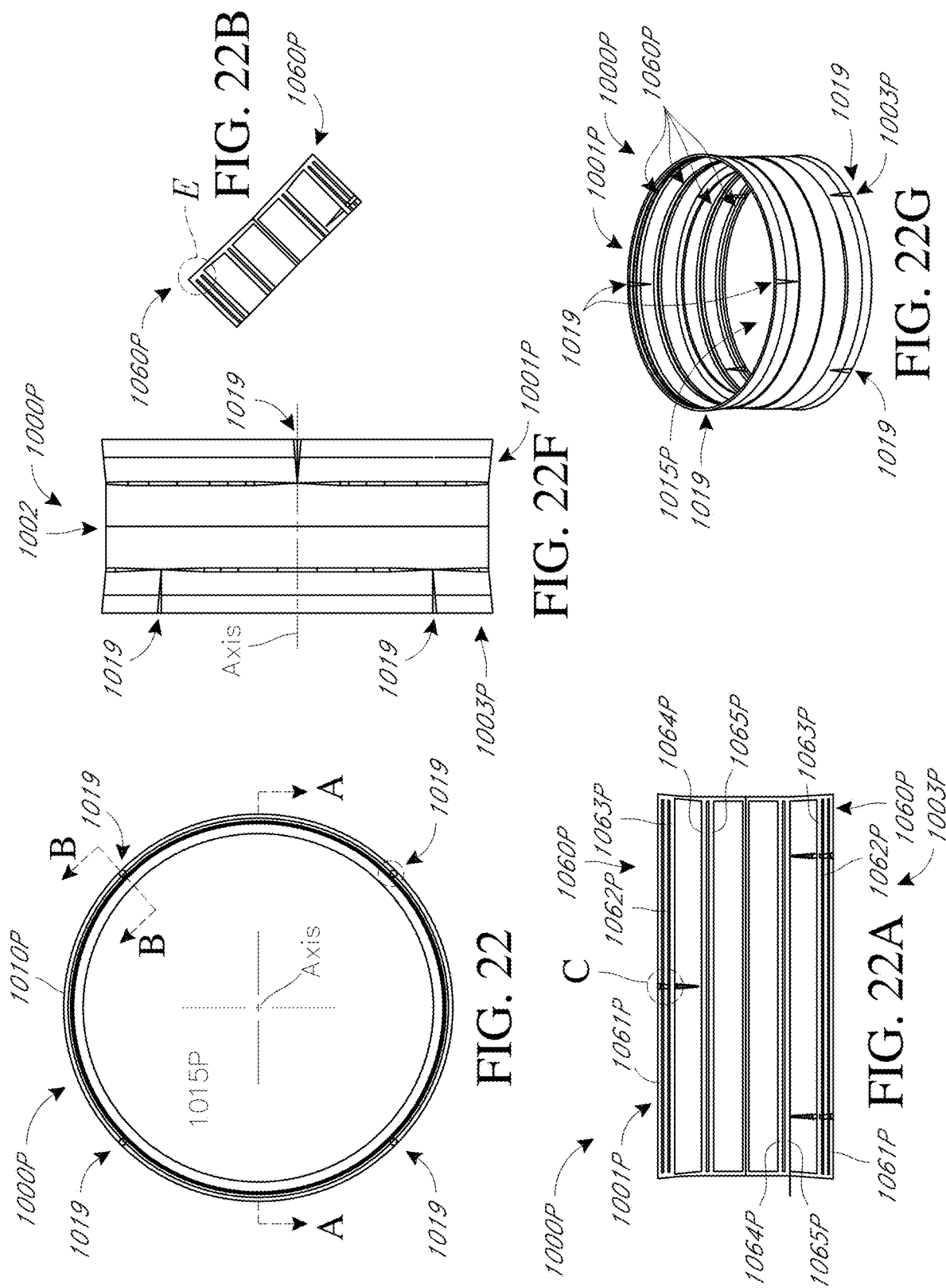

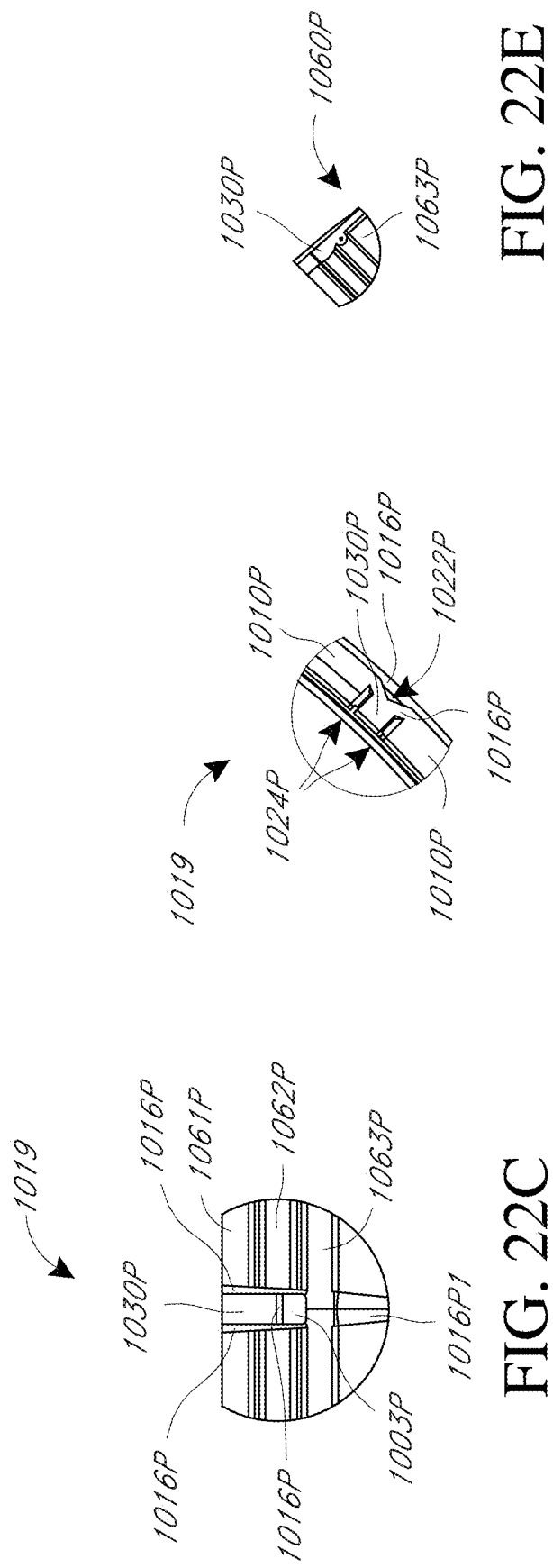

PIPE CONNECTOR SYSTEMS, DEVICES AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation-in-part of U.S. patent application Ser. No. 15/916,984, filed Mar. 9, 2018, entitled PIPE CONNECTOR SYSTEMS, DEVICES AND METHODS, now U.S. Pat. No. 10,557,578, which is a continuation-in-part of U.S. patent application Ser. No. 15/077,082, filed Mar. 22, 2016, entitled PIPE CONNECTOR SYSTEMS, DEVICES AND METHODS, now U.S. Pat. No. 10,100,956, which is a continuation-in-part of U.S. patent application Ser. No. 14/853,669, filed Sep. 14, 2015, entitled PIPE CONNECTOR SYSTEMS, DEVICES AND METHODS, now U.S. Pat. No. 10,253,885, which claims the benefit of U.S. Provisional Patent Application No. 62/210,912, filed Aug. 27, 2015, entitled PIPE CONNECTOR SYSTEMS, DEVICES AND METHODS, and the benefit of U.S. Provisional Patent Application No. 62/137,682, filed Mar. 24, 2015, entitled PIPE CONNECTOR SYSTEMS, DEVICES AND METHODS, and this application claims the benefit of U.S. Provisional Patent Application No. 62/469,290, filed on Mar. 9, 2017, entitled PIPE CONNECTOR SYSTEMS, DEVICES AND METHODS, and the benefit of U.S. Provisional Patent Application No. 62/540,403, filed Aug. 2, 2017, entitled PIPE CONNECTOR SYSTEMS, DEVICES AND METHODS, the disclosure of each of which is incorporated herein by reference in its entirety for all purposes.

BACKGROUND

Field

This disclosure relates to connectors for connecting pipes. In particular, features for a no hub clamp, gasket, tool and associated methods are disclosed.

Description of the Related Art

Pipe connectors are used for connecting the ends of pipes to allow for continuous and sealed passage of fluid between the pipes. One such connector is a no hub clamp. No hub clamps can include bands that wrap around the ends of adjacent pipes. The bands are then screwed together. However, such no hub clamps can be complex and difficult to make and use. Accordingly, a new type of no hub clamp is needed that is convenient to use and simpler to manufacture.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for connecting pipes.

Described herein are embodiments of a gasket, for example for connecting two pipe ends. The gasket may be used with a variety of clamps, such as a no hub clamp for connecting the ends of two pipes. Also described are tools for using such clamps, the gasket, and associated methods of use of all of these. The various clamps, pipes, gaskets, tools and methods described herein may be used with each other and with other clamps, pipes, gaskets, tools and methods not described herein. For example, any of the various clamps described herein may be used with any of the gaskets described herein. Further, the clamps described herein may be used with gaskets other than the gaskets described herein. Similarly, the gaskets described herein may be used with clamps other than the clamps described herein. Also, the described subject matter may be used for connecting features other than pipes, such as hoses, tubes, channels, cylinders, other fluid-conveying parts, and the like. Thus, while the systems, devices and methods may be described with respect to particular combinations of parts, or to particular parts such as pipes, it is understood that this is merely for the sake of description and is not limiting the usage of the systems, devices and methods to those particular combinations or with those particular parts.

In one embodiment, the clamp in a loosened state may surround the two ends of the pipes that are to be connected with each other. The ends of the pipes may abut together and then be secured in place by tightening the clamp around the two ends into a locked state. A seal, gasket, or other part or parts at the interface of the two pipes may be assembled around and/or between the pipes, and the clamp may then be secured over the pipes and any such seal, gasket, etc. The clamp may be first sheathed over one of the pipes, the two ends of the pipes (and any seal etc.) may then be brought together, and then the clamp may be slid over the two ends of the pipes (and over any seal etc.) and tightened such that the clamp compresses the pipes and fixes the pipes in place next to each other.

In one aspect, a gasket is described. The gasket comprises a rounded sidewall, a membrane section and a wedge. The rounded sidewall defines a channel therethrough with the channel defining a central axis. The sidewall comprises a top end, a middle portion, and a bottom end opposite the top end. The membrane section at the top end of the sidewall extends axially toward the middle portion and connects two circumferentially separated portions of the sidewall adjacent to the membrane section. The membrane section has a smaller radial thickness than that of the two circumferentially separated portions of the sidewall adjacent to the membrane section. The wedge is located on a radially inward surface of the membrane section. The wedge protrudes from the membrane section toward the channel and extends axially along the membrane section. A first portion of the wedge has a larger radial thickness than a second portion of the wedge.

In some embodiments, the first portion of the wedge may be located axially closer to the top end of the gasket than the second portion of the wedge. The wedge may taper in radial thickness along the axial length of the wedge. At least a portion of the wedge may have a larger radial thickness than the membrane section. A circumferential width of the wedge may be less than a circumferential width of the membrane section such that an inner gap is located adjacent two circumferential sides of the wedge. The top end may define a first inner width, the bottom end may define a second inner width, and the middle portion may define a third inner width, with the third inner width less than each of the first and second inner widths.

In some embodiments, the gasket may further comprise a plurality of the membrane sections and a plurality of the wedges, with each of the plurality of membrane sections located at the top end of the sidewall, and each membrane section comprising a corresponding one of the plurality of wedges.

In some embodiments, the gasket may further comprise a second membrane section and a second wedge. The second membrane section may be at the bottom end of the sidewall extending axially toward the middle portion and connecting two circumferentially separated portions of the sidewall adjacent to the second membrane section, with the second membrane section having a smaller radial thickness than that of the two circumferentially separated portions of the sidewall adjacent to the second membrane section. The second wedge may be located on a radially inward surface of the second membrane section, with the second wedge protruding from the second membrane section toward the channel and extending axially along the second membrane section. A first portion of the second wedge may have a larger radial thickness than a second portion of the second wedge.

In some embodiments, the gasket may further comprise a plurality of the second membrane sections and a plurality of the second wedges, with each of the plurality of second membrane sections located at the bottom end of the sidewall, and each membrane section comprising a corresponding one of the plurality of second wedges. The first portion of the second wedge may be located axially closer to the bottom end of the gasket than the second portion of the second wedge.

In some embodiments, there may be three of the membrane sections and three corresponding wedges, and further comprising three second membrane sections and three second wedges. The three second membrane sections may be at the bottom end of the sidewall extending axially toward the middle portion and each connecting two circumferentially separated portions of the sidewall adjacent to each of the three second membrane sections. The second membrane sections may each have a smaller radial thickness than that of the two circumferentially separated portions of the sidewall adjacent to the respective second membrane section. The three second wedges may each be located on a radially inward surface of a corresponding one of the three second membrane sections, with the three second wedges protruding from the corresponding second membrane section toward the channel and extending axially along the corresponding second membrane section. Each of the three second wedges may have a first portion and a second portion where the first portion has a larger radial thickness than the second portion.

In some embodiments, the gasket may further comprise an annular seal extending circumferentially along an inner surface of the sidewall. The annular seal may be located near the top end of the gasket. The annular seal may be interrupted by the membrane section such that the annular seal extends along the two circumferentially separated portions of the sidewall adjacent to the first membrane section. The annular seal may be located closer to the middle portion relative to the membrane section such that the annular seal is extending continuously circumferentially along the inner surface of the sidewall. The gasket may further comprise a plurality of the annular seals extending circumferentially along the inner surface of the sidewall, where at least one of the annular seals is interrupted by the membrane section and at least one of the annular seals is extending continuously circumferentially along the inner surface of the sidewall. There may be three of the annular seals, where two of the annular seals are interrupted by the membrane section and one of the annular seals is extending continuously circumferentially along the inner surface of the sidewall. The plurality of the annular seals may be located at the top end of the gasket and spaced axially relative to each other. The plurality of annular seals may be located at the top end of the gasket, and further comprising a second plurality of annular seals located at the bottom end of the gasket.

In some embodiments, the gasket may further comprise a second membrane section and a second wedge. The second membrane section maybe at the bottom end of the sidewall extending axially toward the middle portion and connecting two circumferentially separated portions of the sidewall adjacent to the second membrane section, the second membrane section having a smaller radial thickness than that of the two circumferentially separated portions of the sidewall adjacent to the second membrane section. The second wedge may be located on a radially inward surface of the second membrane section, with the second wedge protruding from the second membrane section toward the channel and extending axially along the second membrane section, where a first portion of the second wedge has a larger radial thickness than a second portion of the second wedge. At least one of the second plurality of annular seals may be interrupted by the second membrane section and at least one of the second plurality of annular seals may be extending continuously circumferentially along the inner surface of the sidewall.

In another aspect, a gasket for connecting two pipe ends is described. The gasket comprises a rounded sidewall and a ridge. The rounded sidewall defines a channel therethrough in a first direction. The sidewall comprises a top end, a middle portion, and a bottom end opposite the top end. The ridge extends along an inner surface of the sidewall near the middle portion and protruding radially inwardly therefrom. The top end defines a first inner width. The bottom end defines a second inner width. The middle portion defines a third inner width. The third inner width is less than each of the first and second inner widths.

Various embodiments of the various aspects may be implemented. The sidewall may taper radially outwardly from the middle portion to the top end, and taper radially outwardly from the middle portion to the bottom end. The sidewall may taper radially outwardly in a straight direction. The sidewall may taper radially outwardly in a curved direction. The ridge may extend continuously along a circumference of the inner surface of the sidewall. The ridge may comprise a plurality of ridge portions. The top and bottom ends may each comprise a first sidewall portion connected to a second sidewall portion by a membrane section located circumferentially therebetween, wherein the membrane section is thinner than each of the first and second sidewall portions. The membrane sections may each be configured to collapse upon contraction respectively of the top and bottom ends. The first and second sidewall portions may each comprise respectively a first and second membrane section extending circumferentially therefrom, the first and second membrane sections configured to slide past one another upon contraction of the respective end of the gasket. The top and bottom ends may each comprise a first sidewall portion at least partially separated from a second sidewall portion by a gap formed circumferentially therebetween, wherein the sidewall at the gap is thinner than each of the first and second sidewall portions. The gaps may be configured to collapse upon contraction of the respective top and bottom ends to bring the first and second sidewall portions closer together.

In another aspect, a gasket for connecting two pipe ends is described. The gasket comprises a rounded sidewall defining a channel therethrough in a first direction. The sidewall comprises a top end, a middle portion, and a bottom end opposite the top end. The top and bottom ends are each configured to reduce in circumference upon contraction due to clamping of the gasket about the two pipe ends.

Various embodiments of the various aspects may be implemented. The top and bottom ends may each comprising a first sidewall portion connected to a second sidewall portion by a membrane section located circumferentially therebetween, where the membrane section is thinner than each of the first and second sidewall portions, and the membrane sections are each configured to collapse upon contraction respectively of the top and bottom ends. The first and second sidewall portions may each comprise respectively a first and second membrane section extending circumferentially therefrom, with the first and second membrane sections configured to slide past one another upon contraction of the respective end of the gasket. The top and bottom ends may each comprise a first sidewall portion at least partially separated from a second sidewall portion by a gap formed circumferentially therebetween, where the sidewall at the gap is thinner than each of the first and second sidewall portions, and the gaps are configured to collapse upon contraction of the respective top and bottom ends to bring the first and second sidewall portions closer together.

In another aspect, a gasket for connecting two pipe ends is described. The gasket comprising a rounded sidewall defining a channel therethrough in a first direction, with the sidewall comprising a top end, a middle portion, and a bottom end opposite the top end. The top and bottom ends each have a smaller width and circumference in a contracted configuration compared to an expanded configuration, due to clamping of the gasket about the two pipe ends to force the gasket from the expanded configuration into the contracted configuration. In the expanded configuration, the top and bottom ends each have a larger width than the middle portion.

Various embodiments of the various aspects may be implemented. The top and bottom ends may each comprise a first sidewall portion connected to a second sidewall portion by a membrane section located circumferentially therebetween, where the membrane section is thinner than each of the first and second sidewall portions, and the membrane sections are each configured to collapse to form the contracted configuration. The first and second sidewall portions may each comprise respectively a first and second membrane section extending circumferentially therefrom, with the first and second membrane sections configured to slide past one another upon contraction of the respective end of the gasket to form the contracted configuration. The top and bottom ends may each comprise a first sidewall portion at least partially separated from a second sidewall portion by a gap formed circumferentially therebetween, where the sidewall at the gap is thinner than each of the first and second sidewall portions, and the gaps are configured to collapse upon contraction of the respective top and bottom ends to bring the first and second sidewall portions closer together to form the contracted configuration. The sidewall may taper radially outward from the middle portion to each of the top and bottom ends.

In another aspect, an apparatus for coupling two adjacent pipe ends is disclosed. The apparatus comprises an elongated band having a first end and a second end opposite the first end, the band configured to circumferentially surround the two adjacent pipe ends, and a locking mechanism coupled with the elongated band, the locking mechanism configured to bring together the first and second ends of the band, the locking mechanism further configured to tighten and lock the apparatus in a locked configuration about the two adjacent pipe ends. The locking mechanism comprises a flexible tab coupled with and extending away from the first end of the band, a rigid nub coupled with and projecting away from the flexible tab, and a complementary member coupled with the second end of the band, the complementary member having an edge. In the locked configuration, the rigid nub snaps into a position adjacent to the edge, and the flexible tab is configured to flex to allow the rigid nub to snap into the position adjacent to the edge.

In some embodiments, the flexible tab is protruding substantially orthogonally from a portion of the band to which the tab is coupled, and the rigid nub is extending toward the second end of the band, and the tab and nub define a receiving space thereunder configured to receive the complementary member of the second end of the band.

In some embodiments, the edge of the complementary member is located on the second end of the band.

In some embodiments, the apparatus further comprises a hollow channel coupled with and projecting away from the second end of the band, the hollow channel configured to receive a tool end therein to assist with closing and locking the apparatus in the locked configuration.

In some embodiments, the apparatus further comprises a connector having a first end a second end opposite the first end, with the first end of the connector rotatably coupled with the first end of the elongated band and the second end of the connector rotatably coupled with the second end of the elongated band.

In some embodiments, the second end of the connector comprises an overhang extending beyond the second end of the band, wherein the overhang includes the edge that snaps into position with the rigid nub in the locked configuration.

In some embodiments, the flexible tab is connected to a bar that is moveably connected to the first end of the band, and the bar can be moved along the length of the band to adjust the size of the apparatus in the locked configuration.

In another aspect, an apparatus for coupling two adjacent pipe ends is disclosed. The apparatus comprises an elongated band having a first end and a second end opposite the first end, with the band configured to circumferentially surround the two adjacent pipe ends, and a locking mechanism coupled with the elongated band. The locking mechanism is configured to bring together the first and second ends of the band, and the locking mechanism is further configured to tighten and lock the apparatus in a locked configuration about the two adjacent pipe ends. The locking mechanism comprises a flexible elongated tab coupled with and extending away from the first end of the band, a lip coupled with and extending away from an end of the tab, a channel coupled with and extending away from the second end of the band, with the channel configured to receive the tab therethrough, and a stop coupled with and projecting away from the band near the channel, with the stop configured to contact the lip. In the locked configuration, the tab extends through the channel and the lip contacts the stop thereby restricting movement of the tab out of the channel.

In some embodiments, the end of the tab containing the lip comprises an upwardly bent portion, the bent portion further restricting movement of the tab out of the channel in the locked configuration.

In some embodiments, the stop extends in a direction away from the channel.

In some embodiments, the apparatus further comprises a plurality of the stops defining a plurality of grooves each configured to receive the lip in the locked configuration.

In some embodiments, the apparatus further comprises a first arcuate projection coupled with and extending away from the first end of the band, and a second arcuate projection coupled with and extending away from the second end of the band, with the first and second arcuate projections configured for gripping with a tool to facilitate tightening and locking the apparatus.

In some embodiments, the locking mechanism further comprises another flexible elongated tab coupled with and extending away from the first end of the band, another lip coupled with and extending away from an end of the other tab, another channel coupled with and extending away from the second end of the band, with the other channel configured to receive the other tab therethrough, and another stop coupled with and projecting away from the band near the other channel, with the other stop configured to contact the other lip. In the locked configuration, the other tab extends through the other channel and the other lip contacts the other stop thereby restricting movement of the other tab out of the other channel.

In some embodiments, the end of the other tab containing the other lip comprises another upwardly bent portion, with the other bent portion further restricting movement of the other tab out of the other channel in the locked configuration.

In some embodiments, the other stop extends in a direction away from the other channel.

In some embodiments, the apparatus further comprises a plurality of the other stops defining a plurality of other grooves each configured to receive the other lip in the locked configuration.

In another aspect, an apparatus for coupling two adjacent pipe ends is disclosed. The apparatus comprises an elongated band having a first end and a second end opposite the first end, the band configured to circumferentially surround the two adjacent pipe ends, and a locking mechanism coupled with the elongated band, with the locking mechanism configured to bring together the first and second ends of the band, and with the locking mechanism further configured to tighten and lock the apparatus in a locked configuration about the two adjacent pipe ends. The locking mechanism comprises a flexible elongated tab coupled with and extending away from the first end of the band, with the tab including a raised portion on an outer surface of the tab, and a channel coupled with and extending away from the second end of the band, with the channel configured to receive the tab therethrough, and with the channel including a series of slots configured to receive therein the raised portion of the tab when the tab is inserted through the channel. In the locked configuration, the tab extends through the channel and the raised portion of the tab is inserted into one of the slots of the channel thereby restricting movement of the tab out of the channel.

In some embodiments, the elongated tab can flex up and down to allow the raised portion of the tab to move, respectively, into and out of one of the slots of the channel.

In some embodiments, the tab further comprises a lip coupled with and extending away from an end of the tab.

In some embodiments, the apparatus further comprises a stop coupled with and projecting from the second end of the band, with the lip of the tab configured to contact the stop to prevent the tab from exiting the channel.

In some embodiments, the series of slots are parallel to each other and extend in a direction transversely to the elongated band.

In some embodiments, the raised portion of the tab is elongated and complements a shape of the slots.

In some embodiments, the channel includes an angled end portion on an end of the channel farthest from the second end of the band.

In some embodiments, the apparatus further comprises a first arcuate projection coupled with and extending away from the first end of the band, and a second arcuate projection coupled with and extending away from the second end of the band, with the first and second arcuate projections configured for gripping with a tool to facilitate tightening and locking the apparatus.

In some embodiments, the first and second arcuate projections are C-shaped projections. In some embodiments, the first and second arcuate projections are rounded pins.

In some embodiments, the locking mechanism further comprises another flexible elongated tab coupled with and extending away from the first end of the band, the other tab including another raised portion on another outer surface of the other tab, and another channel coupled with and extending away from the second end of the band, with the other channel configured to receive the other tab therethrough, and with the other channel including a series of other slots configured to receive therein the other raised portion of the other tab when the other tab is inserted through the other channel. In the locked configuration, the other tab extends through the other channel and the other raised portion of the other tab is inserted into one of the other slots of the other channel thereby restricting movement of the other tab out of the other channel.

In some embodiments, the other elongated tab can flex up and down to allow the other raised portion of the other tab to move, respectively, into and out of one of the other slots of the other channel.

In some embodiments, the other tab further comprises another lip coupled with and extending away from an end of the other tab.

In some embodiments, the apparatus further comprises another stop coupled with and projecting from the second end of the band, with the other lip of the other tab configured to contact the other stop to prevent the other tab from exiting the other channel.

In some embodiments, the series of other slots are parallel to each other and extend in a direction transversely to the elongated band.

In some embodiments, the raised portion of the other tab is elongated and complements a shape of the other slots. In some embodiments, the other channel includes an angled end portion on an end of the other channel farthest from the second end of the band.

In another aspect, an apparatus for coupling two adjacent pipe ends is disclosed. The apparatus comprises first and second elongated band portions, each band portion having a first end and a second end opposite the first end, with the first band portion configured to circumferentially surround one of the two adjacent pipe ends and the second band portion configured to circumferentially surround the other of the two adjacent pipe ends, a plurality of transverse ties each connecting the first band portion with the second band portion, and a locking mechanism coupled with the apparatus, the locking mechanism configured to bring together the first and second ends of the band portions, with the locking mechanism further configured to tighten and lock the apparatus in a locked configuration about the two adjacent pipe ends. The locking mechanism comprises a first flexible elongated tab coupled with and extending away from the first end of the first band portion, the first tab including a first raised portion on an outer surface of the first tab, a first channel coupled with and extending away from the second end of the first band portion, the first channel configured to receive the first tab therethrough, with the first channel including a series of first slots configured to receive therein the first raised portion of the first tab when the first tab is inserted through the first channel, and a second flexible elongated tab coupled with and extending away from the second end of the second band portion, with the second tab including a second raised portion on an outer surface of the second tab, and a second channel coupled with and extending away from the first end of the second band portion, with the second channel configured to receive the second tab therethrough, and with the second channel including a series of second slots configured to receive therein the second raised portion of the second tab when the second tab is inserted through the second channel. In the locked configuration, the first tab extends through the first channel and the first raised portion of the first tab is inserted into one of the first slots of the first channel thereby restricting movement of the first tab out of the first channel, and in the locked configuration the second tab extends through the second channel and the second raised portion of the second tab is inserted into one of the second slots of the second channel thereby restricting movement of the second tab out of the second channel.

In some embodiments, in the locked configuration, the first band portion has a first diameter and the second band portion has a second diameter, and wherein the first and second diameters are different.

In some embodiments, the first elongated tab can flex up and down to allow the first raised portion to move, respectively, into and out of one of the first slots, and wherein the second elongated tab can flex up and down to allow the second raised portion to move, respectively, into and out of one of the second slots.

In some embodiments, the first tab further comprises a first lip coupled with and extending away from an end of the first tab, and the second tab further comprises a second lip coupled with and extending away from an end of the second tab.

In some embodiments, the apparatus further comprises a first stop coupled with and projecting from the second end of the first band, and a second stop coupled with and projecting from the first end of the second band, with the first lip of the first tab configured to contact the first stop to prevent the first tab from exiting the first channel, and the second lip of the second tab configured to contact the second stop to prevent the second tab from exiting the second channel.

In some embodiments, the series of first slots are parallel to each other and extend in a direction transversely to the elongated first band portion, and the series of second slots are parallel to each other and extend in a direction transversely to the elongated second band portion.

In some embodiments, the first raised portion of the first tab is elongated and complements a shape of the first slots, and the second raised portion of the second tab is elongated and complements a shape of the second slots.

In some embodiments, the first channel includes a first angled end portion on an end of the first channel farthest from the second end of the band, and the second channel includes a second angled end portion on an end of the second channel farthest from the first end of the band.

In some embodiments, the apparatus further comprises a first arcuate projection coupled with and extending away from the first end of the first band portion, and a second arcuate projection coupled with and extending away from the second end of the second band portion, with the first and second arcuate projections configured for gripping with a tool to facilitate tightening and locking the apparatus.

In some embodiments, the first and second arcuate projections are rounded pins.

In some embodiments, the apparatus further comprises a first projection coupled with and extending away from the first end of the first band portion, with the first projection defining a cavity facing away from the first end of the first band portion, and a second projection coupled with and extending away from the second end of the first band portion, with the second projection defining a cavity facing away from the second end of the first band portion, a third projection coupled with and extending away from the first end of the second band portion, with the third projection defining a cavity facing away from the first end of the second band portion, and a fourth projection coupled with and extending away from the second end of the second band portion, with the fourth projection defining a cavity facing away from the second end of the second band portion, and with the first, second, third and fourth projections each configured for receiving a tool within their respective cavities to facilitate tightening and locking the apparatus.

In another aspect, a method of coupling a first and second pipe end is disclosed. The method comprises surrounding the first and second pipe ends with an elongated band, wherein the first and second pipe ends are located adjacent to each other, and locking a locking mechanism that is coupled with the elongated band such that the elongated band tightens and thereby securely couples the adjacent first and second pipe ends. Locking the locking mechanism comprises inserting a flexible tab through an opening defined by a channel, wherein the flexible tab is coupled with a first end of the elongated band and the channel is coupled with a second end of the elongated band that is opposite the first end, and receiving a raised portion of the flexible tab into a slot defined by a wall of the channel thereby restricting movement of the flexible tab out of the channel.

In some embodiments, locking the locking mechanism further comprises flexing the flexible tab.

In some embodiments, the method further comprises receiving a first arcuate projection into the head of a tightening tool, with the first arcuate projection coupled with the first end of the elongated band, and receiving a second arcuate projection into the head of the tightening tool, with the second arcuate projection coupled with the second end of the elongated band, and rotating the head of the tightening tool to bias the first and second arcuate projections toward each other.

In some embodiments, the method further comprises surrounding the first and second pipe ends with a gasket, where surrounding the first and second pipe ends with the elongated band comprises surrounding the gasket with the elongated band, and where locking the locking mechanism comprises tightening the elongated band at least partially on the gasket.

In another aspect, a method of coupling a first and second pipe end is disclosed. The method comprises surrounding the first pipe end with a first circumferential portion of an elongated band, surrounding the second pipe end with a second circumferential portion of the elongated band, where the first and second circumferential portions of the elongated band are connected together by a plurality of transverse ties extending generally orthogonally to the elongated band, and where the first and second pipe ends are located adjacent to each other, and locking a locking mechanism that is coupled with the elongated band such that the elongated band tightens and thereby securely couples the adjacent first and second pipe ends. Locking the locking mechanism comprises inserting a first flexible tab through a first opening defined by a first channel, where the first flexible tab is coupled with a first end of the first circumferential portion of the elongated band and the first channel is coupled with a second end of the first circumferential portion of the elongated band that is opposite the first end of the first circumferential portion of the elongated band, receiving a first raised portion of the first flexible tab into a first slot defined by a first wall of the first channel thereby restricting movement of the first flexible tab out of the first channel, inserting a second flexible tab through a second opening defined by a second channel, where the second flexible tab is coupled with a first end of the second circumferential portion of the elongated band and the second channel is coupled with a second end of the second circumferential portion of the elongated band that is opposite the first end of the second circumferential portion of the elongated band, and receiving a second raised portion of the second flexible tab into a second slot defined by a second wall of the second channel thereby restricting movement of the second flexible tab out of the second channel.

In some embodiments, locking the locking mechanism further comprises flexing the first flexible tab and flexing the second flexible tab.

In some embodiments, the method further comprises receiving a first arcuate projection into the head of a tightening tool, where the first arcuate projection is coupled with the first or second end of the first circumferential portion of the elongated band, receiving a second arcuate projection into the head of the tightening tool, where the second arcuate projection is coupled with the first or second end of the second circumferential portion of the elongated band, and rotating the head of the tightening tool to bias the first and second arcuate projections toward each other.

In some embodiments, the method further comprises surrounding the first and second pipe ends with a gasket, where surrounding the first and second pipe ends with the elongated band comprises surrounding the gasket with the elongated band, and where locking the locking mechanism comprises tightening the elongated band at least partially on the gasket.

In another aspect, a gasket is disclosed. The gasket comprises a rounded sidewall defining a channel therethrough in a first direction, with the sidewall comprising a first sidewall portion having a first edge and a second edge that is opposite the first edge, the first and second edges extending generally in the first direction, and the first sidewall portion having a first thickness, and a first membrane section connecting the first edge to the second edge, the first membrane section extending generally in the first direction, and the first membrane section having a second thickness, with the second thickness less than the first thickness.

In some embodiments, the first sidewall portion further comprises a second membrane section extending generally in the first direction and having the second thickness.

In some embodiments, the first sidewall portion further comprises a third membrane section extending generally in the first direction and having the second thickness.

In some embodiments, the first sidewall portion further comprises a fourth membrane section extending generally in the first direction and having the second thickness.

In some embodiments, the first membrane section is configured to at least partially collapse to bring the first and second edges closer to each other.

In some embodiments, the first, second, third and fourth membrane sections are each configured to at least partially collapse.

In some embodiments, the rounded sidewall further comprises a first half having an outer end and an inner end, with the outer end defining a first opening of the channel and having a first width, a second half having an outer end and an inner end, with the outer end defining a second opening of the channel opposite the first end of the channel, and with the second end having a second width, with the inner ends of the first and second halves connected and having a third width, and with the third width less than the first and second widths.

In some embodiments, the first and second halves are frustoconical.

In some embodiments, the rounded sidewall further comprises a first half having an outer end and an inner end, with the outer end defining a first opening of the channel and having a first width, a second half having an outer end and an inner end, with the outer end defining a second opening of the channel opposite the first end of the channel, and with the second end having a second width, with the inner ends of the first and second halves connected and having a third width, and with the third width less than the first and second widths.

In some embodiments, the first and second halves are frustoconical.

In some embodiments, the membrane section comprises a first portion coupled with the first half of the sidewall and extending from the outer end of the first half to the inner end of the first half, with the first portion of the membrane wider at the outer end than at the inner end, and a second portion coupled with the second half of the sidewall and extending from the outer end of the second half to the inner end of the second half, with the second portion of the membrane wider at the outer end than at the inner end.

In some embodiments, the membrane section defines an inner gap facing the channel.

In some embodiments, the membrane section defines an outer gap on an outer surface of the sidewall.

In some embodiments, the membrane section defines an inner gap facing the channel and defines an outer gap on an outer surface of the sidewall.

In some embodiments, the membrane section is configured to collapse generally into a Z-shape.

In some embodiments, the membrane section comprises an edge configured to bias the membrane section to collapse into the Z-shape.

In some embodiments, the gasket further comprises a first end and a second end that is opposite the first end, with the first edge, the second edge and the membrane section extending from the first end to the second end.

In some embodiments, the membrane section is configured to collapse generally into a V-shape.

In some embodiments, the membrane section comprises an edge configured to bias the membrane section to collapse into the V-shape.

In some embodiments, the gasket further comprises a first end, a second end that is opposite the first end, and a circumferential ridge coupled with the sidewall and projecting into the channel in between the first and second ends.

In some embodiments, the circumferential ridge comprises a plurality of ridge portions interrupted and separated by the membrane section.

In some embodiments, the gasket further comprises a first end and a second end that is opposite the first end, with the first edge, the second edge and the membrane section extending from the first end to a location in between the first and second ends.

In some embodiments, the gasket further comprises a first end, a second end that is opposite the first end, and a circumferential ridge coupled with the sidewall and projecting into the channel in between the first and second ends.

In some embodiments, the first edge comprises first and second edge portions, with the second edge comprising first and second edge portions, with the first membrane section comprising first and second membrane portions, with the first edge portions and first membrane section extending from the first end toward the ridge, and with the second edge portions and second membrane section extending from the second end toward the ridge.

In some embodiments, the first edge portions and first membrane section extend from the first end to the ridge, and the second edge portions and second membrane section extend from the second end to the ridge.

In another aspect, a tool for closing two ends of a clamp is disclosed. The tool comprises a handle and a head coupled with the handle, with the head comprising a sidewall defining a cavity therein, with the cavity having a rounded portion configured to contact arcuate projections of the clamp, and where rotation of the head about the arcuate projections biases the two ends of the clamp substantially linearly towards each other.

In another aspect, a tool for closing two ends of a clamp is disclosed. The tool comprises a handle and a head coupled with the handle, with the head comprising an outer sidewall defining a cavity therein, with the cavity having a rounded portion configured to contact arcuate projections of the clamp, and an inner spiral wall coupled with the outer sidewall and occupying a portion of the cavity, where rotation of the head about the arcuate projections biases the two ends of the clamp substantially linearly towards each other.

In another aspect, an apparatus for coupling two adjacent pipe ends is disclosed. The apparatus comprises an elongated band having a first end and a second end opposite the first end, with the band configured to circumferentially surround the two adjacent pipe ends, and a locking mechanism coupled with the elongated band. The locking mechanism is configured to bring together the first and second ends of the band, with the locking mechanism further configured to tighten and lock the apparatus in a locked configuration about the two adjacent pipe ends. The locking mechanism comprises a latch having a first end and a second end, with the latch rotatably coupled near the first end of the latch with the first end of the band, with the latch further having a first projecting pin located near the second end of the latch, and the latch further having a curved side edge, and a locking projection coupled with the second end of the band, with the locking projection having a curved surface that is complementary to the curved side edge of the latch, and with the latch configured to rotate such that the latch securely engages the locking projection by contacting at least part of the curved side edge of the latch to the curved surface of the locking projection.

In another aspect, an apparatus for coupling two adjacent pipe ends is disclosed. The apparatus comprises an elongated band having a first end and a second end opposite the first end, with the band configured to circumferentially surround the two adjacent pipe ends, with the first end comprising at least one opening therethrough and the second end comprising at least one channel having a plurality of slots, a pin comprising a base coupled with a protrusion extending away from the base, with the protrusion configured to extend through the opening of the elongated band, a flexible elongated tab comprising a base portion and an extension portion opposite the base portion, with the base portion having an opening therethrough and the extension having a raised portion extending away from the base portion, and with the opening of the base portion configured to receive the protrusion of the pin therethrough, and a channel coupled with and extending away from the second end of the band, with the channel configured to receive the extension portion of the tab therethrough, and with the channel including a series of slots configured to receive therein the raised portion of the tab when the tab is inserted into the channel thereby restricting movement of the tab out of the channel.

In some embodiments, the second end of the band comprises at least one second opening therethrough, and the apparatus further comprises a second pin comprising a second base coupled with a second protrusion extending away from the second base, with the second protrusion configured to extend through the at least one second opening of the elongated band, a second flexible elongated tab comprising a second base portion and a second extension portion opposite the second base portion, with the second base portion having a second opening therethrough and the second extension having a second raised portion extending away from the second base portion, with the second opening of the second base portion configured to receive the second protrusion of the second pin therethrough, and a second channel coupled with and extending away from the first end of the band, with the second channel configured to receive the second extension portion of the second tab therethrough, and with the second channel including a series of second slots configured to receive therein the second raised portion of the second tab when the second tab is inserted into the second channel thereby restricting movement of the second tab out of the second channel.

In some embodiments, the first and second pins comprise first and second bases that are wider than the first and second openings of the elongated band.

In some embodiments, the elongated band comprises first and second raised corners that each include respectively the first and second openings of the elongated band.

In some embodiments, the elongated band and first and second channels are formed from a single piece of sheet metal.

In some embodiments, the elongated flexible tab is formed from sheet metal.

In another aspect, a tool for closing two ends of a clamp is disclosed. The tool comprises a tool head having a first end and a second end opposite the first end, with the tool head defining between the first and second ends an opening configured to receive therein a handle, a first sidewall having a first contour and located at the first end of the tool head, with the first sidewall defining a first cavity facing a first direction and configured to contact a first arcuate projection of the clamp, a second sidewall having a second contour and located at the second end of the tool head, with the second sidewall defining a second cavity facing a second direction opposite the first direction and configured to contact a second arcuate projection of the clamp, with the first and second contours of the first and second sidewalls configured such that rotation of the head about the first and second arcuate projections biases the two ends of the clamp substantially linearly towards each other.

In another aspect, an apparatus for coupling two adjacent pipe ends is disclosed. The apparatus comprises an elongated band having a first end and a second end opposite the first end, with the band configured to circumferentially surround the two adjacent pipe ends, with the first end of the band defining a plurality of slots therethrough, with the second end comprising a raised tab formed from the elongated band, and with the second end of the band configured to slide underneath the first end of the band such that the raised tab is received by at least one of the plurality of slots thereby restricting movement of the first end of the band relative to the second end of the band.

In some embodiments, the first end of the band defines a second plurality of slots therethrough, with the second end comprising a second raised tab formed from the elongated band, and with the second end of the band configured to slide underneath the first end of the band such that the second raised tab is received by at least one of the second plurality of slots thereby restricting movement of the first end of the band relative to the second end of the band.

In some embodiments, the apparatus further comprises a first gripping element coupled with and projecting away from the first end of the band, and a second gripping element coupled with and projecting away from the second end of the band, with the first and second gripping elements configured to be engaged by a tool such that rotation of the tool will bias the first and second ends of the band substantially linearly towards each other.

In some embodiments, the first gripping element is located on the first end of the band adjacent the plurality of slots, and the second gripping element is located on the second end of the band adjacent the raised tab.

In some embodiments, the first gripping element comprises a first arcuate projection and the second gripping element comprises a second arcuate projection.

In another aspect, a gasket is disclosed. The gasket comprises a rounded sidewall defining a channel therethrough in a first direction, the sidewall comprising a top end and a bottom end opposite the top end. The top and bottom ends each comprise a first sidewall portion having a first edge and a second edge that is opposite the first edge with an inner seal extending generally perpendicular to the first direction and at least partially between the first and second edges along an inner surface of the first sidewall portion, the first and second edges extending generally in the first direction, and the first sidewall portion having a first thickness The top and bottom ends further each comprise a first membrane section connecting the first edge to the second edge, the first membrane section extending generally in the first direction, and the first membrane section having a second thickness, wherein the second thickness is less than the first thickness.

In some embodiments, the first membrane section of the top end is rotated angularly about the first direction with respect to the first membrane section of the bottom end. In some embodiments, the inner seal comprising a first inner seal portion and a second inner seal portion, the first and second inner seal portions extending parallel to each other and generally perpendicular to the first direction and at least partially between the first and second edges along the inner surface of the first sidewall portion. In some embodiments, the first sidewall portion further comprising a second, a third, and a fourth membrane section, wherein each of the membrane sections extends generally in the first direction, wherein each of the membrane sections connects opposing edges of the first sidewall portion, wherein each of the membrane sections has the second thickness, and wherein the inner seal extends between each of the membrane sections inner surfaces of the first sidewall portion. In some embodiments, the first membrane section configured to at least partially collapse to bring the first and second edges closer to each other. In some embodiments, the first, second, third and fourth membrane sections configured to at least partially collapse to bring opposing edges closer to each other. In some embodiments, the rounded sidewall further comprises a first half having a first outer end and a first inner end, the first outer end defining a first opening of the channel and having a first width; and a second half having a second outer end and a second inner end, the second outer end defining a second opening of the channel opposite the first end of the channel, the second end having a second width, wherein the first and second inner ends are connected at a middle portion having a third width, and wherein the third width is less than each of the first and second widths. In some embodiments, the first and second halves are frustoconical. In some embodiments, the rounded sidewall further comprises a first half having a first outer end and a first inner end, the first outer end defining a first opening of the channel and having a first width; a second half having a second outer end and a second inner end, the second outer end defining a second opening of the channel opposite the first end of the channel, the second end having a second width, wherein the first and second inner ends are connected at a middle portion having a third width, and wherein the third width is less than each of the first and second widths. In some embodiments, the membrane section comprises a first portion coupled with the first half of the sidewall and extending from the first outer end of the first half to the first inner end of the first half, wherein the first portion of the membrane is wider at the first outer end than at the first inner end; and a second portion coupled with the second half of the sidewall and extending from the second outer end of the second half to the second inner end of the second half, wherein the second portion of the membrane is wider at the second outer end than at the second inner end. In some embodiments, the membrane section is configured to collapse generally into a Z-shape. In some embodiments, the membrane section is configured to collapse generally into a V-shape. In some embodiments, the gasket further comprises a first end; a second end that is opposite the first end; and a circumferential ridge coupled with the sidewall and projecting into the channel in between the first and second ends. The circumferential ridge may comprise a plurality of ridge portions interrupted and separated by the membrane section or sections. In some embodiments, the gasket further comprises a first end; and a second end that is opposite the first end, wherein the first edge, the second edge and the membrane section extend from the first end to a location in between the first and second ends. In some embodiments, the first edge comprises first and second edge portions, wherein the second edge comprises third and fourth edge portions, wherein the first membrane section comprises first and second membrane portions, wherein the first and third edge portions and the first membrane portion each extend from the first end of the gasket toward the ridge, and wherein the second and fourth edge portions and second membrane portion each extend from the second end of the gasket toward the ridge. In some embodiments, the first and third edge portions and the first membrane portion each extend from the first end of the gasket to the ridge, and wherein the second and fourth edge portions and second membrane portion each extend from the second end of the gasket to the ridge. In some embodiments, the first membrane section of the top end is rotated angularly forty-five degrees about the first direction with respect to the first membrane section of the bottom end.

In another aspect, a system for connecting two pipe ends is disclosed. The system comprises a gasket and a clamp. The gasket is configured to be placed over the two pipe ends, the gasket having a rounded sidewall defining a channel therethrough in a first direction, the sidewall comprising a top end and a bottom end opposite the top end. The top and bottom ends each comprise a first sidewall portion having a first edge and a second edge that is opposite the first edge with an inner seal extending generally perpendicular to the first direction and at least partially between the first and second edges along an inner surface of the first sidewall portion, the first and second edges extending generally in the first direction, and the first sidewall portion having a first thickness; and a first membrane section connecting the first edge to the second edge, the first membrane section extending generally in the first direction, and the first membrane section having a second thickness, wherein the second thickness is less than the first thickness. The clamp has a locking mechanism, the locking mechanism configured to be locked to secure the clamp over the gasket.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

FIG. 7A is a perspective view of an embodiment of a tool that may be used with various embodiments of the clamps described herein.

FIGS. 7B and 7C perspective views of embodiments of a tool head that may be used with the tool of FIG. 7A.

FIG. 9 is a top view of another embodiment of a locking mechanism.

FIG. 9A is a perspective view of a projection of the locking mechanism of FIG. 9.

FIG. 12G is a perspective view of an embodiment of an assembly of the band of FIGS. 12A-12B, the tab of FIGS. 12C-12D and the pin of FIG. 12E engaged by the tool of FIG. 12F.

FIGS. 14A-14E are various views of another embodiment of a gasket having a collapsible membrane section with an inner wedge.

FIGS. 15A-15B are top and cross-section views respectively of another embodiment of a gasket having outwardly tapered ends.

FIGS. 16A-16D are various views of another embodiment of a gasket having an inner seal and outwardly tapered ends.

FIGS. 17A-17D are various views of another embodiment of a gasket having a scalloped portion and outwardly tapered ends.

FIGS. 18A-18D are various views of another embodiment of a gasket having an outer seal.

FIGS. 19A-19D are various views of another embodiment of a gasket having radial bulges and an inner seal.

FIGS. 22-22G are various views of another embodiments of a gasket having a collapsible sidewall with tapered wedges.

DETAILED DESCRIPTION

Figure 1:
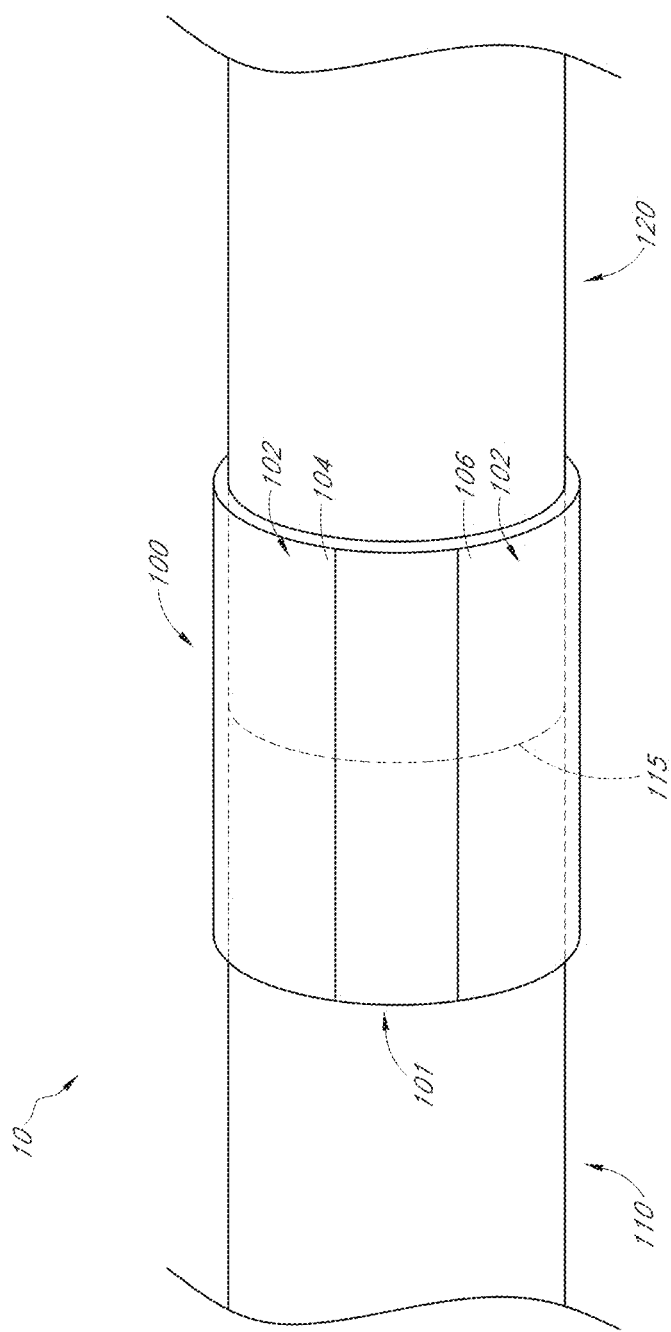
FIG. 1 is a perspective view of an embodiment of an assembly of a clamp and two pipe ends.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Systems, devices and methods for a no hub clamp are described which may be used to couple two abutting pipes together. A collapsible gasket may be used. The gasket may have ends with oversized widths to assist with installation of the gasket over the pipe ends. The gasket may have a wall having sections of thin membrane that collapse when the clamp is tightened over the gasket. The clamp may have a band with a connecting mechanism on either end of the band for convenient locking together of the ends of the band about the pipes. The band may be an extended, bendable material. The band may also be two narrower, elongated sub-bands connected together in between by flexible connecting elements such as transverse ties. The connecting or locking mechanism can have a protruding tab with a projection or lip that snaps in an edge of the opposite end of the band. The connecting mechanism may have tunnels through which flexible members are received. The band may have slots on one end, such is in the tunnels or in the band, that receive a complementary tab or projection on the other end of the band, such as in the flexible members or in the band, to secure the two ends of the band together. The bands may further have gripping projections that assist with closing and securing the clamp. The bands and connecting mechanism features may be manufactured from inexpensive materials and processes, for example with sheet metal and stamping or pressing processes. Further, the various connecting mechanisms may be locked using a tool that fits the particular connecting mechanism features, such as the gripping projections. The tool and gripping projections may be configured such that applying a torque to the tool translates the two ends of the band substantially linearly toward each other. Therefore, simple, easy to use, and inexpensively-manufactured clamps and associated components are disclosed that simplify and reduce the costs associated with connecting pipe ends while providing reliable and durable seals and connections.

The various clamps, pipes, gaskets, tools and methods described herein may be used as particularly described or in other suitable manners. For instance, the clamps and gaskets described herein may be used with each other in combinations other than those explicitly described. Thus, the description of a particular clamp with a particular gasket is not meant to be limiting the usage of that particular clamp with that particular gasket. The clamps described herein may be used with any of the gaskets described herein or with other gaskets not described herein. Similarly, the gaskets described herein may be used with any of the clamps described herein or with other clamps or devices not described herein.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

FIG. 1 is a perspective view of an assembly 10 of a clamp 100 securing a first pipe 110 with a second pipe 120. The pipes 110, 120 may be circular, metallic pipes used in a variety of contexts. For example, the pipes 110, 120 may be used for plumbing or for other fluid transportation purposes. The pipes 110, 120 may have other cross-section shapes beside circular and/or be formed of other materials. In some embodiments, the pipes 110, 120 may be other fluid-conveying members besides pipes, including but not limited to tubes such as automotive or engine tubes or lines, flexible tubes, channels, and the like. The pipes 110, 120 may meet at an interface 115. The interface 115 may be a location where the first pipe 110 abuts the second pipe 120. The interface 115 is shown in dashed line because it is underneath the clamp 100. The interface 115 may include other features located in between the two adjacent ends of the pipes 110, 120, for example a gasket or portions thereof. Therefore, the embodiment of the assembly 10 shown is exemplary only.

The clamp 100 may surround the two ends of the pipes 110, 120. The clamp 100 may have a generally circular or otherwise rounded shape configured to surround and conform to a contour or contours of the outer surfaces of the pipes 110, 120, and/or to other features in between the clamp 100 and the pipes 110, 120. Although described primarily herein as having a generally circular or otherwise rounded shape, the clamp 100 may have other shapes to conform to non-circular or non-rounded shapes or segments of the pipes 110, 120. Portions of the outer surfaces of the pipes 110, 120 are shown in dashed line underneath the clamp 100 for clarity. As is discussed in further detail below, other features or structures may be located in between the clamp 100 and the outer surfaces of the two pipes 110, 120. For example, there may be a gasket or other types of seals in between the clamp 100 and the two pipes 110, 120.

The clamp 100 may include an elongated band 102. The elongated band 102 may be a main body of the clamp. The band 102 may extend around the ends of the two pipes 110, 120. The band 102 may be elongated circumferentially around the pipes 110, 120. In some embodiments, the length of the band 102 in the direction of elongation is longer than the width of the band 102. The band 102 may be formed from a metallic material. In some embodiments, the band 102 is stainless steel. The band 102 may be formed from a variety of other suitable materials as well, whether metallic or otherwise, or combinations thereof. Therefore, the band 102 may be formed from a variety of materials, having varying degrees of rigidity, flexibility, etc.

The band 102 may include a first end 104 and a second end 106. The first end 104 is located opposite the second end 106. The first end 104 may refer to a region on the end of the band 102. Therefore, the first end 104 may not only be confined to an edge or other narrow portion of that end of the band 102. The first end 104 may thus be a region that includes an edge as well as some inner region or portion of the band 102. The second end 106 may the same or similar features as the first end 104.

The clamp 100 may include a locking mechanism 101. The locking mechanism 101 may lock or otherwise secure the two ends 104, 106 together. The locking mechanism 101 may be used to bring together the two ends 104, 106 of the clamp 102 and tighten the clamp 100 onto the two pipes 110, 120, which may be at or near the interface 115. The locking mechanism 101 may be located between the first end 104 and the second end 106. As shown, the locking mechanism 101 may be coupled with the first end 104 and the second end 106. The locking mechanism 101 may therefore connect the first end 104 to the second end 106. As is further discussed in detail below, the locking mechanism 101 may be adjustable so that the clamp 100 can accommodate various sizes and/or shapes of pipes 110, 120. The locking mechanism 101 may have a substantially shorter length as compared to that of the band 102. In some embodiments, the length of the locking mechanism 101 may be longer. Further, the locking mechanism 101 may have a width similar to that of the band 102. In some embodiments, the locking mechanism 101 may be narrower or wider than that of the band 102.

Figure 2B:
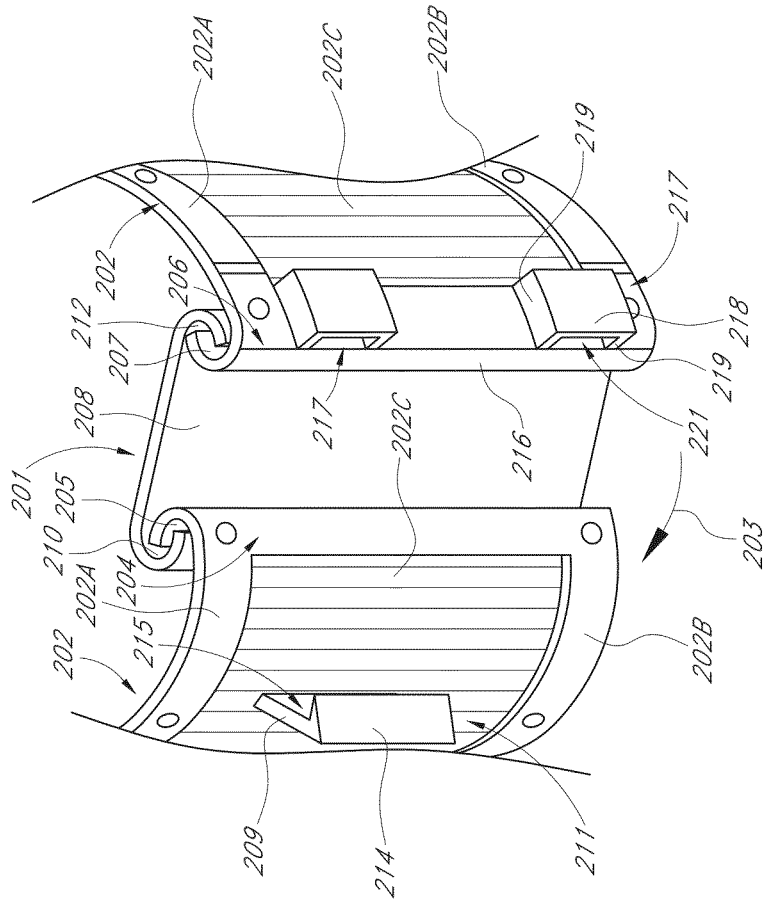
FIG. 2B is a detail view of the locking mechanism of FIG. 2A.

FIGS. 2A through 2F depict various views of various embodiments of a clamp 200 having a locking mechanism 201. FIG. 2G depicts an embodiment of a tool 230 that may be used with various embodiments of the clamps described herein, such as the clamp 200, as is discussed in further detail below.

Figure 2A:
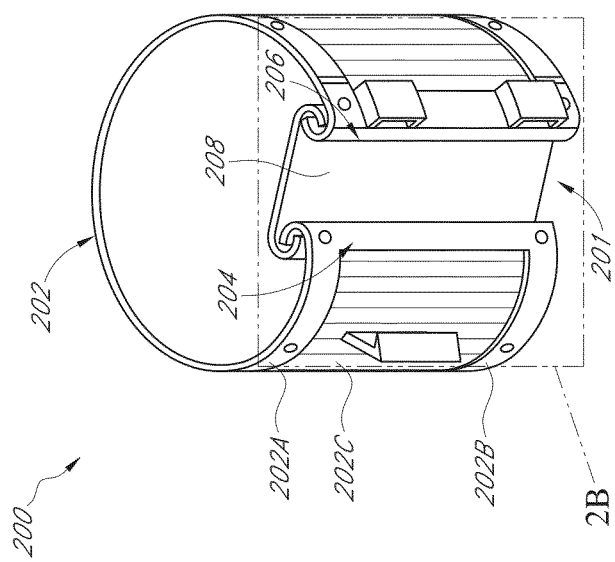
FIG. 2A is a perspective view of an embodiment of a clamp having a locking mechanism.

As shown in FIG. 2A, the clamp 200 may have a locking mechanism 201 connecting a first end 204 of an elongated band 202 to a second end 206 of the elongated band 202. The first end 204 may be located on the opposite end of the band 202 as that of the second end 206. The band 202 may have the same or similar features as other bands described herein, for example the elongated band 102. The locking mechanism 201 may have the same or similar features as other locking mechanisms described herein, for example the locking mechanism 101.

As shown, the band 202 may be generally circular or otherwise rounded. The band 202 may include a first edge portion 202A and a second edge portion 202B. The edge portions 202A, 202B may extend circumferentially along two edges of the band 202. The edge portions 202A, 202B may be solid portions of the band 202. The edge portions 202A, 202B may be directly connected at one or both of the ends 204, 206 by a transverse extension of either or both of the edge portions 202A, 202B.

The band 202 may include a middle portion 202C. The middle portion 202C may extend circumferentially along the band 202 and connect the two edge portions 202A, 202B to each other. The middle portion 202C may include a series of slots. The slots may extend transversely with respect to the length of the band 202. The middle portion 202C may provide increased flexibility to the band 202. In some embodiments, the middle portion 202C may be composed of a multitude of smaller bar elements. In some embodiments, the middle portion 202C may be formed from a multitude of bar elements, either spaced or touching, extending transversely and connecting the first edge portion 202A to the second edge portion 202B.

The clamp 200 may include a connector 208. The connector 208 may connect the two ends 204, 206 of the band 202. The connector 208 may be rotatably connected to the two ends 204, 206 as discussed in further detail below. The connector 208 may be a planar solid sheet of material such as metal or other suitable materials.

FIG. 2B is a detail view of the clamp 200 of the region indicated by detail 2B as shown in FIG. 2A. As shown in FIG. 2B, the connector 208 may have a first end 210 and a second end 212 that is opposite the first end 210. The first and second ends 210, 212 may be rounded so as to provide a rotatable or hinged connection with the band 202. As shown, the band 202 may have a corresponding rounded portion 205 at the first end 204 and a corresponding rounded portion 207 at the second end 206. The rounded portion 205 may rotatably connect with the first end 210 of the connector 208. The rounded portion 207 of the second end 206 may rotatably connect with the second end 212 of the connector 208. The configuration shown is merely one example and other rotatable or hinged connected interfaces between the connector 208 and the ends 204, 206 of the band 202 may be implemented. The rotatable interfaces allow for the ends 204, 206 of the band 202 to rotate relative to the ends 210, 212 of the connector 208. This allows for example for the second end 206 of the band 202 to be brought closer to and rotated over the second end 204 of the band 202 in the direction indicated by the arrow 203. In some embodiments, the axis of rotation may be along the interface between the rounded portion 205 and the first end 210 of the connector 208. For example, the second end 206 may be rotated about the first end 204 to bring the second end 206 closer to features, such as a flexible tab 211, located on or near the first end 204.

The locking mechanism 201 may include the flexible tab 211 on the first end 204 and an edge 216 on the second end 206. In some embodiments, the edge 216 may be moved, for example rotated with the second end 206 as described above, to the flexible tab 211 such that the edge 216 snaps into place with the flexible tab 211. The flexible tab 211 may secure the edge 216 thereby locking or otherwise securing the clamp 200.

The flexible tab 211 may include a projection 209. The projection 209 may be coupled with the band 202. As shown, the projection 209 may be coupled with the first end 204 of the band 202. The projection 209 may be coupled with and extend away from the middle portion 202C of the band 202. The projection 209 may be located centrally with respect to the outer edges 202A, 202B. However, the projection 209 may be in a variety of locations, such as off-center or located on the first or second edge portions 202A, 202B. In some embodiments, the projection 209 may extend or project substantially orthogonally from that portion of the first end 204 to which it is connected. The projection 209 may be a substantially flat member. In some embodiments, the projection 209 is rectangular. The projection 209 may be formed from a variety of suitable materials, such as metal or other rigid materials. However, the flexible tab 211 can flex or otherwise deflect away from first end 204 in order to lock with a complementary locking feature on the second end 206. For instance, the flexible tab 211 may flex or deflect in order to secure the tab 211 with the edge 216.

The flexible tab 211 may also include a lip 214. The lip 214 may extend or project away from an end of the projection 209. The lip 214 may have a triangular cross section. However, other shapes that are suitable may be implemented. As shown, the lip 214 may project away from an end of the projection 209 that is opposite the end of the projection 209 that is connected to the band 202. The lip 214 may extend towards the second end 206 of the band 202. The lip 214 may have a length that is same or similar as a width of the projection 209. As shown, the lip 214 has the same length as the width of the projection 209.

The lip 214 and the projection 209 of the flexible tab 211 may define a receiving space 215. The receiving space 215 may be a region underneath the lip 214 and adjacent the projection 209. The receiving space 215 may be configured to receive the edge 216. For example, the edge 216 may be brought on top of the lip 214 which may be an angled surface. By pushing down on the lip 214 with the edge 216, the flexible tab 211, for example, the projection 209, may flex in a direction away from the first end 204 to receive the edge 216 in the receiving space 215. The flexible tab 211 may then flex or deflect back toward the first end 204 once the edge 216 is within the receiving space 215. Thus, the lip 214 may now securely keep the edge 216 within the receiving space 215.

The clamp 200 may include various features to facilitate with closing the clamp 200 and locking the locking mechanism 201. As shown in FIG. 2B, the clamp 200 may include a tunnel 217. There may be two tunnels 217 as shown. There may be a tunnel 217 located at the second end 206 near the second edge portion 202B and another tunnel 217 located at the second end near the first edge portion 202A. This is merely an example and more or fewer tunnels 217 may be implemented and in a variety of locations at the second end 206.

The tunnel 217 may include sidewalls 219 connected by a top member 218. The sidewalls 219 may project away from the second end 206 and be connected by the top member 218. The sidewalls 219 and the top member 218 may be a single, monolithic piece of material. The tunnel 217 may therefore be formed from a single piece of material that defines the sidewalls 219 and the top member 218. In some embodiments, the tunnel 217 is formed from metal and is substantially rigid such that it will not deflect.

The tunnel 217 may define an opening 221. The opening 221 as shown may be defined by the sidewalls 219 and the top member 218. The opening 221 may be a space configured to receive a tool therein. For instance, a tool having a corresponding shape may be inserted into the opening 221 in order to facilitate with closing the clamp 200. In some embodiments, a prong or other feature of a tool may be inserted into each of the openings 221 of the tunnels 217 to bring the second end 206 to the first end 204 and secure the edge 216 with the flexible tab 211. While the tunnels 217 are shown having a generally square or rectangular shape, other suitable shapes may be implemented. A tool may then have a corresponding shape. Further detail of the tools that may be used are discussed below, for example, with respect to FIG. 2G.

Figure 2C:
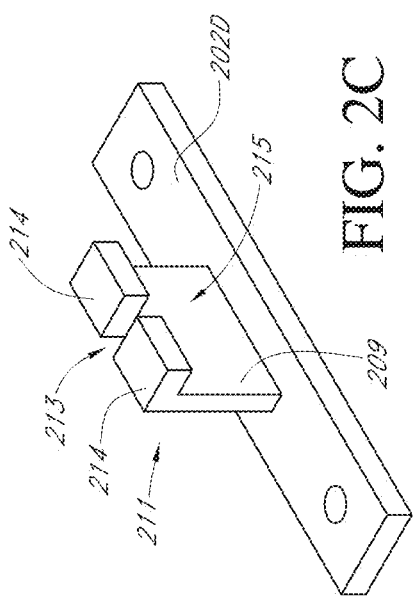
FIG. 2C is a perspective view of a tab that may be used with the locking mechanism of FIGS. 2A-2B.

FIG. 2C depicts an embodiment of the flexible tab 211 that may be used with the clamp 200. As shown, the flexible tab 211 may include the projection 209 connected to two of the lips 214. The two lips 214 may be separated such that they form a space 213 in between the two lips 214. The two lips 214 may be narrower than embodiments having only a single lip 214. The smaller or narrower lips 214 may facilitate locking the mechanism by making the lips 214 more flexible such that the locking mechanism 201 may be locked using less force. The receiving space 215 may therefore be located underneath each of the lips 214 adjacent to the projection 209.

As further shown, the projection 209 may be connected to a movable bar 202D. The bar 202D may be rigidly connected to the projection 209. The bar 202D may be moved along the length of a band of a clamp, such as along the length of the band 202 of the clamp 200 shown in FIGS. 2A-2B. By moving the bar 202D the location of the flexible tab 211 may be adjusted. For example, the bar 202D may be located closer to the first end 204 in order to provide a more snug fit with the edge 216 in the locked configuration. Similarly, the bar 202D may be moved farther from the first end 204 to provide a less snug fit with the edge 216 in the locked configuration. The bar 202D may be connected to the band 202 and a variety of suitable ways, for example by being fastened.

Figure 2D:
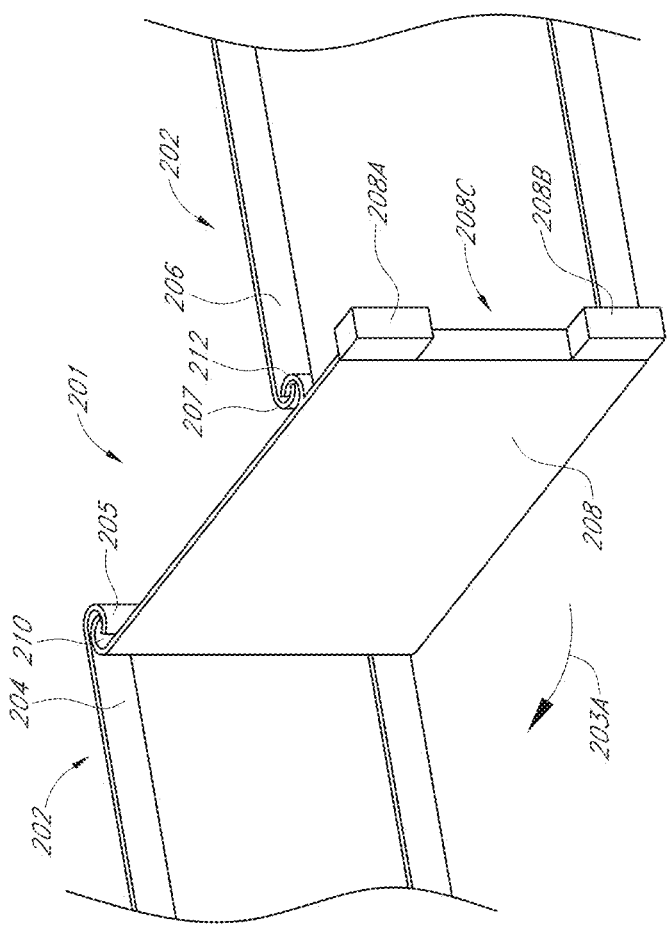
FIG. 2D is a perspective view of another embodiment of a locking mechanism that may be used with the clamp of FIG. 2A.

FIG. 2D depicts an embodiment of the locking mechanism 201 having an extended connector 208. As shown, the connector 208 may be connected on the first end 210 with the portion 205 of the first end 204 of the band 202, as discussed above. The opposite end of the connector 208 may be extended beyond the interface between the end 212 and the portion 207 of the second end 206 of the band 202. As shown, and extension of the connector 208 may include a first raised nub 208A and/or a second raised nub 208B. In embodiments with both nubs 208A, 208B, a cavity 208C may be defined therebetween. The cavity 208C may be sized to fit the flexible tab 211.

In some embodiments, the connector 208 may be rotated in the direction 203A as shown to bring the cavity 208C into a locked or snapped configuration with the flexible tab 211. The cavity 208C may be received by the receiving space 215 of the flexible tab 211. The first and second raised nubs 208A, 208B in the locked configuration may rest on either side of the flexible tab 211. This configuration may provide resistance to relative lateral movement between the two ends 204, 206 of the band 202. In some embodiments, the first and second raised nubs 208A, 208B may produce a friction or interference fit with the sides of the projection 209 of the flexible tab 211 in the locked configuration. The portion of the connector 208 on the end in between the first and second raised nubs 208A, 208B may be an edge similar to the edge 216 described above.

Figure 2F:
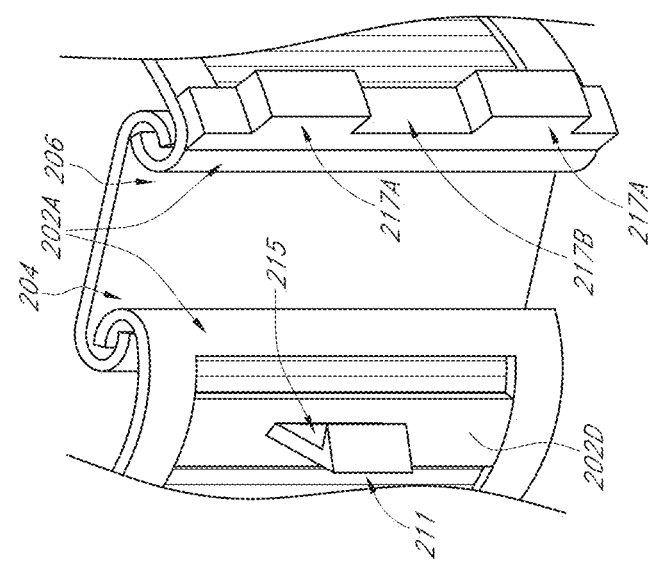
FIG. 2F is a detail view of the locking mechanism of FIG. 2E
Figure 2E:
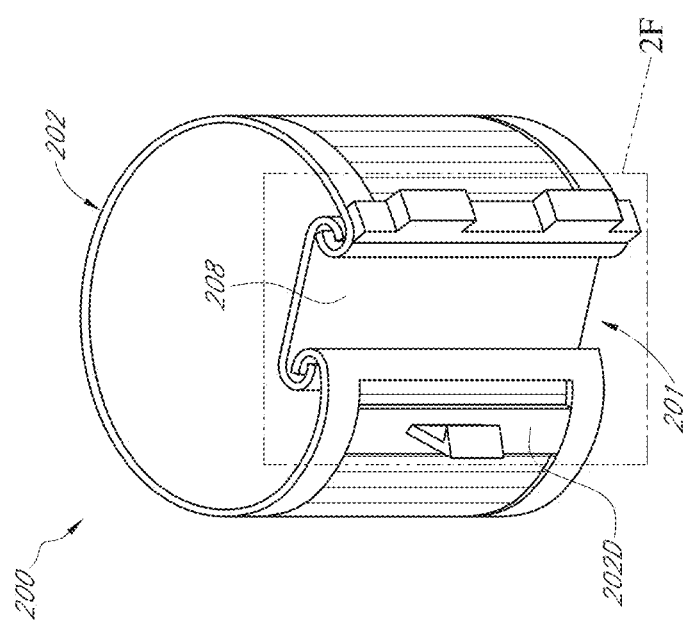
FIG. 2E is a perspective view of another embodiment of a clamp having a locking mechanism.
Figure 2G:
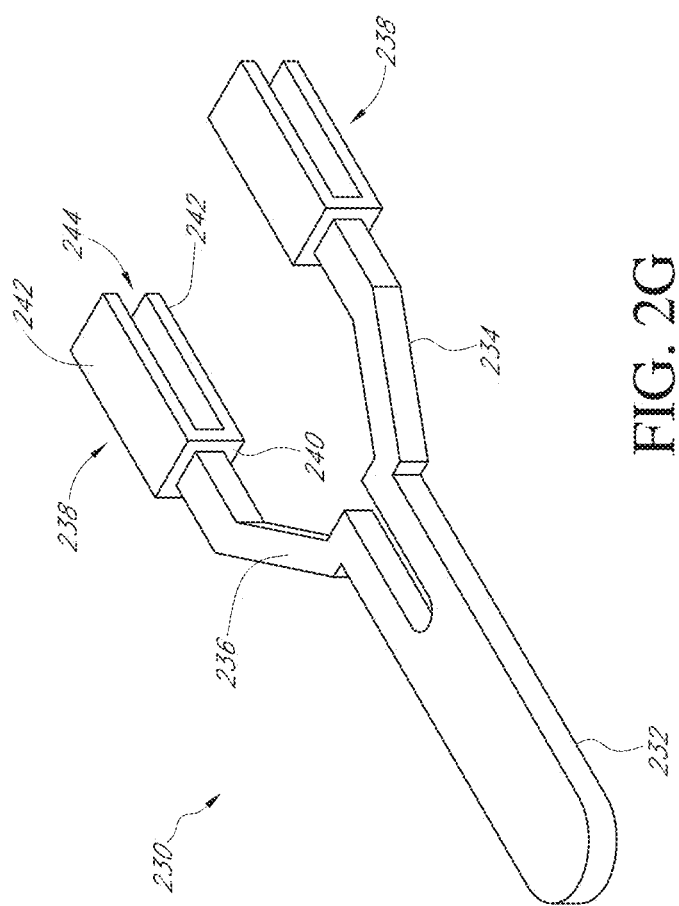
FIG. 2G is a perspective view of an embodiment of a tool that may be used with various embodiments of the clamps described herein.

FIG. 2E depicts another embodiment of the clamp 200 having the elongated band 202 with the locking mechanism 201. FIG. 2F shows a detailed view of the region 2F as indicated in FIG. 2E. As shown in FIG. 2E, the elongated band 202 may be connected by the connector 208. The first end 204 of the band 202 may include the bar 202D (as described with respect to FIG. 2C, for example) adjustably positioned on the outside of the band 202.

As shown in FIG. 2F, the bar 202D may include the flexible tab 211 defining the receiving space 215. The complementary locking feature of the band 202 may include the extensions 217A defining a cavity 217B there between. As shown, the extensions 217A may be extensions of the band 202. In some embodiments, the extensions 217A are solid metallic extensions coupled to or otherwise connected to the second end 206 of the band 202, where the outer edge portion 202A extends to meet the opposite outer edge portion 202A. In some embodiments, the extensions 217A and the cavity 217B formed there between may be similar to the first and second raised nubs 208A, 208B and the cavity 208C formed there between as discussed with respect to FIG. 2D. The extensions 217A and the cavity 217B there between, may interface with and lock to the flexible tab 211. The receiving space 215 of the flexible tab 211 may receive the cavity 217B thereby locking or otherwise securing the ends of the band 202.

FIG. 2G depicts a perspective view of an embodiment of a tool 230 that may be used with the various clamp embodiments described herein, such as the clamp 200. The tool 230 may be used to facilitate closing and locking the clamp 200. As shown, the tool 230 may include a handle 232. The handle 232 may be an elongated portion of the tool 230 configured to be grasped by the hand of a user. The handle 232 may be formed from metal or other rigid materials. The tool 230 may include a first prong 234 and a second prong 236 connected to the handle 232. The first and second prongs 234, 236 may split apart as shown. However there need not be a space in between the prongs 234, 236 such that they may be connected in between. The prongs 234, 236 may be formed from the same or similar materials as the handle 232.

The tool 230 may include a grabber 238. As shown, there may be two grabbers 238. The grabbers 238 may be connected to the ends of the two prongs 234, 236. The grabber 238 may facilitate or otherwise assist with positioning the tool 230 with the clamp 200 in order to close and secure the clamp 200 in the locked configuration. The grabber 238 may include a base 240 connected to two extensions 242. The base 240 may be connected to the end of the prongs 234, 236. The extensions 242 may extend from the base 240 in a direction away from the handle. As shown, the extensions 242 may be flat or substantially planar surfaces defining a space 244 there between. The extensions 242 may be square or rectangular in shape or other suitable shapes. Therefore, this space 244 may likewise be square or rectangular or other suitable shapes depending on the shape of the extensions 242.

The extensions 242, the space 244 and/or the base 240 of one of the grabbers 238 may interface with corresponding features of the clamp 200. For instance, one of the extensions 242 of one of the grabbers 238 may be inserted into the channel 221 defined by one of the tunnels 217 of the clamp 200, with the other extension 242 of the same grabber 238 placed over the top member 218 of that same tunnel 217 (for example, the clamp 200 as described with respect to FIG. 2B). The other grabber 238 may be similarly interfaced with the other tunnel 217 of the clamp 200. With the two grabbers 238 inserted into the respective channels 221 of the respective tunnels 217, the tool 230 may be pushed, rotated, or otherwise moved toward the first end 204 of the clamp 200. The respective bases 240 may contact the ends of the sidewalls 219 and/or top member 218 of the respective tunnel 217 to bias the second end 206 toward the first end 204. In this manner, a user may have leverage with the tool 230 in securing the clamp 200 in the locked configuration. The grabbers 238 may be in the same or similar plane as the handle 232. In some embodiments, the grabbers 238 may be out of plane with the handle 232. This may provide further leverage for a user of the tool 230. In some embodiments, the handle 232 may be out of plane and or angled with respect to the orientation of the grabbers 238. These are merely some examples and other suitable configurations may be implemented.

Figure 3:
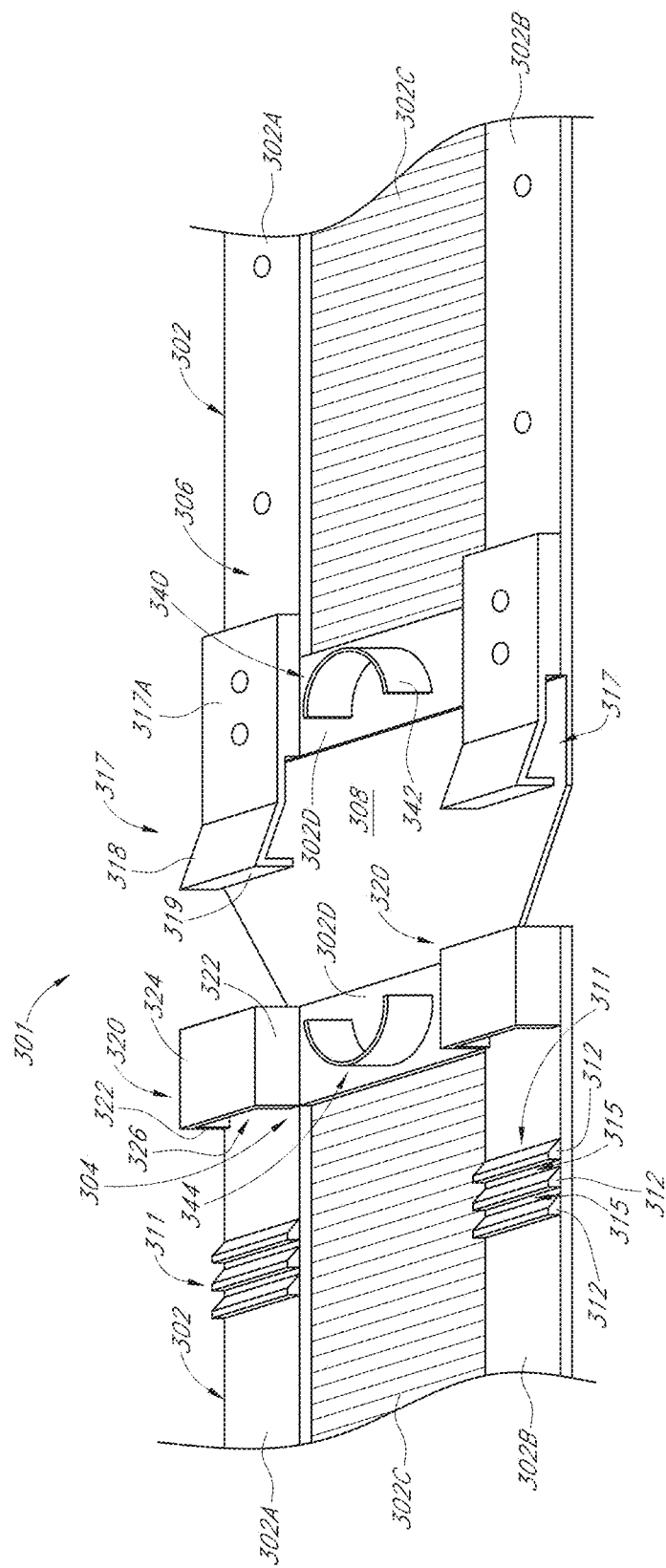
FIG. 3 is a perspective view of another embodiment of a locking mechanism that may be used with the various clamps described herein.

FIG. 3 depicts an embodiment of a locking mechanism 301 for securing the first end 304 and second end 306 of a band 302. The band 302 is only partially shown, for clarity. The band 302 may have the same or similar features as other bands described herein. For instance, the band may include a first outer edge portion 302A and a second outer edge portion 302B, which may be connected by a middle portion 302C. The outer edge portions 302A, 302B may also be directly connected at the ends 304, 306 by a lateral edge portion 302D that extends between the outer edge portions. The outer edge portions 302A, 302B may be solid portions of the band 302 and the middle portion 302C may provide increased flexibility to the band.

The locking mechanism 301 may have the same or similar features as other locking mechanisms described herein. The locking mechanism 301 may employ a flexible elongated tab 317 extending away from the first end 306 of the band 302. As shown, there may be two tabs 317. The tab 317 may include a base 317A which is coupled to the band 302. The base 317A may be coupled to an outer edge portion 302A, 302B of the band 302. The tab 317 may be coupled with a lip 319 extending away from an end of the tab. The tab 317 may further include a portion 318, which may be upwardly bent as shown, coupling the base 317A to the lip 319. In some embodiments, the base 317A, the portion 318, and the lip 319 may be formed from the same, monolithic piece of material.

One or more channels 320 may be coupled with and extending away from the second end 304 of the band 302 for receiving the tab or tabs 317. As shown, there may be two channels 320. The channel 320 may include one or more sidewalls 322 connected by a top member 324. As shown there may be two sidewalls 322. The sidewalls 322 may project away from the second end 304 and be connected by the top member 324. The sidewalls 322 and the top member 324 may be a single, monolithic piece of material. The channel 320 may define an opening 326, defined by the sidewalls 322 and/or the top member 324. The opening 326 may be a space configured to receive the tab 317. The band 302 may be manufactured with the tab 317 already inserted into the channel 320.

The second end 304 may also include a stop 311, positioned near the channel 320 and coupled with and extending away from the band 302. The stop 311 may extend, for example be angled, in a direction away from the channel 320.

The lip 319 of the tab 317 may engage the stop 311 and restrict the tab from moving out of the channel 320 when in the locked configuration. There may be a plurality of stops 312 such that a plurality of grooves 315 are defined between the stops 312, each configured to receive the lip 319 when in the locked configuration. The portion 318 of the tab 317 may be upwardly bent as shown for further restricting the movement of the tab 317 from moving out of the channel 320 when in the locked configuration.

The locking mechanism 301 may include more than one stop 311, tab 317, and channel 320. For example, the locking mechanism may include one stop 311, tab 317, and channel 320 coupled to the first edge portion 302A of the band 302 and another stop, tab, and channel coupled to the second edge portion 302B of the band, as shown. The stops 311, tabs 317, and channels 320 may be positioned directly across from each other with the middle portion 302C in between. All the stops 311, tabs 317, and channels 320 may have the same or similar features as discussed above. For instance, all the tabs 317 may be coupled with lips 319 for engaging stops 312.

The band 302 may also include an extended portion 308 that extends from the second end 306 of the band. The extended portion 308 may extend beyond the tab 317 and lip 319. The extended portion 308 may be coupled to or made integral with the second end 306. The lip 319 may extend toward the extended portion 308 without contacting the surface of the extended portion when in an unbiased state. The extended portion 308 may be a flat planar surface that slides below the second end 304 when in the locked configuration.

The band 302 may include a first gripping element 340 on the first end 306 of the band and a second gripping element 344 on the second end 304 of the band. The gripping elements 340, 44 may facilitate closure, tightening and/or locking of the band 302 about a pipe or pipe. Each gripping element 340, 344 may include an arcuate projection 342 coupled with and extending away from the lateral edge portion 302D of each end 304, 306 of the band 302. The arcuate projections 342 may be configured for gripping with a tool to facilitate tightening and locking the band. Further detail of the tools that may be used are discussed below, for example with respect to FIGS. 5A-5B.

FIGS. 4A through 4E depict various views of an embodiment of another locking mechanism 401 for securing the first end 404 and second end 406 of a band 402 that may be used with a clamp. The band 402 may have the same or similar features as other bands described herein, such as the band 102, 202 or 302. The band 402 may include a first edge portion 402A and a second edge portion 402B, which may be connected by a middle portion 402C. The outer edge portions 402A, 402B may also be directly connected at the ends 404, 406 by a lateral edge portion that extends between the outer edge portions 402A, 402B. The edge portions 402A, 402B may be solid portions of the band 402. The middle portion 402C may provide increased flexibility to the band. The second end 406 of the band 402 may include an extended portion 408 which is able to slide under the first end 404, for example when the locking mechanism 401 is being secured or is in the locked configuration.

The locking mechanism 401 may have the same or similar features as other locking mechanisms described herein, such as the locking mechanism 101, 201 or 301. The locking mechanism 401 may employ a flexible elongated tab 417 extending away from the second end 406 of the band 402. The tab 417 may include a base 417A which is coupled with the band 402. The base 417A may be coupled to an outer edge portion 402A, 402B of the band 402.

The tab 417 may include a raised portion 427 on its outer surface. The raised portion 427 may include an angled surface 421 that extends upward and in the direction that is toward the base 417A of the tab 417. The raised portion 427 may be integral with the rest of the tab 417. The tab 417 may further include an end portion 418, which may be flat. The end portion 418 may be in the same plane as the base 417A and extending beyond the raised portion 427 away from the second end 406 of the band 402. The tab 417 may also include a lip 419 coupled to and extending away from the end portion 418 of the tab.

Figure 4A:
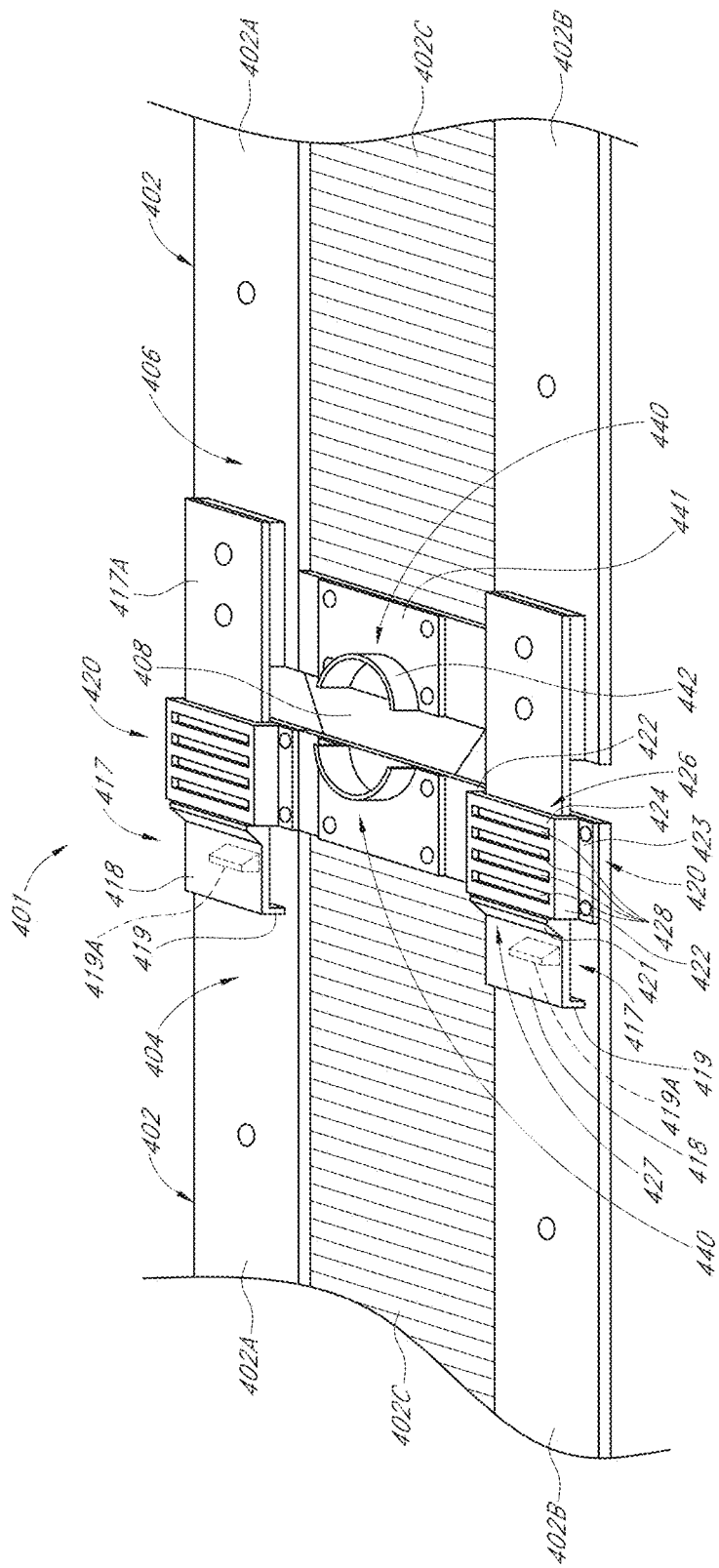
FIG. 4A is a perspective view of another embodiment of a locking mechanism that may be used with the various clamps described herein.

A channel 420 may be coupled with and extending away from the first end 404 of the band 402. As shown in FIG. 4A, the locking mechanism 401 may include two channels 420. The channel 420 is also shown in isolation in FIG. 4C. The channel 420 may receive the tab 417. The channel 420 may include sidewalls 422 connected by a top member 424. The sidewalls 422 may project away from the band 402 and be connected to the top member 424. The channel 420 may also include flanges 423 extending from the bottom of the sidewalls toward the outer edge portions 402A, 402B. The flanges 423 may be parallel with the top member 424. The sidewalls 422, the top member 424, and the flanges 423 may be a single, monolithic piece of material. The flanges 423 may lay flat against the surface of the band 402 and be used to couple the channel 420 to the band 402. For example, coupling elements 425 may be used to secure the channel 420 to one of the outer edge portions 402A, 402B. Coupling elements 425 may be pins or screws. However, any suitable means of coupling may be used.

The channel 420 may define an opening 426. The opening may be defined by the sidewalls 422 and/or the top member 424. The opening 426 may be a space configured to receive the tab 417. The opening 426 may extend through the channel 420 from one end of the other. The opening 426 may receive the tab 417 therein and allow for movement of the tab 417 within the channel 420. Such movement may allow for positioning of certain features of the tab 417 relative to certain features of the channel 420 for engagement of the features and locking or otherwise securing the locking mechanism 401, as described herein.

The top member 424 may include edges 429 defining one or more spaces 428. The edges 429 may be rectangular as shown and thus define rectangular spaces 428. Other suitable shapes may be implemented. The spaces 428 may extend through the top member 424. The spaces 428 may be configured to receive the raised portion 427 of the tab 417, or portions thereof, that is inside the channel 420.

Figures 4B, 4C, 4D, 4E:
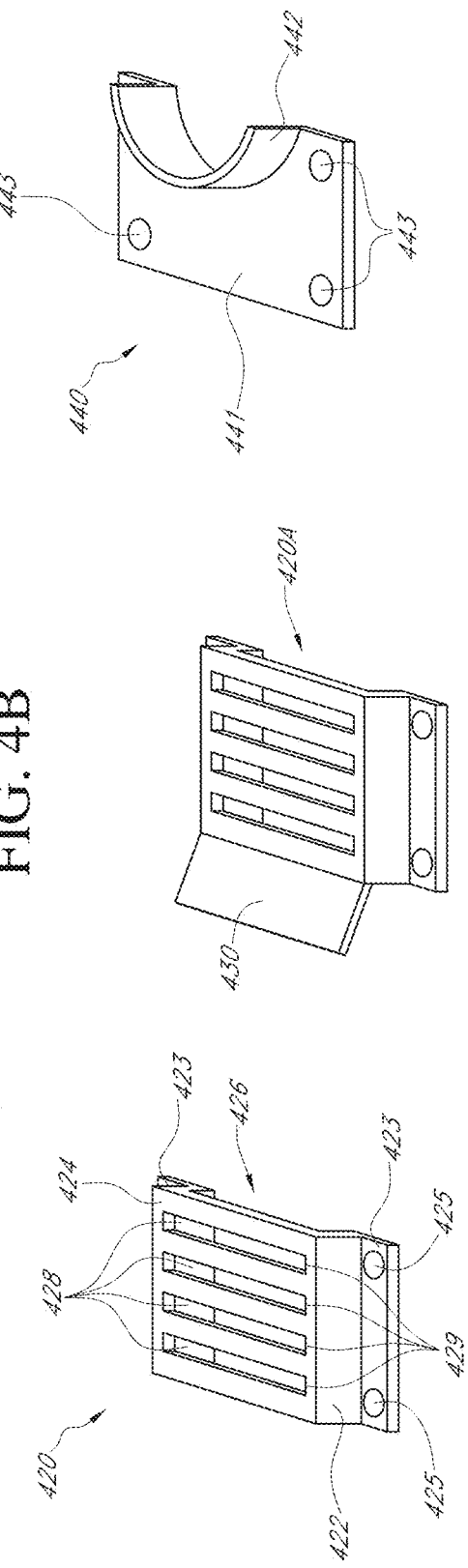
FIG. 4B is a perspective view an embodiment of a tab that may be used with the locking mechanism of FIG. 4A.
FIG. 4C is a perspective view an embodiment of a channel that may be used with the locking mechanism of FIG. 4A.
FIG. 4D is a perspective view another embodiment of a channel that may be used with the locking mechanism of FIG. 4A.
FIG. 4E is a perspective view an embodiment of a gripping element that may be used with the locking mechanism of FIG. 4A.

FIG. 4B shows another embodiment of the tab 417. Here, the raised portion 450 may include an angled surface 452 formed from a thin wall 458, which may be the same thickness as the rest of the tab 417. The raised portion 450 may form an edge portion 456 on the side of the raised portion 450 that is closer to the base 417A. The raised portion 450 may be such that the thin wall 458 extends to form the entire surface of the tab 417. The thin wall 458 may defined a space thereunder, although this space may also be filled in.

When in the locked configuration, the tab 417 may extend through the channel 420 and the raised portions 427 or 450 may be inserted into one of the spaces 428 such that the channel 420 restricts the tab 417 from moving out of the channel 420. The spaces 428 may be parallel to each other and extend in a direction transversely to the band 402. The raised portion 427 or 450 of the tab 417 may be elongated and shaped to complement the shape of the spaces 429. Further, the tab 417 may be able to flex upward and/or downward for engaging and disengaging the raised portion 427 or 450 with the spaces 428. The tab 417 may be biased upward so that the raised portion 427 or 450 may engage with the space 428 when no pressure is applied. The thin wall 458 of the tab 417 (shown in FIG. 4B) may allow for increased flexibility of the raised portion 450 so that it can be deflected downward to disengage from the slot 429. The slots 429 may be large enough to accommodate a tool, such as a flat head screwdriver, which could be used to apply downward pressure to the raised portion 450 and disengage the tab 417 from the channel 420.

FIG. 4D shows another embodiment of the channel 420A. The channel 420A may include an angled end portion 430 on the end of the channel 420A furthest from the first end 404 of the band 402 that extends upward and away from the second end of the band 402. The angled end portion 430 may act as a guide for a tool, such as a flat head screwdriver, orienting the tool into the proper position for disengaging the raised portion 427 or 450 from the space 428 into which the raised portion 427 or 450 is locked or secured.

Also, the portions of the top member 424 in between the spaces 428 may be flexible to facilitate disengaging the raised portion 427 or 450. For instance, the top member 424 may be flexed upward to disengage the raised portion 427 or 450. The tightness or snugness of the locking device 401 may be b providing different sizes of the spaces 428, for example with smaller spaces creating a tighter fit. The band 402 may be manufactured with the tab 417 already engaged in one of the spaces 428, for example the space 428 that is located closest to the first end 404 of the band.

The first end 404 may further include a stop 419A. As shown, the first end 404 may include two stops 419A, shown in dashed lines because they are located underneath the tabs 417 in the orientation shown in FIG. 4A. The stop 419A may be similar to other stops herein, for example the stop 311. The stop 419A may engage the inside of the lip 419 of the tab 417 to further restrict the tab 417 from moving out of the channel 420. The stop 419A may be positioned near the channel 420 and may extend away from the channel 420, for example in the ramped configuration as shown with a flat side facing the lip 419 in the orientation shown in FIG. 4A.

The locking mechanism 401 may include more than one stop 419A, tab 417, and channel 420. For example, the locking mechanism may include one stop 419A, tab 417, and channel 420 coupled to the first edge portion 402A of the band 402 and another stop 419A, tab 417, and channel 420 coupled to the second edge portion 402B of the band 402, as shown in FIG. 4A. The stops 419A, tabs 417, and channels 420 may be positioned directly across from each other with the middle portion 402C in between. All the stops 419A, tabs 347, and channels 420 may have the same or similar features as discussed above.

The band 402 may include a gripping element 440. The gripping element installed with the locking mechanism 410 is shown in FIG. 4A, and the gripping element in isolation is shown in FIG. 4E. There may be two gripping elements 440, with one located on each end 404, 406 of the band 402. The gripping elements 440 may facilitate the closure, tightening and/or locking of the band 402.

Each gripping element 440 may include an arcuate projection 442 coupled with and extending away from the band 402. The projection 442 may extend away from the lateral edge portion of each end 404, 406 of the band 402. The arcuate projections 442 may be C-shaped with the opening of the "C" facing toward the edge of the end 404, 406 to which it is coupled. Alternatively, the arcuate projections 442 may be rounded pins. The outer contour of the projections 442 may be circular as shown, or other rounded shapes. The arcuate projections 442 may be configured for gripping with a tool to facilitate tightening and locking the band. Further detail of the tools that may be used are discussed below.

The arcuate projection 442 may be coupled directly to the band or it may be coupled to a base 441 which extends outward from the bottom of the arcuate projection 442. The base 441 may be a planar surface which lays flat on the surface of the band 402 and is coupled to the lateral edge portion of each end 404, 406 of the band 402. As seen in FIG. 4E, the base 441 may not extend to the inner side of a C-shape arcuate projection 442. Coupling elements 443 may be used to secure the gripping element 440 to the band 402. Coupling elements 425 may be pins or screws, or other suitable coupling features. The arcuate projection 442 may be integral with the base 441.

Figure 5B:
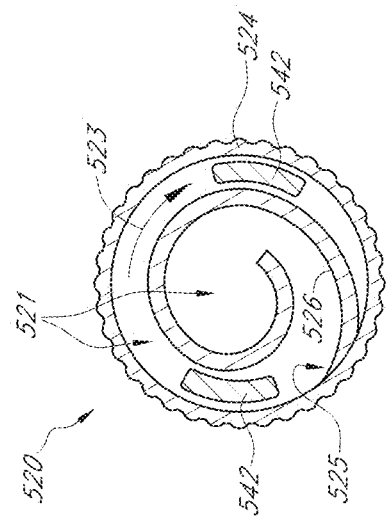
FIG. 5B is a cross-section view of the tool of FIG. 5A.
Figure 5A:
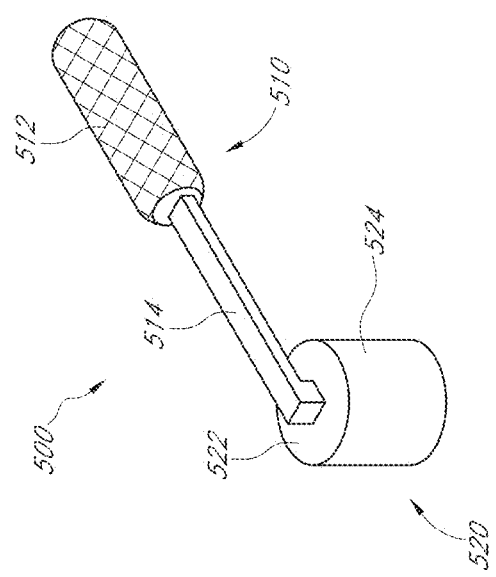
FIG. 5A is a perspective view another embodiment of a tool that may be used with various embodiments of the clamps described herein.

FIGS. 5A and 5B depict views of an embodiment of a tool 500 for closing the locking mechanism of a clamp, such as those described with respect to FIGS. 3-4E. For instance, the locking mechanisms 301, 401 shown in FIGS. 3 and 4A may be secured using the tool 500. However, the tool 500 may be used with other embodiments of the various locking mechanism described herein.

As shown in the perspective view of FIG. 5A, the tool 500 may include a handle 510 and a head 520 coupled to the end of the handle 510. The handle 510 may include an elongated shaft 514 coupled to a gripping region 512. The gripping region 512 may be positioned on the end of the handle 510 that is away from the head 520. The gripping region 512 may be knurled for facilitating gripping. The head 520 may include an outer sidewall 524 coupled to a top member 522. The handle 520 may be coupled to the top member 522 at the end of the shaft 514 that is furthest from the gripping region 512. The outer sidewall 524 may be cylindrical in shape and the top member 522 may be circular to form a cylinder that is open at the end which is away from the attachment with the handle 510.

FIG. 5B is a cross-section view of the head 520 of the tool 500. As shown in FIG. 5B, the outer sidewall 524 may define a cavity 521 for receiving two or more arcuate projections 524, also shown in cross-section view. The arcuate projections 542 may be the same or similar to the arcuate projections 342, depicted in FIG. 3, or the arcuate projection 442, depicted in FIGS. 4A and 4E. The cavity 521 may be partially formed by rounded, inner surfaces of the sidewall 524 that are configured to contact the arcuate projections 542. The outer sidewall 524 may further be coupled with an inner spiral wall 526 which extends from the outer sidewall 524 into the cavity 521. The inner spiral wall 526 may spiral toward the center of the cavity such that the arcuate projections 542 may be initially received in the cavity 521 in between the outer sidewall 524 and the inner spiral wall 526. Using the handle 510, the head 520 may be rotated about the arcuate projections 542 so that the tool 500 biases the arcuate projections substantially linearly towards each other as the projections 542 encounter and then slide along the inner spiral wall 526. For instance, when the head 520 is rotated in the direction 523 as indicated in FIG. 5B, the arcuate projections 542 may be biased inward at the transition 525 between the outer wall 524 and the inner spiral wall 526. By biasing the arcuate projections 542 closer toward each other, the tool 500 may be used to tighten clamps which have arcuate projections on each end of a band.

Figure 6A:
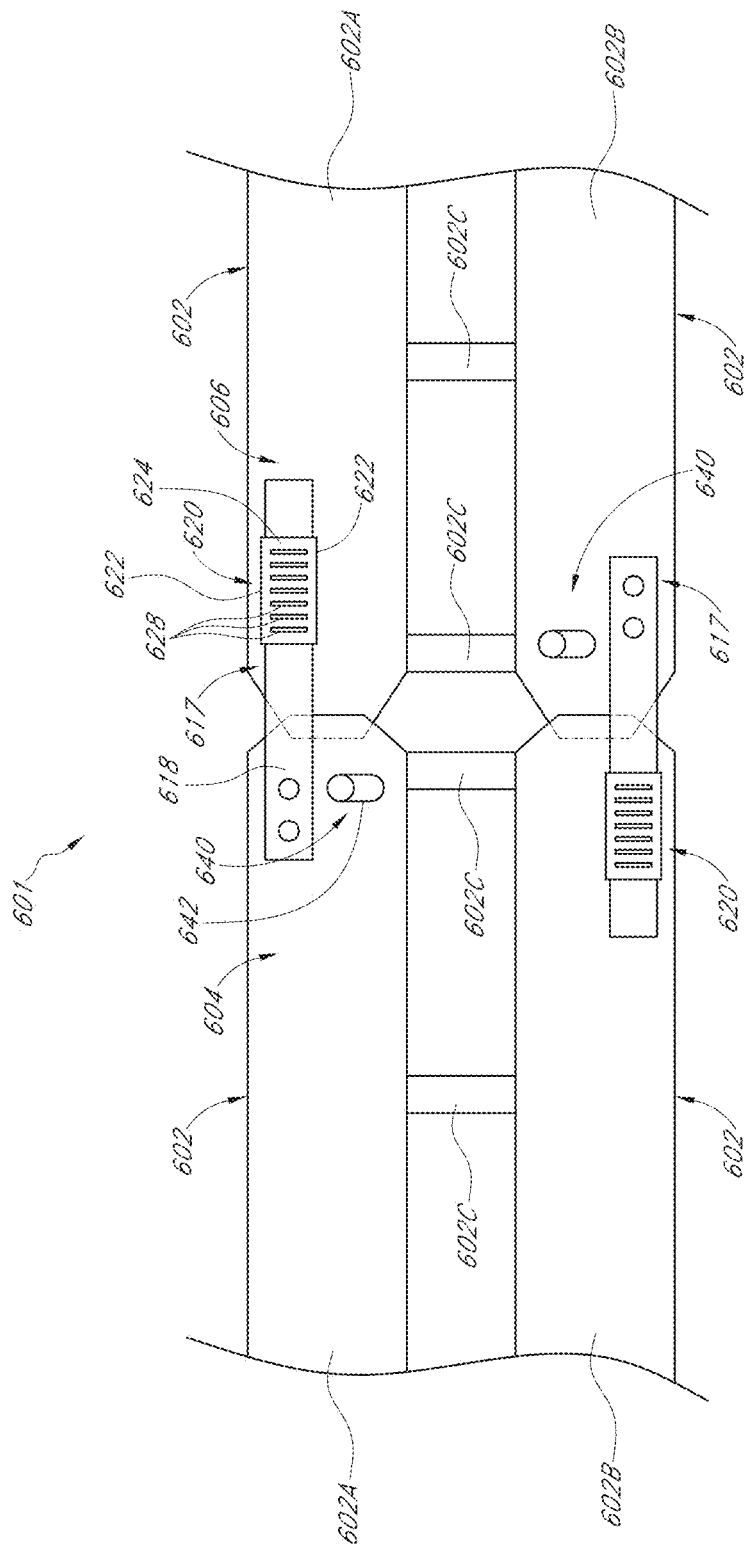
FIG. 6A is a top view of another embodiment of a locking mechanism that may be used with the various clamps described herein.
Figure 6B:
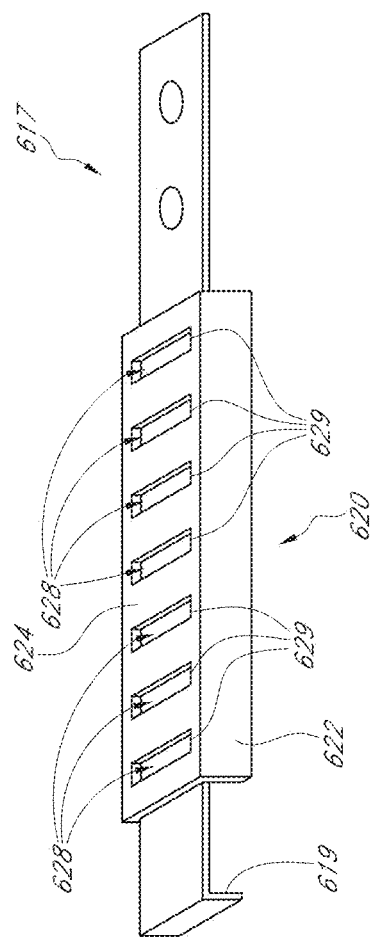
FIG. 6B is a perspective view of an embodiment of a tab and channel that may be used with the locking mechanism of FIG. 6A.
Figure 6C:
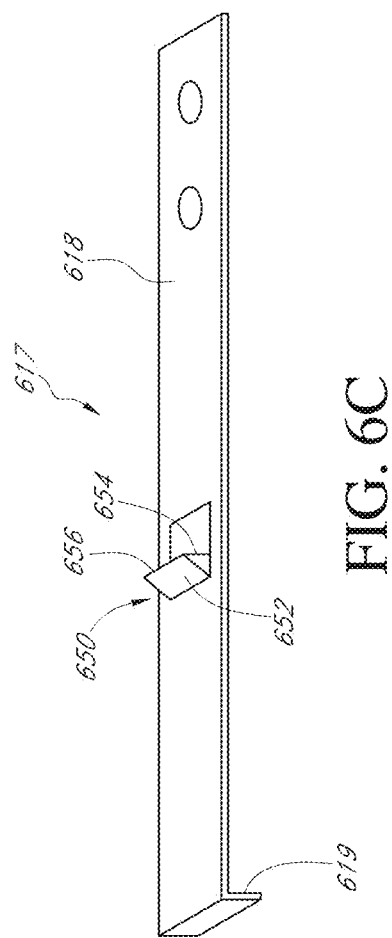
FIG. 6C is a perspective view of an embodiment of a tab that may be used with the locking mechanism of FIG. 6A.

FIGS. 6A through 6C depict various views of another embodiment of a locking mechanism 601 on another embodiment of a band 602. The locking mechanism 601 may secure the first end 606 of the band 602 with the second end 604 of the band 602. The band 602 may include a first sub-band 602A and a second sub-band 602B. The first sub-band 602A and the second sub-band 602B may extend alongside each other as shown, which may be a parallel arrangement. The band 602 may have the same or similar features as other bands described herein. For instance, each band 602 may be configured to circumferentially surround the ends of adjacent pipes.

Further, having the first sub-band 602A and the second sub-band 602B may facilitate connecting pipes of different diameters. The first sub-band 602A and the second sub-band 602B may be solid material, such as metal, or other suitable materials. The sub-bands 602A and 602B may be connected to each other by a plurality of transverse ties 602C extending between the sub-bands 602A and 602B. The sub-bands 602A and 602B may be connected the transverse ties 602C with fasteners, rivets, or other suitable means. In some embodiments, the sub-bands 602A, 602B and the transverse ties 602C are formed from the same, monolithic piece of material. In some embodiments, the sub-bands 602A, 602B and the transverse ties 602C are rotatably connected with each other. For example, the transverse ties 602C may rotate slightly either in- or out-of-plane relative to the sub-bands 602A, 602B. The transverse ties 602C may also extend perpendicularly between the sub-bands 602A, 602B. The transverse ties 602C may be of smaller width than the sub-bands 602A, 602B. The space between the transverse ties 602C and the sub-bands 602A, 602B may allow the sub-bands 602A, 602B to secure to pipes of different diameters. For example, the sub-band 602A may secure around a first pipe having a first diameter, and the sub-band 602B may secure around an adjacent second pipe having a second diameter that is larger than the first diameter. In this manner, the two different-diameter pipes may be secured and clamped together using the band 602 having the sub-bands 602A and 602B.

The locking mechanism 601 may have the same or similar features as other locking mechanisms described herein. The locking mechanism 601 may have a first flexible elongated tab 617 coupled with and extending away from the first end 606 of the first band 602A, and a second flexible elongated tab 617 coupled with and extending away from the second end 604 of the second band 602B. Another embodiment of the tab 617 is shown in isolation in FIG. 6C. The tab 617 may include a base 618 which may be coupled to the band 602. The tab 617 may also include a raised portion 650 on its outer surface. The raised portion 650 may include an angled surface 652 that extends upward and toward the base 618 of the tab 617 to meet a sidewall 654 positioned closer to the base 618. The sidewall 654 may be substantially perpendicular to the base 618. The angled surface 652 and the sidewall 654 together define an edge portion 656. The raised portion 650 may be integral with the rest of the tab 617. The tab 617 may also include a lip 619 coupled to and extending away from the end portion 618 of the tab.

As shown in FIGS. 6A and 6B, one or more channels 620 may be coupled with and extending away from the band 602. In some embodiments, the channels 620 may be coupled with and extending away from the second end 604 of the first band 602A and the first end 606 of the second band 602B for receiving the tabs 617. FIG. 6B shows the channel 620 receiving the tab 617. The channel 620 may include sidewalls 622 connected by a top member 624. The sidewalls 622 may project away from the band 602 and be connected by the top member 624. The sidewalls 622 and the top member 624 may be a single, monolithic piece of material. The top member 624 may include one or more edges 629 defining spaces 628 configured to receive the raised portion 650 of the tab 617. Specifically, the spaces 628 formed by the edges 629 may receive the edge portion 656 of the raised portion 650 of the tab 617. Smaller spaces 628 that are located closer together may provide a more refined adjustment capability to accommodate varying sizes of pipes and to achieve varying levels of tightness about pips of different diameters.

When in the locked configuration, the tab 617 may extend through the channel 620 and the raised portion 650 may be inserted into one of the spaces 628 formed by the edges 629 such that it restricts the tab from moving out of the channel. The spaces 628 may be parallel to each other and extend in a direction transversely to the band 602. The raised portion 650 of the tab 617 may be elongated and shaped to complement the shape of the spaces 628. The tab 617 may be able to flex upward and downward for engaging and disengaging the spaces 628. The tab 617 may be biased upward so that the raised portion 650 may engage a space 628 when no pressure is applied. The spaces 628 may be large enough to accommodate a tool, such as a flat head screwdriver, which could be used to apply downward pressure to the raised portion 650 and disengage the tab 617 from the space 628 into which it is secured. Also the portions of the top member 624 between the spaces 628 may be made flexible to facilitate disengaging the raised portion 650. For instance, the top member 624 may be flexed upward to disengage the raised portion 650. The tightness of the locking device 601 could possibly be adjusted by changing the size of the spaces 628 with smaller slots creating a tighter fit, or a more refined tightening capability as mentioned.

The second end 604 of the first sub-band 602A and the first end 606 of the second sub-band 602B may each further include a stop (not shown) that is similar to stop 311 described above, for engaging the lip 619 of the tab 617 and further restricting the tab from moving out of the channel 620. The stop may be positioned near the channel 620 and may extend away from the channel 620.

The first and second ends 604, 606 may be brought together with a gripping element 640 for facilitating the tightening and locking of the bands 602 in configuration shown in FIG. 6A. As shown, the gripping elements 640 may be located on the second end 604 of the first sub-band 602A and the first end 606 of the second sub-band 602B. Alternatively, the gripping elements 640 may be located on the first end 604 of the first sub-band 602A and the second end 606 of the second sub-band 602B. Each gripping element 640 may include an arcuate projection 642 extending away from the band 602. The arcuate projections 642 may be integral with the bands 602. The arcuate projections 642 may be rounded pins. The arcuate projections 642 may be configured for gripping with a tool to facilitate tightening and locking the band. Further detail of the tools that may be used are discussed herein, for example with respect to FIGS. 7A-7C.

FIGS. 7A through 7C depict an embodiment of a tool 700 that may be used to tighten and lock a clamp. The locking mechanism 601 shown in FIG. 6A provides an example of a clamp that the tool 700 may be used with. However, the tool 700 may be used with any suitable clamp. FIG. 7A is a perspective view of the tool 700. FIGS. 7B and 7C are perspective views of a head 720 that forms a part of the tool 700.

As shown in FIG. 7A, the tool 700 may include a handle 710 and the head 720 coupled to the end of the handle 710. The handle 710 may be integral with the head 720 or may be detachably connected thereto. The handle 710 may include an elongated shaft 714 coupled to a gripping region 712. The gripping region 712 may be positioned on the end of the handle 710 that is located away from the head 720. The gripping region 712 may be knurled for facilitating gripping. The shaft 714 may include a projection that extends orthogonally away from the shaft and inserts into the head 720. The head 720 may include an outer sidewall 724 coupled to a top member 722. The handle 720 may be coupled to the top member 722 at the end of the shaft 714 that is furthest from the gripping region 712.

As shown in FIGS. 7B and 7C, the head 720 of the tool 700 may include a recess 723 for receiving and detachably connecting to the shaft 714. The outer sidewall 724 may define two cavities 727 for receiving corresponding features, such as the arcuate projections 724 as shown in isolation in FIG. 7B. The arcuate projections 740 may be the same or similar to other arcuate projections described herein, such as the arcuate projections 642 depicted in FIG. 6A. Moving the head 720 in the direction of the arrow 728 shown in FIG. 7B may allow the cavities 727 to receive the arcuate projections 740 therein. The cavities 727 may have rounded inner portions configured to contact the outer rounded contours of the arcuate projections 742. The cavities 727 may each be semi-circular in shape with the flat sides of the semi-circles oriented directly towards each other. Using the handle 710, the head 720 may be rotated about the arcuate projections 740 so that contact of the arcuate projections with the curved surfaces of the cavities 727 biases them towards each other. By biasing the arcuate projections 740 closer toward each other, the tool 700 may be used to tighten clamps which have arcuate projections on each end of a band. In some embodiments, the tool 700 may bias projections of a clamp such that the ends of the clamp are biased toward each other in a linear or substantially linear direction. The cavities 727 may have inner contours against which the projections bear against such that rotation of the tool 700 will bias the projections linearly or substantially linearly, such that the ends of the clamp are biased towards each other. Thus, the tool 700 may exert forces on the projections 740 with parallel components of the forces biasing the projections 740 in a direction such that the two opposing ends of the clamp are biased together. In some embodiments, the tool 700 may bias the projections 740 towards each other without substantially inducing twisting or torsion in the band of the clamp.

Figure 8:
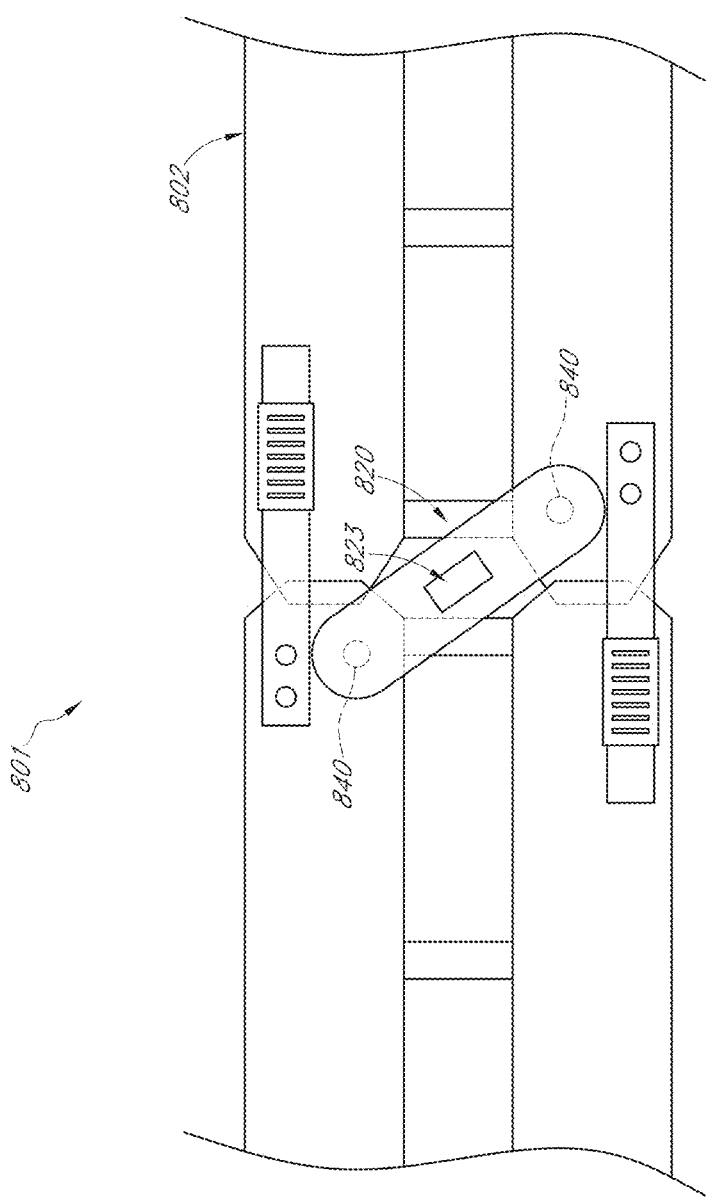
FIG. 8 is a top view of an embodiment of a tool head coupled with a locking mechanism.

FIG. 8 is a top view of an embodiment of a tool head 820 coupled with a locking mechanism 801. As shown, the tool head 820 may be used to tighten and secure a locking mechanism 801 and a band 802 of a clamp. Only the tool head 820 of a tool is shown, for clarity. The tool may be the same or similar to other tools described herein, such as the tool 700. The clamp may include the band 802, which may the same or similar as other bands described herein, such as the band 602. The clamp may employ a locking mechanism 801 similar to other locking mechanisms describe herein, such as the locking mechanism 601 shown in and described with respect to FIG. 6.

As further shown in FIG. 8, the band 802 may be coupled with arcuate projections 840, which are shown in dashed lines because they are below the head 820 of the tool. The head 820 may be placed over the arcuate projections 840 such that the head 820 extends diagonally between the two bands 802. The recess 823 in the head 820 may receive the shaft of a handle for applying torque to the head 820. Applying torque will rotate the head 820 about the arcuate projections 840, bringing them closer together and tightening the clamp. As described above, the projections such as projections 840 may be biased substantially linearly in opposite directions to bring the two ends of the clamp together and secure the locking mechanism 801.

FIG. 9 is a top view of another embodiment of a locking mechanism 901. The locking mechanism 901 may be the same or similar as other locking mechanism described herein, for example the locking mechanism 601 in FIG. 6. As shown in FIG. 9, the locking mechanism 901 may be used for securing the first end 906 of a band 902 with a second end 904 of the band 902. The band 902 may be the same or similar as other bands describe herein, for example the band 602 shown in and described with respect to FIG. 6.

As shown in FIG. 9, the band 902 may include a first sub-band 902A and a second sub-band 902B. The first sub-band 902A and the second sub-band 902B may be connected by transverse ties 902C. The transverse ties 902C may be the same or similar as other transverse ties described herein, for example the transverse ties 602C shown in and described with respect to FIG. 6A. The first sub-band 902A and the second sub-band 902B may each be coupled with one or more projections 940 at the first and second ends 906, 904, respectively, of the band 902.

FIG. 9A shows a detailed view of one of the projections 940. Each projection 940 may include sidewalls 942 projecting away from the band 902 and connected by a top member 944. The top member 944 may be angled such that it extends upward in a direction away from the end of the band 902 with which it is coupled. The sidewalls 942 and the top member 944 may be a single, monolithic piece of material. The sidewalls 942 and the top member 944 may together define a cavity 946 therein. The cavity 946 may be facing away from the end of the band with which it is coupled. Each projection 940 may be configured to receive a tool within its respective cavity 946 to facilitate tightening and locking the clamp.

FIGS. 10A through 10M depict various views and embodiments of gaskets. The gaskets may be used with the assembly 10. The gaskets may be used with any of the clamps described herein that are used to secure two pipes, such as the pipes 110, 120. The gaskets may be located between and/or around adjacent pipe ends, and any of the clamps described herein may be secured over the gaskets and corresponding pipes.

Figure 10B:
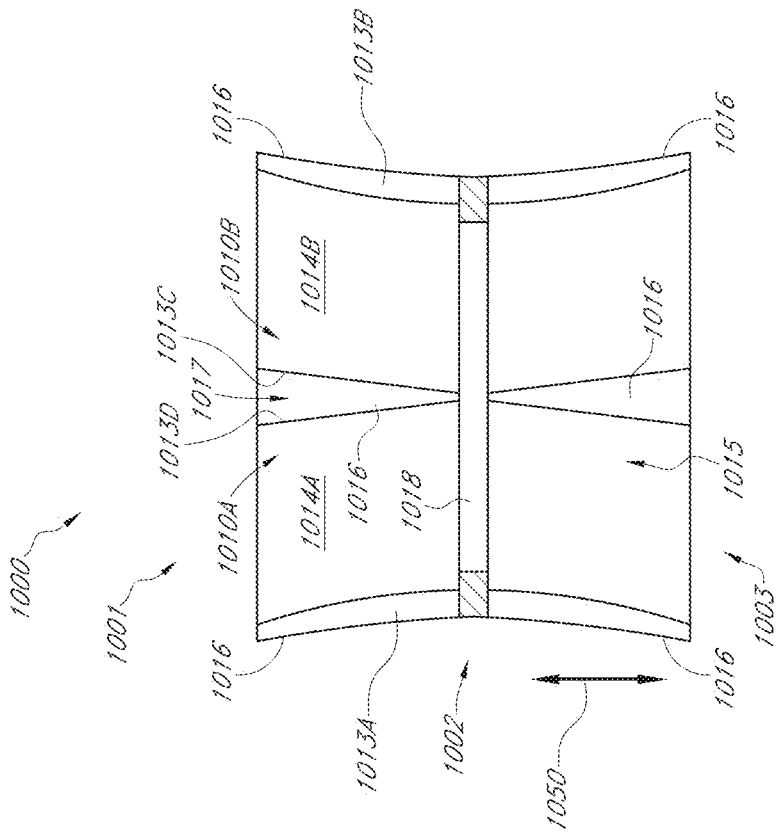
FIG. 10B is a cross-section view of the gasket of FIG. 10A, as taken along the line 10B-10B indicated in FIG. 10A.
Figure 10A:
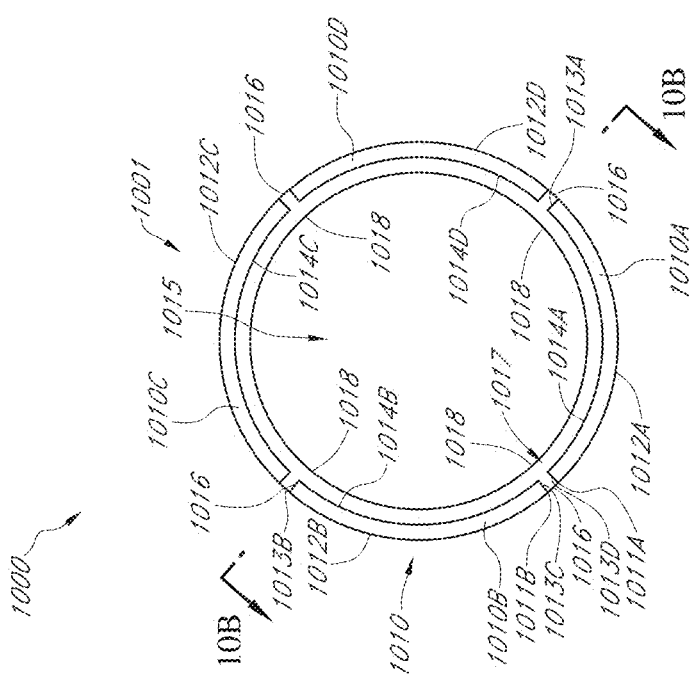
FIG. 10A is a top view of an embodiment of a gasket.

FIG. 10A is a top view of an embodiment of a gasket 1000. FIG. 10B is a cross-section view of the gasket 1000 as taken along the line 10B-10B indicated in FIG. 10A. Referring to FIGS. 10A and 10B, the gasket 1000 may have a top end 1001 opposite a bottom end 1003. The gasket may have a middle portion 1002 in between the top and bottom ends 1001, 1003. The middle portion 1002 may be located equidistant from the top and bottom ends 1001, 1003. The top and bottom ends 1001, 1003 may be wider than the middle portion 1002. In some embodiments, the top and bottom ends 1001, 1003 are approximately the same width. In some embodiments, the top and bottom ends 1001, 1003 are approximately the same diameter. As further described below, the shape of the gasket 1000, for example as seen in the side cross-section view of FIG. 10B, may approximate an hourglass shape. In some embodiments, the gasket 1000 may have two frustoconical shapes extending away from the middle portion 1002 to the top and bottom ends 1001 and 1003. The large width or diameters of the top and bottom ends 1001 and 1003 may facilitate with securing the gasket 1000 to the pipe ends. For example, the larger opening at the top and bottom ends 1001 and 1003 may be larger than the outer width or diameter of the pipes to which the gasket 1000 is being secured. After the gasket 1000 is secured to two adjacent pipe ends, the gasket 1000, such as the ends 1001 and 1003 and/or other portions of the gasket 1000, may then collapse on the two pipe ends, for example upon pressure from a clamp, to provide a tighter seal about the pipe, as further described below. Thus the gasket 1000 may provide simpler installation about a pipe while still providing sealing capability.

The gasket 1000 may include a rounded sidewall 1010. The sidewall may be composed of a first portion 1010A, second portion 1010B, third portion 1010C, and/or a fourth portion 1010D. Each portion 1010A, 1010B, 1010C, and 1010D may have, respectively, a corresponding outer surface 1012A, 1012B, 1012C, and 1012D. Each portion 1010A, 1010B, 1010C, and 1010D may have, respectively, a corresponding inner surface 1014A, 1014B, 1014C, and 1014D.

The gasket 1000 may include a channel 1015. The rounded sidewall 1010 may define the channel 1015. For instance, the portions portion 1010A, 1010B, 1010C, and 1010D may defined the channel 1015. The channel 1015 may extend along the interior of the gasket 1000 from the top end 1001 to the bottom end 1003. The channel 1015 may extend in the direction indicated by the arrow 1050, as shown in FIG. 10B.

Each portion 1010A, 1010B, 1010C, 1010D may be separated from two adjacent portions by a gap 1017, as labelled in between portions 1010A and 1010B. Thus, the gaps 1017 may each be located between portions 1010A and 1010B (as labelled), between portions 1010B and 1010C as shown, between portions 1010C and 1010D as shown, and/or between portions 1010A and 1010D as shown. The sidewall 1010 may further include one or more membrane sections 1016 located at the gaps 1017 and extending longitudinally along the direction of the channel 1015. As shown in FIG. 10A, the membrane section 1016 may span the gaps 1017 connecting the outer edges of two adjacent sidewall portions 1010A, 1010B, 1010C, 1010D. For example, as shown the membrane section 1016 may connect a first outer edge 1011A of the sidewall portion 1010A to a second outer edge 1011B of the sidewall portion 1010B. In some embodiments, the membrane section 1016 can connect inner edges, or inner and outer edges. Similar membrane sections 1016 may be located, as shown, in between portions 1010B and 1010C, in between portions 1010C and 1010D, and/or in between portions 1010D and 1010A. The membrane section 1016 may be a thin material that can collapse. The membrane section 1016 may be of a lesser thickness than the sidewall portions 1010A, 1010B, 1010C, 1010D.

The portions 1010A-D may also have end surfaces, such as the end surfaces 1013A and 1013B of the portions 1010A and 1010B, respectively. The opposite ends of the portions 1010A and 1010B may also have end surfaces. Similarly, the other portions 1010C and 1010D may also each have two end surfaces. As shown, the end surfaces 1013A and 1013B of the sidewall portions may partially define the gaps 1017 between adjacent sidewall portions. Adjacent end surfaces may move closer together and/or contact each other when the gasket is compressed, for example when a clamp is tightened over the gasket 1000, as further described herein. For instance, adjacent end surfaces of the portions 1010A and 1010B may move closer together, such that first and second edges 1011A and 1011B are also brought closer together, and the membrane 1016 spanning in between edges 1011A and 1010B folds or otherwise collapses. Various regions of adjacent end surfaces may move varying distances when the gasket is compressed, for example if the gap 1017 and/or membrane 1016 are tapered or angled, as shown in and described with respect to FIG. 10B.

As best seen in FIG. 10B, the membrane sections 1016 and the end surfaces 1011C, 1011D may be angled. The membrane sections 1016 may be trapezoidal, as shown, or they may be other angled shapes, such as triangular, etc. The membrane sections 1016 may be wider at the top and bottom ends 1001 and 1003 of the gasket 1000 as compared to near the middle portion 1002 of the gasket 1000. The end surfaces of sidewall portions, for example end surfaces 1011C, 1011D, may likewise be angled, as also shown in FIG. 10B. For instance, the end surfaces 1013A and 1013B may be angled as shown. The other end surfaces may also be angled. The larger separation between the end surfaces 1013A and 1013B at the top and bottom ends 1001 and 1003 of the gasket 1000 may allow for differential compression in the gasket 1000. For instance, the gasket 1000 may be wider at the top and bottom ends 1001 and 1003 as compared to the middle portion 1002 such that upon compression of the gasket 1000 the top and bottom ends 1001 and 1003 compress more than the middle portion 1002. For example, upon compression of the gasket 1000, the regions of the end surfaces 1013A and 1013B near the top end 1001 may move further than the regions of the end surfaces 1013A and 1013B near the bottom end 1003. The tapered or otherwise angled configuration of the membrane 1016 and end surfaces 1013A, 1013B may facilitate such differential compression of the gasket 1000.

The gasket 1000 may also include a ridge 1018. The ridge 1018 may be coupled with an interior surface of the sidewall 1010. The ridge 1018 may be coupled with the inner surfaces 1014A, 1014B, 1014C, and/or 1014D of the sidewall 1010. The ridge 1018 may extend circumferentially around the interior of the channel 1015. The ridge 1018 may extend continuously around the interior of the channel 1015. There may also be discontinuities in the ridge 1018 (not shown). The ridge 1018 may be located in a plane generally perpendicular to the direction indicated by the arrow 1050. The ridge 1018 may form a ring extending from the inner surfaces 1014A, 1014B, 1014C, 1014D of the sidewall portions 1010A, 1010B, 1010C, 1010D toward the interior of the channel 1015. The ridge 1018 may therefore traverse each sidewall portion 1010A, 1010B, 1010C, 1010D. In some embodiments, the ridge 1018 may be located approximately at the middle of the gasket 1000 from the top to the bottom of the gasket 1000, relative to the direction arrow 1050. In some embodiments, the ridge 1018 may be located at or approximately at the middle portion 1002 of the gasket 1000. In some embodiments, the ridge 1018 may be located in between or approximately in between the top and bottom ends 1001, 1003 of the gasket 1000. The ridge 1018 may span the gaps 1017 between adjacent sidewall portions 1010A, 1010B, 1010C, 1010D. In some embodiments, the ridge 1018 may not be coupled with the membrane sections 1016, for example where the membrane sections 1016 do not extend to the ridge 1018. In other embodiments, the ridge 1018 may be coupled with the membrane sections 1016. For instance, FIG. 10A shows the ridge 1018 located between edge 1011A and edge 1011B at the labelled gap 1017. As another example, FIG. 10B shows the membrane section 1016 extending to the ridge 1018. These are merely examples and other configurations may be implemented.

Two pipes may be inserted into opposite ends of the gasket 1000 such that the edges of the pipes may abut opposite sides of the ridge 1018. The ridge 1018 may therefore provide a surface or surfaces upon which two adjacent pipe ends may contact when installed, for example in the assembly 10 described with respect to FIG. 1. The ridge 1018 may have a variety of other suitable shapes and configurations, including those which may be required by construction regulations or codes. The ridge 1018 may be formed from the same or similar materials as other portions of the gasket 1000. In some embodiments, the ridge 1018 is formed from a rubber material. However, the ridge 1018 may any other suitable material, or combinations thereof.

Figure 10C:
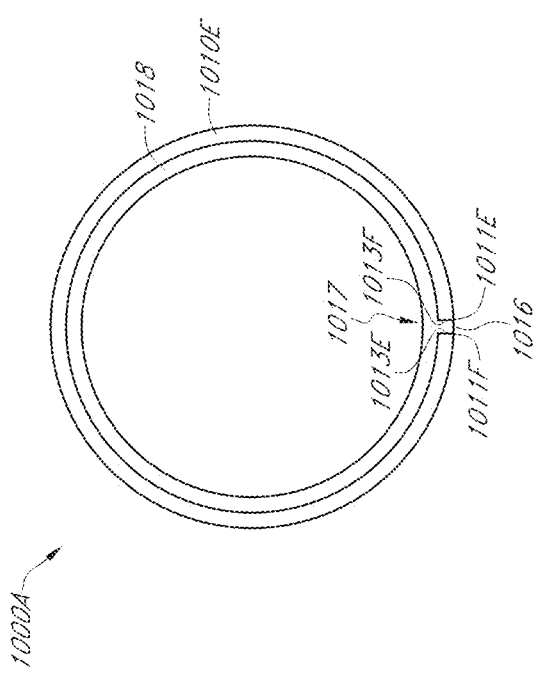
FIG. 10C is a top view of another embodiment of a gasket.

FIG. 10C shows an embodiment of a gasket 1000A in which the rounded sidewall contains only one sidewall portion 1010E. The gasket 1000A may include the same or similar features as the gasket 1000 described with respect to FIGS. 10A-10B, and vice versa. As shown in FIG. 10C, the gasket 1000A may have only one membrane section 1016 connecting first and second edges 1011E, 1011F of the sidewall portion 1010E. The first and second edges 1011E, 1011F may have the same or similar features as other edges described herein, for example the edges 1011A and 1011B. The sidewall portion 1010E may have the end surfaces 1013F and 1013G, which may have the same or similar features as other end surfaces described herein, for example the end surfaces 1013C and 1013D. Thus, in some embodiments, the gasket 1000A may have only one, or fewer than four, sidewall portions, and corresponding numbers of membranes 1016, gaps 1017, edges 1011E and 1011F, end surfaces 1013E and 1013F, etc. In some embodiments, there may be more than four sidewall portions, and corresponding numbers of membranes 1016, gaps 1017, edges 1011E and 1011F, end surfaces 1013F and 1013G, etc.

Figure 10D:
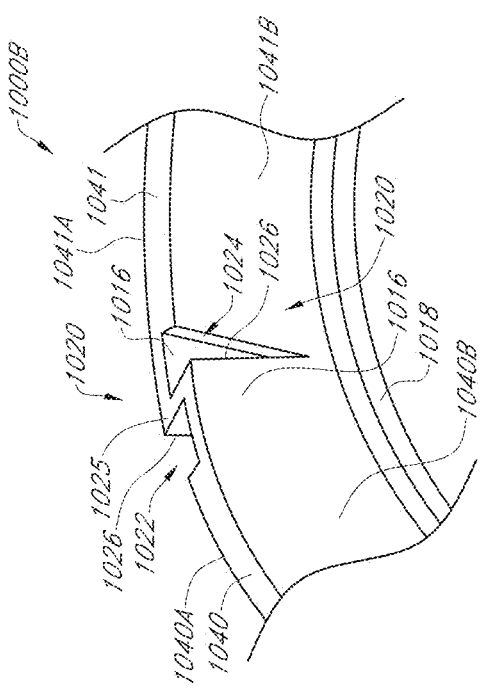
FIGS. 10D and 10E are perspective and top views, respectively, of a portion of another embodiment of a gasket.
Figure 10E:
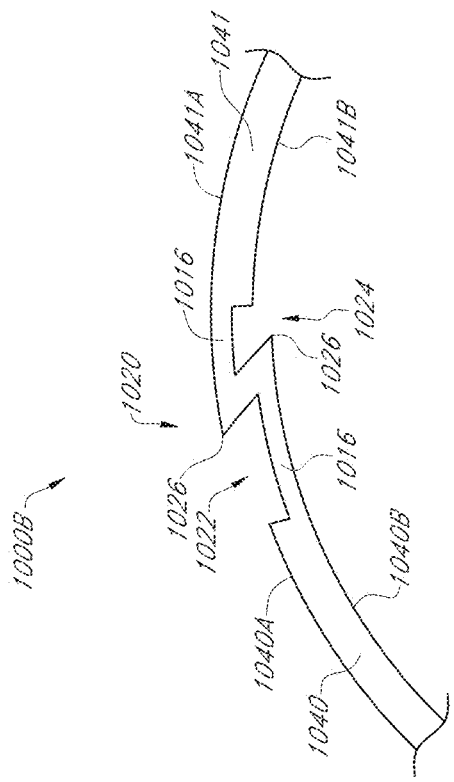

FIGS. 10D and 10E show perspective and top views, respectively, of an embodiment a gasket 1000B. The gasket 1000B may include the same or similar features as the gasket 1000 described with respect to FIGS. 10A-10B, and vice versa. The gasket 1000B may include the same or similar features as the gasket 1000 or 1000A described with respect to FIGS. 10A-10C, and vice versa.

As shown in FIGS. 10D and 10E, the gasket 1000B may include a first sidewall portion 1040 and a second sidewall portion 1041. The sidewall portions 1040, 1041 may have the same or similar features as the other sidewall portions described herein, for example the sidewall portions 1010A-D. The sidewall portion 1040 may include an outer surface 1040A and an inner surface 1040B. The sidewall portion 1041 may include an outer surface 1041A and an inner surface 1041B. The various inner and outer surfaces 1040A, 1040B, 1041A, 1041B may have the same or similar features as other sidewall surfaces described herein, for example the sidewall surfaces 1014A-D and 1012A-D. The gasket 1000B may further include the ridge 1018, which may be as described above.

The gasket 1000B may include one or more collapsible joints 1020. Each joint 1020 may include one or more of the collapsible membranes 1016. At each joint 1020, the membrane 1016 may be coupled at one end with the inner surface 1040B of the sidewall portion 1040 and on the other end with the outer surface 1041A of the sidewall portion 1041. In some embodiments, the membrane 1016 may be coupled at one end with the outer surface 1040A of the sidewall portion 1040 and on the other end with the inner surface 1041B of the sidewall portion 1041. There may be a connector portion 1025. The connector portion 1025 may connect two or more membranes 1016. As shown, the connector portion 1025 may connect two adjacent membranes 1016. In some embodiments, there may be more than two membranes 1016 and more than one connector portion 1025 at a single collapsible joint 1020. The connector portion 1025 may another segment of the membrane 1016. Thus, the connector portion 1025 may be the same or similar material as the membrane 1016. The membrane(s) 1016 and/or connector portion 1025 may at least partially collapse at the joint 1020. The membrane(s) 1016 and/or connector portion 1025 may completely collapse at the joint 1020. By "collapse" this includes without limitation folding, scrunching, wrinkling, compressing, bending, or otherwise decreasing geometric dimension of the membrane 1016 by collapsing upon itself and/or collapsing upon surrounding features. The gasket 1000B is shown in a partially collapsed state. For example, the gasket 1000B may be in the process of being compressed onto a pipe end (not shown) by a clamp (not shown).

The joint 1020 may include an outer gap 1022 and/or an inner gap 1024. The outer gap 1022 may be on the exterior of the gasket 1000B. The inner gap 1024 may be on the interior. The inner gap 1024 may therefore face a channel on the inside of the gasket 1000B, such as the channel 1015 described above. The outer gap 1022 may be formed at least partially by the outer surface 1016A of the membrane 1016 and the inner gap 1024 may be formed adjacent to the outer gap 1022 at least partially by the inner surface 1016B of the membrane 1016. The shape of the gaps 1022, 1024 and/or joint 1020 may be defined by the membrane 1016 and the end surfaces of the sidewall portions 1040, 1041. For instance, the joint 1020 may be roughly Z-shaped. The gaps 1022, 1024 may provide spaces such that the joint 1020 may bend or flex at one or more edges 1026 to collapse the membrane 1016. "Collapse" here may be as described above. The shape of the gaps 1022, 1024 may be tapered or otherwise angled from an end of the gasket 1000B toward the ridge 1018. The membranes 1016 and end surfaces of the sidewall portions 1040, 1041 that define the gaps 1022, 1024 may be similarly tapered or angled, for example as described above with respect to FIGS. 10A-10B. For example, the gaps 1022, 1024 may be triangular or wedge shaped, as shown in FIG. 10D. The tapered gaps 1022, 1024 may allow for more compression of the membrane section 1016 near the end of the gasket as compared to a middle portion, as described above. The membrane 1016 may not extend all the way to ridge 1018, as best seen in FIG. 10D. In other embodiments, the membrane 1016 may extend to the ridge 1018.

Figure 10G:
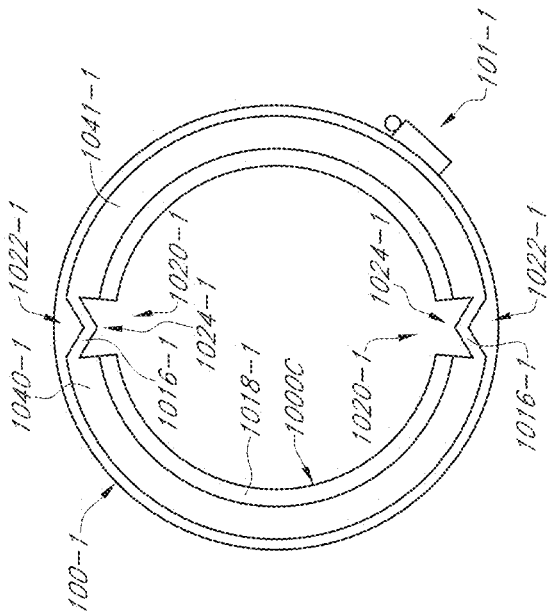
FIG. 10G is a top view of the gasket of FIG. 10F assembled with a clamp.
Figure 10F:
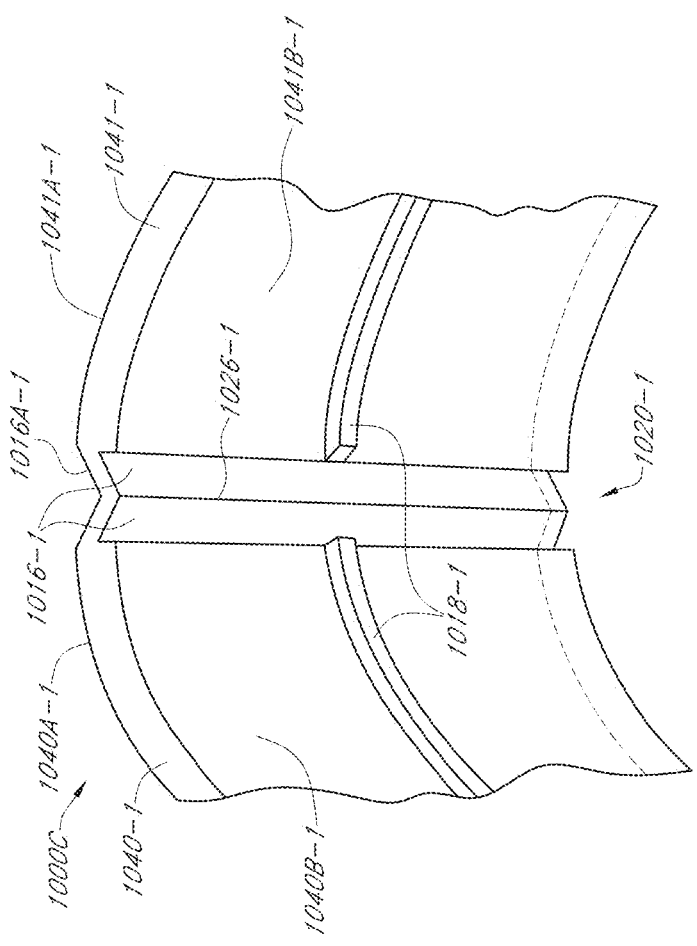
FIG. 10F is a perspective view of a portion of another embodiment of a gasket.

FIG. 10F is a perspective view of a portion of an embodiment of a gasket 1000C. FIG. 10G is a top view of the gasket 1000 of FIG. 10F assembled with a clamp. The gasket 1000C may include the same or similar features as the gasket 1000 described with respect to FIGS. 10A-10B, and vice versa. The gasket 1000C may include the same or similar features as the gasket 1000 or 1000A described with respect to FIGS. 10A-10C, and vice versa. The gasket 1000C may include the same or similar features as the gasket 1000B described with respect to FIGS. 10D-10E, and vice versa.

As shown in FIGS. 10F and 10G, the gasket 1000C may include a first sidewall portion 1040-1 and a second sidewall portion 1041-1. The sidewall portions 1040-1, 1041-1 may have the same or similar features as the other sidewall portions described herein, for example the sidewall portions 1040 and 1041. The sidewall portion 1040-1 may include an outer surface 1040A-1 and an inner surface 1040B-1. The sidewall portion 1041-1 may include an outer surface 1041A-1 and an inner surface 1041B-1. The various inner and outer surfaces 1040A-1, 1040B-1, 1041A-1, 1041B-1 may have the same or similar features as other sidewall surfaces described herein, for example the sidewall surfaces 1040A, 1040B, 1041A, 1041B. The gasket 1000C may further include a ridge 1018-1, which may have the same or similar features as other ridges described herein, for example the ridge 1018.

The gasket 1000C may include one or more collapsible joints 1020-1. As shown, there may be two collapsible joints 1020-1 located opposite each other. In some embodiments, there may be fewer or more collapsible joints 1020-1 and/or located in other positions. Each joint 1020-1 may include one or more collapsible membranes 1016-1. As shown, each joint includes one membrane 1016-1. The membrane 1016-1 may have the same or similar features as other membranes described herein, for example the membrane 1016. The membrane 1016-1 may include a single edge 1026-1 along which the membrane 1016-1 may fold other otherwise collapse. The edge 1026-1 may be pre-formed in the membrane 1016-1 for shape memory of the membrane 1016-1 such that the membrane 1016-1 will have a propensity to collapse along the edge 1026-1 and/or in the same direction.

At each joint 1020-1, the membrane 1016-1 may be coupled at one end with the outer surface 1040A-1 of the sidewall portion 1040-1 and on the other end with the outer surface 1041A-1 of the sidewall portion 1041-1. In some embodiments, the membrane 1016-1 may be coupled at one end with the inner surface 1040B-1 of the sidewall portion 1040-1 and on the other end with the inner surface 1041B-1 of the sidewall portion 1041-1. The membrane 1016-1 may at least partially collapse at the joint 1020-1. The membrane 1016-1 may completely collapse at the joint 1020-1. By "collapse" this includes without limitation folding, scrunching, wrinkling, compressing, bending, or otherwise decreasing geometric dimension of the membrane 1016-1 by collapsing upon itself and/or collapsing upon surrounding features.

The joint 1020-1 may include an outer gap 1022-1 and/or an inner gap 1024-1. The outer gap 1022-1 may be on the exterior of the gasket 1000C. The inner gap 1024-1 may be on the interior. The inner gap 1024-1 may therefore face a channel on the inside of the gasket 1000C, such as the channel 1015 described above. The shape of the gaps 1022-1, 1024-1 and/or joint 1020-1 may be defined by the membrane 1016-1 and the end surfaces of the sidewall portions 1040-1, 1041-1. For instance, the joint 1020-1 may be roughly V-shaped in the configuration shown. The gaps 1022-1, 1024-1 may provide spaces such that the joint 1020-1 may bend or flex at the edge 1026-1 to collapse the membrane 1016. "Collapse" here may be as described above. The shape of the gaps 1022-1, 1024-1 may be generally straight from an end of the gasket 1000C toward the ridge 1018-1. The membranes 1016-1 and end surfaces of the sidewall portions 1040-1, 1041-1 that define the gaps 1022-1, 1024-1 may be similarly straight. In some embodiments, the shape of the gaps 1022-1, 1024-1 may be tapered or angled from an end of the gasket 1000C toward the ridge 1018-1, for example as described with respect to the gasket 1000 or 1000B. The membrane 1016-1 may extend from one end of the gasket 1000C to the opposite end. The ridge 1018-1 may therefore be interrupted or discontinuous, as shown.

FIG. 10G shows the gasket 1000C assembled with a clamp 100-1. The clamp 100-1 may have the same or similar features as other clamps described herein, for example the clamp 100. The clamp 100-1 surrounds the gasket 1000C. The clamp 100-1 may include a locking mechanism 101-1. The locking mechanism 101-1 may have the same or similar features as other locking mechanisms described herein, for example the locking mechanism 101. The locking mechanism 101-1 may be tightened to tighten the clamp 100-1 about the gasket 1000C. This may in turn collapse the membranes 1016-1 at the joints 1020-1. The membrane 1016-1 may thus collapse into the inner gap 1024-1 and allow for opposing portions 1040-1, 104101 of the sidewall to move closer together to create a tighter seal about a pipe.

Figure 10H:
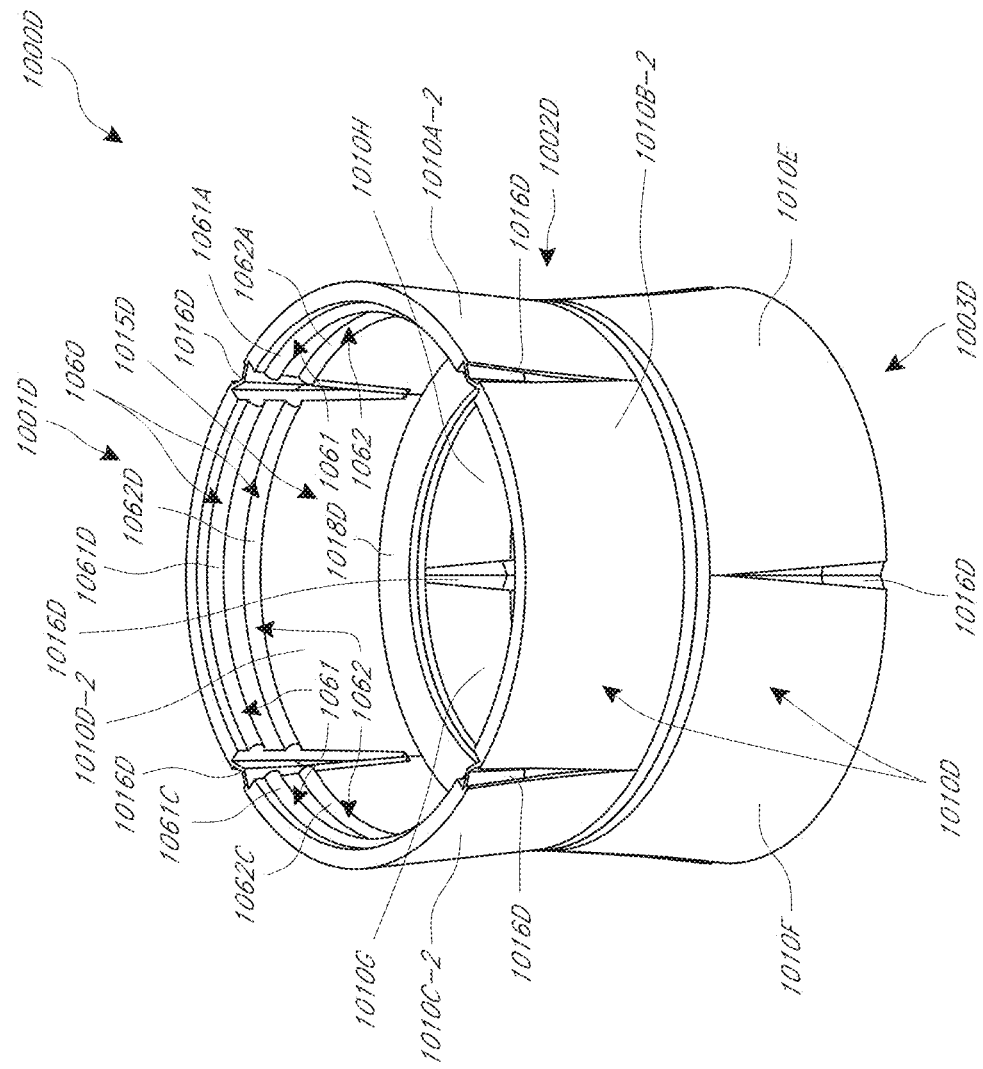
FIG. 10H is a perspective view of another embodiment of a gasket.
Figure 10I:
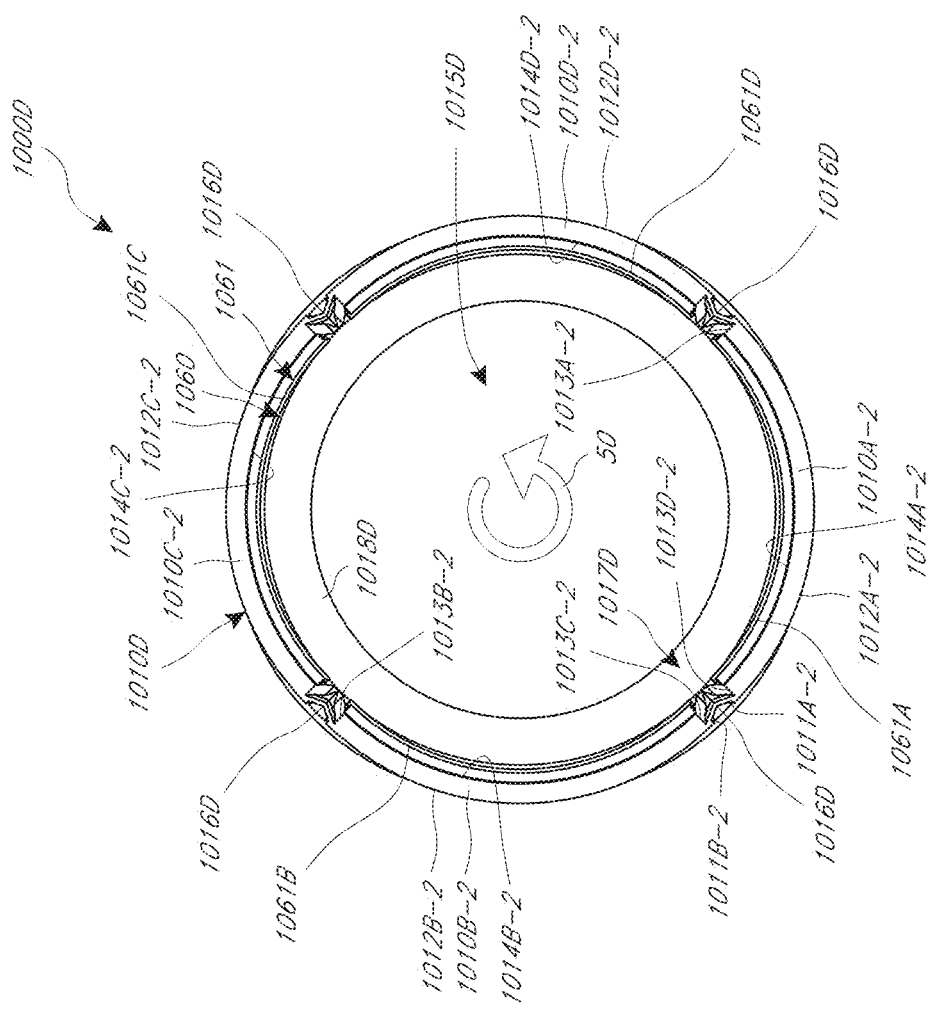
FIG. 10I is a top view of the gasket of FIG. 10H.
Figure 10J:
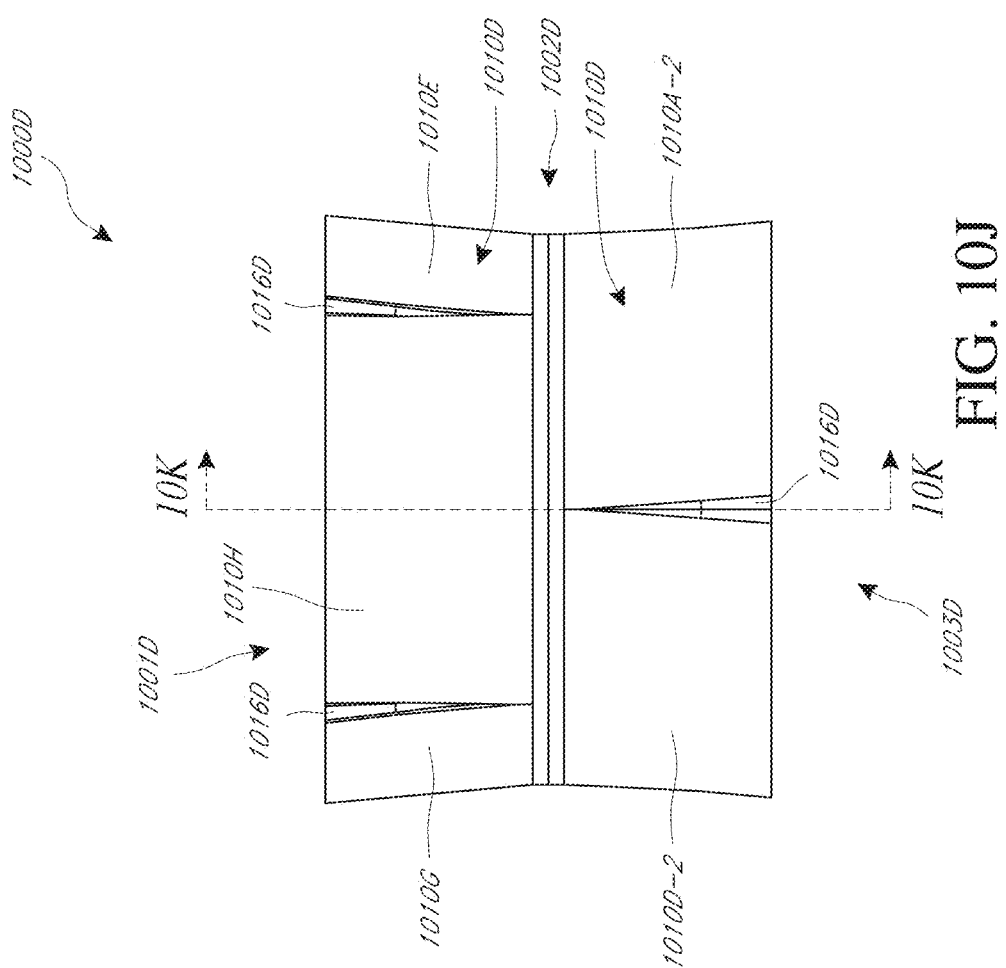
FIG. 10J is a side view of the gasket of FIG. 10H.
Figure 10K:
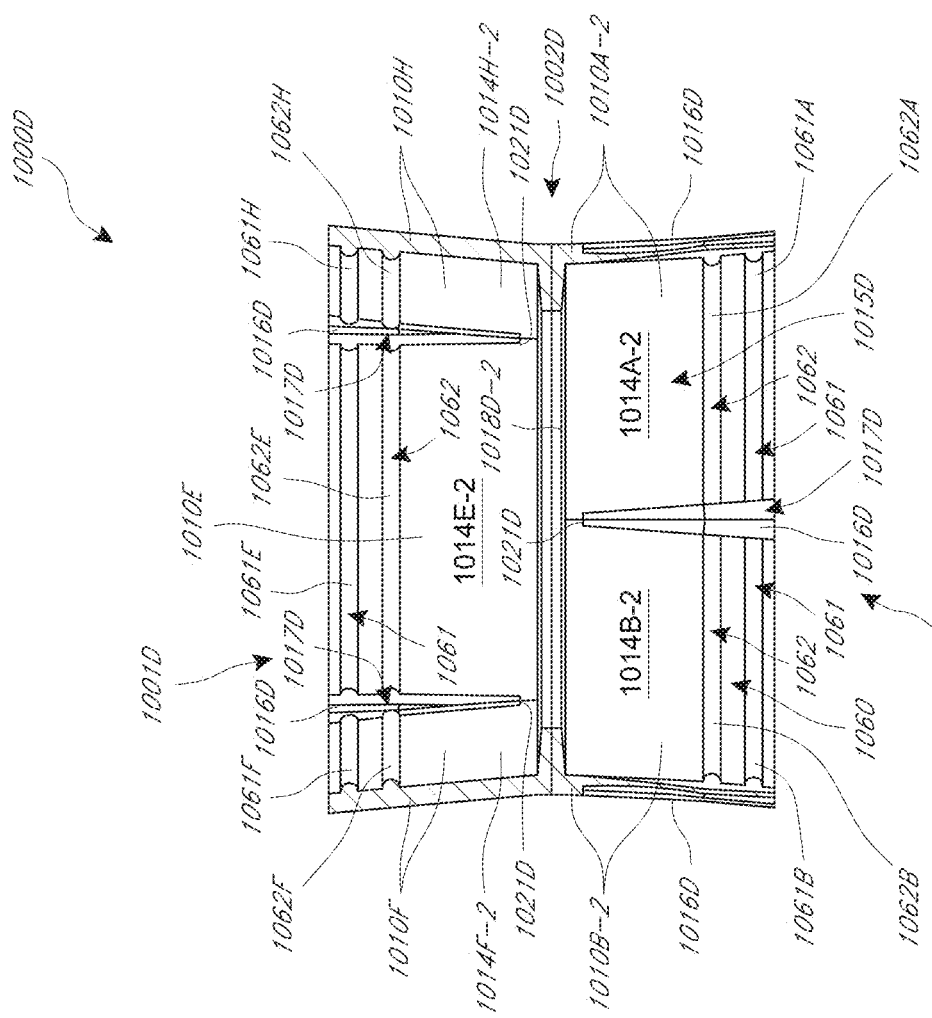
FIG. 10K is a cross-section view of the gasket of FIG. 10H taken along the line 10K-10K as indicated in FIG. 10J.

FIGS. 10H-10K are various views of another embodiment of a gasket 1000D. FIG. 10H is a perspective view of the gasket 1000D. FIG. 10I is a top view of the gasket 1000D. FIG. 10J is a side view of the gasket 1000D. FIG. 10K is a cross-section view of the gasket 1000D taken along the line 10K-10K as indicated in FIG. 10J. The gasket 1000D may have the same or similar features and/or functionalities as the various gaskets described herein, for example the gaskets 1000, 1000A, 1000B, and 1000C, and vice versa.

The gasket 1000D may have features that are analogous to features of the other gaskets described herein, such as the gasket 1000. Thus, the gasket 1000D may have a top end 1001D, a bottom end 1003D, a middle portion 1002D, a sidewall 1010D, a first portion 1010A-2, a second portion 1010B-2, a third portion 1010C-2, a fourth portion 1010D-2, outer surfaces 1012A-2, 1012B-2, 1012C-2, 1012D-2, inner surfaces 1014A-2, 1014B-2, 1014C-2, 1014D-2, a channel 1015D, one or more gaps 1017D, one or more membrane sections 1016D, a first outer edge 1011A-2, a second outer edge 1011B-2, end surfaces 1013A-2, 1013B-2, 1013C-2, 1013D-2, and a ridge 1018D, which may have the same or similar features and/or functionalities respectively as the top end 1001, the bottom end 1003, the middle portion 1002, the sidewall 1010, the first portion 1010A, the second portion 1010B, the third portion 1010C, the fourth portion 1010D, outer surfaces 1012A, 1012B, 1012C, and 1012D, inner surfaces 1014A, 1014B, 1014C, and 1014D, the channel 1015, the gaps 1017, the one or more membrane sections 1016, the first outer edge 1011A, the second outer edge 1011B, the end surfaces 1013A 1013B, 1013C, 1013D, and the ridge 1018 of the gasket 1000. Therefore, any description of these analogous features provided herein with respect to the gasket 1000 may apply as well to the gasket 1000D, and vice versa.

The gasket 1000D may additionally include the portions 1010E, 1010F, 1010G, and/or 1010H, which may have the same or similar features and/or functionalities respectively as the portions 1010A-2, 1010B-2, 1010C-2, and 1010D-2. The portions 1010E, 1010F, 1010G, and 1010H of the gasket 1000D may also have corresponding inner and outer outer surfaces. The portions 1010E, 1010F, 1010G, and 1010H may further define the channel 1015D. Further, the gaps 1017D may each be located between portions 1010E and 1010F, between portions 1010F and 1010G, between portions 1010G and 1010H, and/or between portions 1010H and 1010E.

The sidewall portions 1010E, 1010F, 1010G, and 1010H may be rotated relative to the sidewall portions 1010A-2, 1010B-2, 1010C-2, 1010D-2, such that the membrane portions 1016D near the top end 1001D are rotated relative to the membrane portions 1016D near the bottom end 1003D. As shown in FIG. 10I, the portions and membrane sections near the top end 1001D may be rotated about the rotation direction 50 relative to the portions and membrane sections near the bottom end 1003D. The portions and membrane sections near the top and bottom ends 1001D, 1003D may be rotated relative to each other in varying amounts, such as ten degrees, twenty degrees, thirty degrees, forty five degrees, or any lower, intermediate or greater amount.

In some embodiments, the portions 1010E, 1010F, 1010G, and 1010H may be aligned with the first, second, third and fourth portions 1010A-2, 1010B-2, 1010C-2, 1010D-2, such that the membrane portions 1016D near the top end 1001D are aligned with the membrane portions 1016D near the bottom end 1003D, similar to the gasket 1000. In some embodiments, the various portions and membrane sections of the gasket 1000D may be aligned, for example as shown with respect to the gasket 1000 in FIG. 10B.

The ridge 1018D of the gasket 1000D may form a ring extending from the inner surfaces of the sidewall portions 1010A-2, 1010B-2, 1010C-2, 1010D-2, 1010E, 1010F, 1010G, and/or 1010H toward the interior of the channel 1015D. The ridge 1018D may therefore traverse each sidewall portion 1010A-2, 1010B-2, 1010C-2, 1010D-2, 1010E, 1010F, 1010G, and 1010H.

The gasket 1000D may also include an inner seal 1060. The inner seal 1060 may extend circumferentially around an inner surface or surfaces of the gasket 1000D. As shown, the inner seal 1060 may extend circumferentially around the inner surfaces of the gasket near the top and bottom ends 1001D, 1003D. The inner seal 1060 may be a protrusion along an inner surface or surfaces of the sidewall 1010D that provides a sealing function to the gasket when assembled about a pipe end. In some embodiments, there may be one, two, three, four, or more inner seals 1060.

The inner seal 1060 may include a first inner seal 1061 and/or a second inner seal 1062. The first inner seal 1061 and second inner seal 1062 may be portions of the inner seal 1060. The first inner seal 1061 may be located along an inner surface of the sidewall 1010D closer to the top or bottom ends 1001D, 1003D. The second inner seal 1062 may be located along an inner surface of the sidewall 1010D closer to the middle portion 1002D. The first inner seal 1061 and second inner seal 1062 may each be comprised of portions located on inner surfaces of the sidewall portions. As shown, the first inner seal 1061 may include first inner seal portions 1061A, 1061B, 1061C and 1061D located along inner surfaces respectively of the portions 1010A-1, 1010B-2, 1010C-2, and 1010D-2. There may be first inner seal portions 1061A, 1061B, 1061C and 1061D located along inner surfaces near the top and bottom ends 1002D, 1003D. As further shown, the second inner seal 1062 may include second inner seal portions 1062A, 1062B, 1062C and 1062D located along inner surfaces respectively of the portions 1010A-1, 1010B-2, 1010C-2, and 1010D-2. There may be second inner seal portions 1061A, 1061B, 1061C and 1061D located along inner surfaces near the top and bottom ends 1001D, 1003D but closer to the middle portion 1002D as compared to the first inner seal portions 1061A, 1061B, 1061C and 1061D. As seen in FIG. 10K, the gaps 1017D can form a flat surface 1021D at an end of the V-shaped gaps 1017D. The flat surface 1021D can extend generally perpendicular to a longitudinal axis of the V-shaped gap 1017D. The flat surface 1021D can help the gasket 1000D to form a more effective seal when collapsed.

Figure 10M:
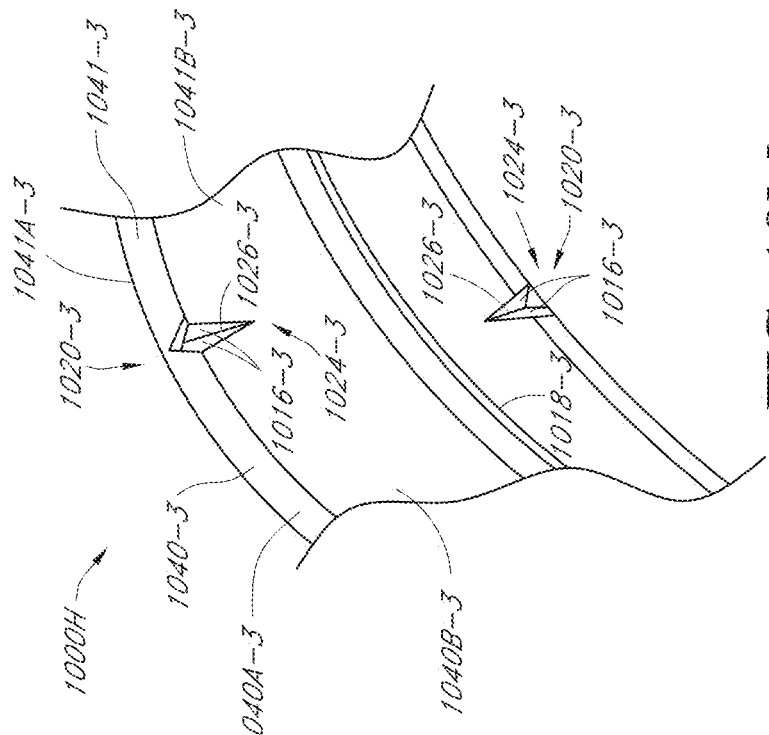
FIG. 10M is a partial perspective view of a portion of another embodiment of a gasket.
Figure 10L:
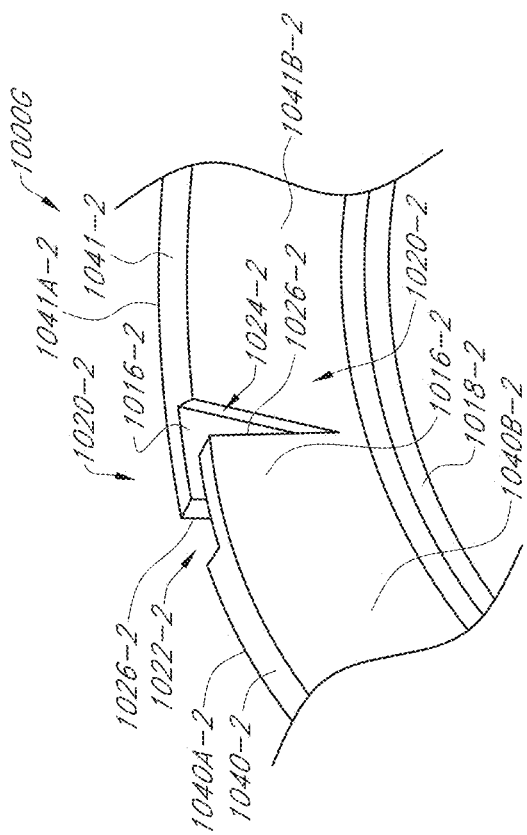
FIG. 10L is a partial perspective view of a portion of another embodiment of a gasket.

FIG. 10L shows a perspective view of an embodiment of gasket 1000G. The gasket 1000G may include the same or similar features and/or functionalities as the various gaskets described herein, for example the gaskets 1000, 1000A, 1000B, 1000C, and 1000D, and vice versa.

As shown in FIG. 10L, the gasket 1000G may include a first sidewall portion 1040-2 and a second sidewall portion 1041-2. The sidewall portions 1040-2, 1041-2 may have the same or similar features as the other sidewall portions described herein, for example the sidewall portions 1010A-D. The sidewall portion 1040-2 may include an outer surface 1040A-2 and an inner surface 1040B-2. The sidewall portion 1041-2 may include an outer surface 1041A-2 and an inner surface 1040B-2. The various inner and outer surfaces 1040A-2, 1040B-2, 1041A-2, 1041B-2 may have the same or similar features as other sidewall surfaces described herein, for example the sidewall surfaces 1014A-D and 1012A-D. The gasket 1000G may further include a ridge 1018-2, which may be described as above.

The gasket 1000G may include one or more collapsible joints 1020-2. Each joint 1020-2 may include one or more of the collapsible membranes 1016-2. The adjacent membranes 1016-2 may be separate and be moveable relative to each other. The membranes 1016-2 may extend circumferentially from respective sidewall portions 1040-2, 1041-2 and be configured to slide past one another upon contraction of the gasket 1000G. The inner surface of one membrane 1016B-2 may contact an outer surface of another membrane 1016A-2. Two adjacent membranes 1016-2 may be separate or be at least partially connected. In some embodiments, two adjacent membranes 1016-2 may be connected intermittently along the longitudinal direction. In some embodiments, there may be more than two membranes 1016-2 at a single collapsible joint 1020-2, in such embodiments there may be a mixture where some adjacent membranes 1016-2 are connected and some adjacent membranes 1016-2 are not connected, all the adjacent membranes 1016-2 may be separate, or all the adjacent membranes may be connected. The membrane(s) 1016-2 may at least partially collapse at the joint 1020-2. The membrane(s) 1016-2 may completely collapse at the joint 1020-2. The membranes 1016-2 may independently collapse. "Collapse" here may be as described above.

The joint 1020-2 may include an outer gap 1022-2 and/or an inner gap 1024-2. The outer gap 1022-2 may be on the exterior of the gasket 1000G. The inner gap 1024-2 may be on the interior. The inner gap 1022-2 and the outer gap 1024-2 may be connected when the membranes 1016-2 are separated. The inner gap 1024-2 may therefore face a channel on the inside of the gasket 1000G, such as the channel 1015 described above. The outer gap 1022-2 may be formed at least partially by the outer surface 1016A-2 of the membrane 1016-2 and the inner gap 1024-2 may be formed adjacent to the outer gap 1022-2 at least partially by the inner surface 1016B-2 of the membrane 1016-2. The shape of the gaps 1022-2, 1024-2 and/or joint 1020-2 may be defined by the membrane 1016-2 and the end surfaces of the sidewall portions 1040-2, 1041-2. The gaps 1022-2, 1024-2 may provide spaces such that the joint 1020 may bend or flex at one or more edges 1026-2 to collapse the membrane 1016-2. "Collapse" here may be as described above. The shape of the gaps 1022-2, 1024-2 may be tapered or otherwise angled from an end of the gasket 1000G toward the ridge 1018-2. The membranes 1016-2 and end surfaces of the sidewall portions 1040-2, 1041-2 that define the gaps 1022-2, 1024-2 may be similarly tapered or angled. For example, the gaps 1022-2, 1024-2 may be triangular or wedge shaped, as shown in FIG. 10L. The membrane 1016-2 may not extend all the way to ridge 1018, as best seen in FIG. 10L. In other embodiments, the membrane 1016-2 may extend to or through the ridge 1018-2.

FIG. 10M is a perspective view of a portion of an embodiment of a gasket 1000H. The gasket 1000H may include the same or similar features as the gasket 1000 described with respect to FIGS. 10A-10B, and vice versa. The gasket 1000H may include the same or similar features as the gasket 1000A described with respect to FIG. 10C, and vice versa. The gasket 1000H may include the same or similar features as the gasket 1000B described with respect to FIGS. 10D-10E, and vice versa. The gasket 1000H may include the same or similar features as the gasket 1000C described with respect to FIGS. 10F-10G, and vice versa. The gasket 1000H may include the same or similar features as the gasket 1000D as described in FIGS. 10H-10K, and vice versa. The gasket 1000H may include the same or similar features as the gasket 1000E as described in FIG. 10L, and vice versa.

As shown in FIG. 10M, the gasket 1000H may include a first sidewall portion 1040-3 and a second sidewall portion 1041-3. The sidewall portions 1040-3, 1041-3 may have the same or similar features as the other sidewall portions described herein, for example the sidewall portions 1040-3 and 1041-3. The top and/or bottom ends of the gasket 1000H may each comprise the first sidewall portion 1040-3 at least partially separated from the second sidewall portion 1041-3 by a gap 1024-3 formed circumferentially therebetween. The sidewall at the gap 1024-3, for example along an edge 1026-3, is thinner than each of the adjacent first and second sidewall portions 1040-3, 1041-3. The gap 1024-3 is configured to collapse upon contraction of the respective top and bottom ends to bring the first and second sidewall portions 1040-3, 1041-3 closer together. The sidewall portion 1040-3 may include an outer surface 1040A-3 and an inner surface 1041B-3. The various inner and outer surfaces 1040A-3, 1040B-3, 1041A-3, 1041B-3 may have the same or similar features as other sidewall surfaces described herein, for example the sidewall surfaces 1040A, 1040B, 1041A, 1041B. The gasket 1000H may further include a ridge 1018-3, which may have the same or similar features as other ridges described herein, for example the ridge 1018.

The gasket 1000H may include one or more collapsible joints 1020-3. Each joint 1020-3 may include one or more of the collapsible membranes 1016-3. The membrane sections 1016-3 may connect a first inner edge 1040B-3 of the sidewall portion 1040-3 to a second inner edge 1041B-3 of the sidewall portion 1041-3. The membrane section may be of a lesser thickness than the sidewall portions 1040-3 and 1041-3. As shown in FIG. 10M, there may be two collapsible joints 1020-3 located on opposite ends of the gasket 1000H. In some embodiments, there may be fewer or more collapsible joints 1020-3 and/or located in other positions. As shown the membranes 1016-3 do not extend to the ridge 1018-3. In some embodiments, one or more of the membranes 1016-3 may extend to or through the ridge. The membrane 1016-3 may have the same or similar features as other membranes described herein. The membrane 1016-3 may include a single edge 1026-3 along which the membrane 1016-3 may fold or otherwise collapse. The edge 1026-3 may be pre-formed in the membrane 1016-3 for shape memory of the membrane 1016-3 such that the membrane 1016-3 will have a propensity to collapse along the edge 1026-3 and/or in the same direction.

As shown in FIG. 10M, the outer surface 1040A-3 and 1041A-3 may be connected and have a continuous outer surface. In some embodiments, the membrane 1016-3 may be coupled at one or both ends of the outer surfaces 1040A-3, 1041A-3. As shown, the membrane 1016-3 may be coupled at one end with the inner surface 1040B-3 of the sidewall portion 1040-3 and on the other end with the inner surface 1041B-3 of the sidewall portion 1041-3. The membrane 1016-3 may at least partially collapse at the joint 1020-3. The membrane 1016-3 may completely collapse at the joint 1020-3. By "collapse" this includes without limitation folding, scrunching, wrinkling, compressing, bending, or otherwise decreasing geometric dimension of the membrane 1016-3 by collapsing upon itself and/or collapsing upon surrounding features.

As shown in FIG. 10M, the joint 1020-3 may include an inner gap 1024-3. The inner gap 1024-3 may be on the interior. The inner gap 1024-3 may therefore face a channel on the inside of the gasket 1000H, such as the channel 1015 described above. The shape of the gap 1022-3 and/or joint 1020-3 may be defined by the membrane 1016-3 and the end surfaces of the sidewall portions 1040-3, 1041-3. For instance, the inner gap 1024-3 may be roughly V-shaped in the configuration shown. The gap 1024-3 may provide spaces such that the joint 1020-3 may bend or flex at the edge 1026-3 to collapse the membrane 1016-3. "Collapse" here may be as described above.

The membrane sections 1016-3 may be angled. The membrane sections 1016-3 may be trapezoidal or they may be other angled shapes, such as triangular, etc. As shown in FIG. 10M, the membrane sections 1016-3 may be wider at the top and bottom ends and of the gasket 1000F as compared to the part closer to the ridge 1018-3. The end surfaces of sidewall portions 1040-3, 1041-3, may likewise be angled. The tapered or otherwise angled configuration of the membrane 1016-3 and end surfaces sidewall portions 1040-3, 1041-3, may facilitate differential compression of the gasket 1000.

Figure 11:
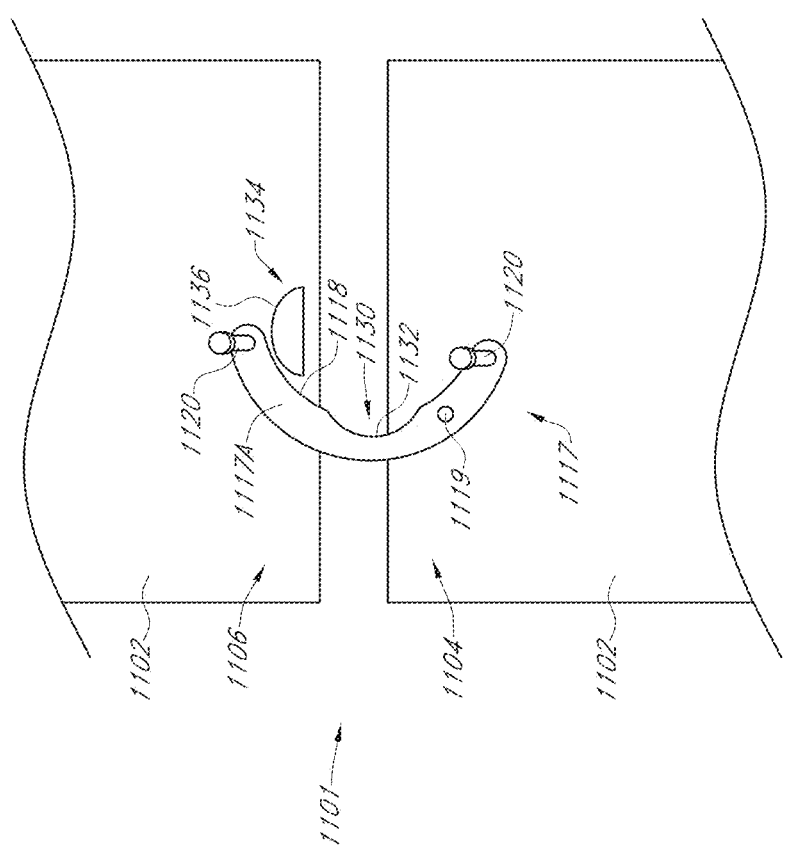
FIG. 11 is a top view of an embodiment of a locking mechanism that may be used with the various clamps described herein.

FIG. 11 is a top view of an embodiment of a locking mechanism 1101 for securing a first end 1106 and a second end 1104 of a band 1102. The band 1102 may have the same or similar features as other bands described herein. The locking mechanism 1101 may employ a latch 1117 having a latch body 1117A coupled with and extending away from the second end 1104 of the band 1102. The latch body 1117A may be coupled to the band 1102 through a pivot pin 1119 around which the latch 1117 may freely rotate. The latch 1117 may include two turn pins 1120 coupled to opposite ends of the latch body 1117A and on opposite sides of the pivot pin 1119. Applying torque to either or both of the turn pins 1120 may rotate the latch 1117 around the pivot pin 1119. The turn pins 1120 may be arcuate projections as shown. The turn pins 1120 may be configured for gripping with a tool, such as the tool shown in FIGS. 7A through 7C, to facilitate tightening and locking the locking mechanism 1101 and thus the band 1102. Further details of tools that may be used are discussed herein.

As further shown in FIG. 11, the first end 1106 of the band 1102 may be coupled with a locking projection 1134 extending away from the band 1102. The locking projection 1134 may have a curved surface 1136 facing away from the first end 1106 of the band 1102. The locking projection 1134 may be in the shape of a semi-circle as depicted. The curved surface 1136 may be semi-circular, or other rounded or semi-rounded shapes, such as short but straight segments forming a rounded contour. Further, the latch body 1117A may have an inner curved edge 1118. The latch 1117 may further include a recess 1130 within its inner curved edge 1118. The recess 1130 may have a curved edge 1132.

The curved edge 1132 of the latch 1117 may complement the curved surface 1136 of the locking projection 1134. In some embodiments, the curved edge 1132 may snuggly abut the curved surface 1136 when the locking mechanism 1101 is locked. The pivot pin 1119 and locking projection 1134 may be positioned on the second end 1104 and first end 1106 of the band 1102, respectively, in a configuration that allows the curved edge 1132 of the recess 1130 to receive the curved surface 1136 of the locking projection 1134 only when the curved edge is rotated into position around the curved surface 1136 such that the first and second ends 1106, 1104 are brought together. As shown, the latch 1117 is in an unlocked configuration. Bringing the first and second ends 1106, 1104 together so that the locking projection 1136 is received inside the recess 1130 may define a locked position. The curved edge 1132 of the recess 1130 and the inner curved edge 1118 of the latch 1117 may facilitate sliding of the latch over the curved surface 1136 of the locking projection 1134 as the latch 1117 is rotated around the pivot pin 1119 to bring the latch into a locked or unlocked position. The turn pins 1120 may be used to apply torque to latch 1117 around the pivot pin 1119 and facilitate the locking and unlocking of the latch 1117. In some embodiments, to lock the latch 1117, the inner curved edge 1118 may slide over the curved surface 1136, and the curved edge 1132 of the recess 1130 may then contact the curved surface 1136 to secure or otherwise lock the latch 1117 in place.

Figure 12A:
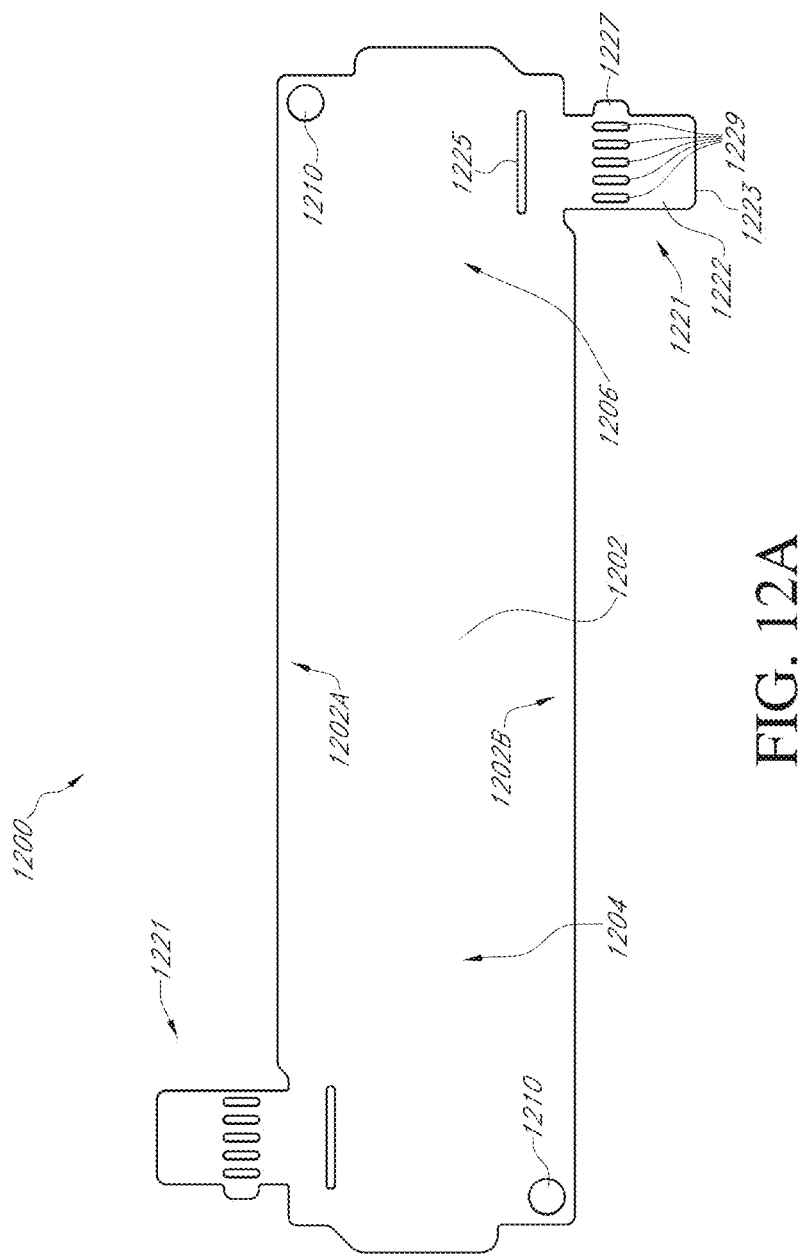
FIG. 12A is a top view of an embodiment of a band in a flat configuration that may be used to form the clamps described herein.

FIGS. 12A through 12H depict embodiments of various components of an embodiment of a clamp. The various components may be easily manufactured and assembled into a clamp, which may be the same or similar as the clamps described herein. FIG. 12A shows a top view of a band 1200 in a flat configuration. The band 1200 in the flat configuration as shown in FIG. 12A may be used to form or assemble a clamp. In some embodiments, the band 1200 may be formed into the rounded configuration shown in FIG. 12B.

Figure 12B:
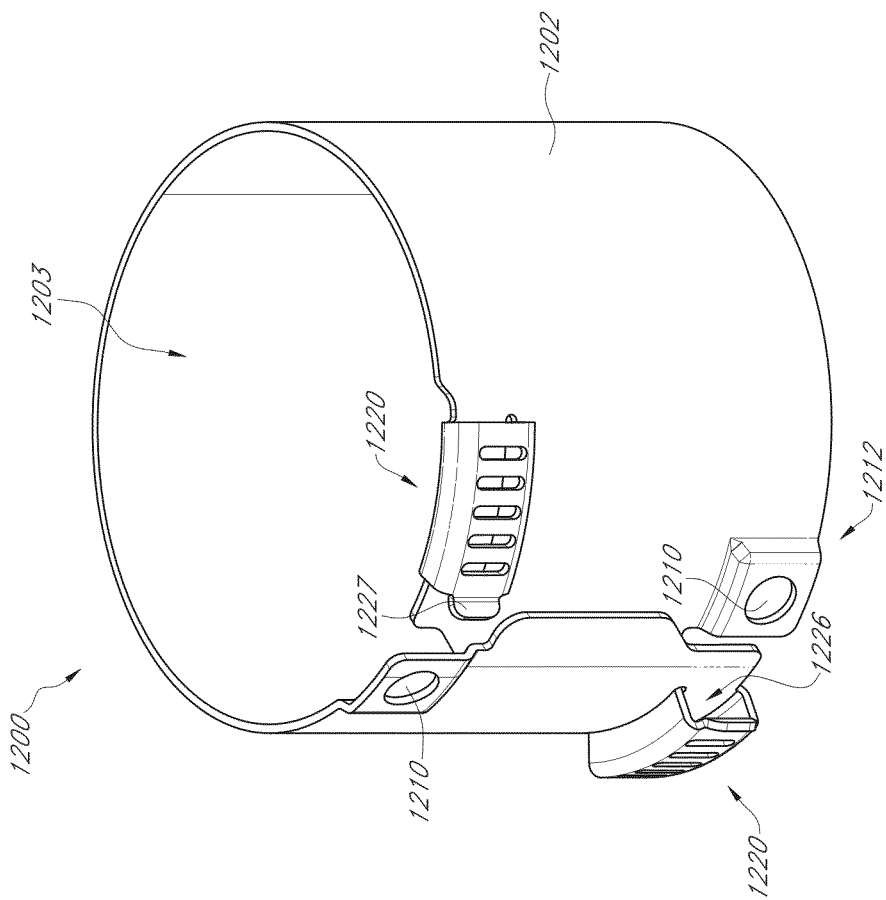
FIG. 12B is a perspective view of the band of FIG. 12A in a rounded configuration.

As shown in FIG. 12A, the band 1200 may have a band body 1202. The band body 1202 may be manufactured from a monolithic piece of material. The band body 1202 may be manufactured from a flat sheet of material, such as steel, aluminum or other suitable materials, whether metallic or otherwise. The material may therefore be metal or another rigid material that may be bent into the shape of the rounded band 1200 depicted in FIG. 12B. As further shown in FIG. 12A, the band body 1202 may have a first end 1204 and a second end 1206 as well as a first outer edge region 1202A and a second outer edge region 1202B. The band body 1202 may be configured such that each outer edge region 1202A, 1202B comprises portions of a locking mechanism. The band body 1202 may be configured so that portions of the locking mechanism are positioned on opposite ends 1204, 1206 of the band, as shown in FIGS. 12A and 12B. The band body 1202 may be thin. In some embodiments, the band body 1202 may be about 0.040 inches thick. The band body 1202 may have a uniform or non-uniform thickness.

The band body 1202 may include one or more flanges 1221 for forming one or more channels 1220 (see, for example, FIG. 12B). The one or more channels 1220 may be formed as integral parts of the band body 1202 from flanges 1221 that extend from the outer edge portions 1202A, 1202B of the band body 1202. Each flange 1221 may be located near one of the ends 1204, 1206 of the band body 1202 and on opposite outer edge portions 1202A, 1202B. The flanges 1221 may be generally rectangular in shape. The flanges 1221 may include a flange body 1222 having an outer edge 1223. The outer edge 1223 may be straight and parallel to the edges of the outer edge portions 1202A, 1202B that run along the remaining length of the band body 1202 where the flanges 1222 are not present. The band body 1202 may further include slits 1225 formed in outer edge portions 1202A, 1202B, of the band near the flanges 1221. The slits 1225 may be elongate in shape and extend parallel to the outer edges 1223 of the flanges 1222. The slits 1225 may be positioned along the circumferential length of the band body 1202 to align with the outer edges 1223. The slits 1225 may have a length equal to or greater than that of the outer edges 1223 and a width equal to or greater than the thickness of the manufactured band body 1202. The flanges 1221 may be bent or otherwise deformed such that each slit 1225 receives the outer edge 1223 of an adjacent flange 1221 to form the corresponding channel 1220, as further discussed below and as shown in FIG. 12B.

The flange body 1222 may also include slots 1229. The slots 1229 may be elongate, parallel to each other, and extend in a direction transversely to the band body 1202. The slots 1229 may be positioned closer to the end of the flange body 1222 that is coupled with the remainder of the band body 1202 than to the outer edge 1223. The flanges 1221 may include a nub 1227 extending from a side edge of the flange body 1222 and substantially aligned with the slots 1229. The nub 1227 may be about the same length as the slots 1229. The nub 1227 may be substantially rectangular but may have rounded corners. The nub 1227 may be located on the side of the flange 1221 closest to the end 1204, 1206 of the band body 1202 to which the flange is coupled, as shown in FIGS. 12A, 12B, and 12H. Alternatively, the nub 1227 may be located on the opposite side of the flange 1222 furthest from the end 1204, 1206 of the band body 1202 to which the flange 1221 is coupled.

The flange 1221 may be bent to form the final configuration of the channel 1220, shown in FIG. 12B. The outer edge 1223 may be received within the slit 1225. The portion of the flange 1221 that extends through the slit 1225 may be bent back toward the outer edge portion 1202A, 1202B to which the flange 1221 is coupled in order to secure the flange within the slit. The flange 1221 may be further bent to form three edges, all parallel to outer edge 1223, such that the channel 1220 forms an opening 1226 that is generally rectangular in shape. For instance, the flange 1221 may be bent along an axis formed by the intersection of the flange 1221 and the band body 1202, as well as on both sides of the series of slots 1229, such that the slots 1229 are positioned on a top portion of the rectangular channel 1220, in a plane parallel with the remainder of the band. The nub 1227 may be bent upward so that it forms an angled end portion to the channel 1220 that extends upward and toward the end 1204, 1206 of the band body 1202 to which the channel is coupled. Alternatively, the nub 1227 may be formed on the opposite end of the channel 1220, extending upward and away from the end 1204, 1206 of the band body 1202 to which the channel is coupled. The nub 1227 may act as a guide for a tool such as a flat head screwdriver, orienting the tool into the proper position for disengaging the locking mechanism of the band body 1202.

The band body 1202 may include holes 1210 located at opposite ends 1204, 1206 of the band body 1202. The holes 1210 may be positioned near outer edge portions 1202A, 1202B of the band body 1202 so as to align with the channel 1220 to which it is opposed (see FIG. 12B). The hole 1210 may be circular in shape. As shown in FIG. 12B, the band body 1202 may be manufactured such that a rectangular portion of each corner 1212 of the band possessing a hole 1210 may be raised so that the hole lies in a plane parallel to the remainder of the band but elevated slightly above the surface of the band. In some embodiments, the band body 1202 may be formed, partially or wholly, by being stamped. Thus, the raised hole 1210 shown in FIG. 12B may be formed by stamping accordingly that portion of the band body 1202.

As shown in FIG. 12B, the band body 1202 may be bent from a flat configuration to a circular or rounded shape, to bring the first and second ends 1204, 1206 of the band together. The first and second ends 1204, 1206 may slightly overlap when the band body 1202 is in its bent configuration. The bent configuration of the band body 1202 may for a circular channel 1203 for receiving the ends of two abutting pipes. The bent configuration may bring each channel 1220 near an opposing hole 1210.

Figure 12C:
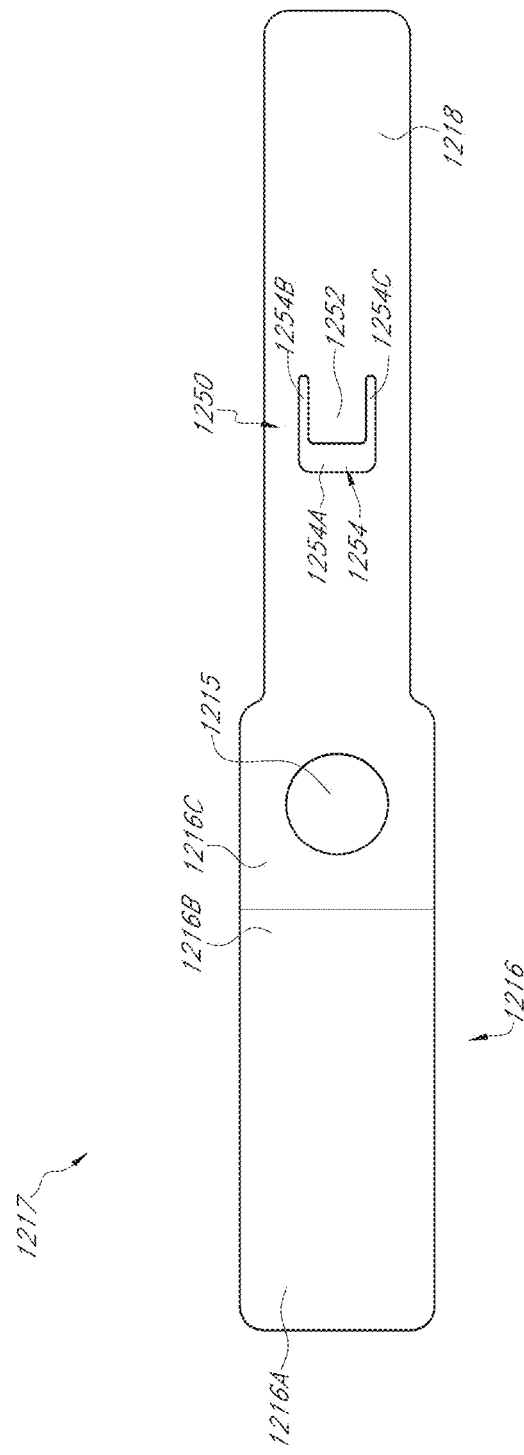
FIG. 12C is a top view of an embodiment of a tab in a flat configuration that may be used with the band of FIGS. 12A-12B.

FIG. 12C is a top view of an embodiment of a tab 1217 that may be used with the band body 1202. The first and second ends 1204, 1206 of the band body 1202 may be secured together with one or more of the tabs 1217, which may be flexible. The tab 1217 may be manufactured as a separate component. The tab 1217 may be manufactured from a monolithic piece of material. The tab 1217 may be manufactured from a flat piece of material. The material may be metal or another rigid material that may be bent into the shape of the formed component depicted in FIG. 12D. The tab 1217 may include a base 1216 which may be detachably coupled to the band body 1202. The tab 1217 may further include an extension 1218 which is received by the opening 1226 of the channel 1220 for securing the first and second ends 1204, 1206 of the band 1200 together. The base 1217A may be wider than the extension 1218 as shown in FIG. 12C.

Figure 12D:
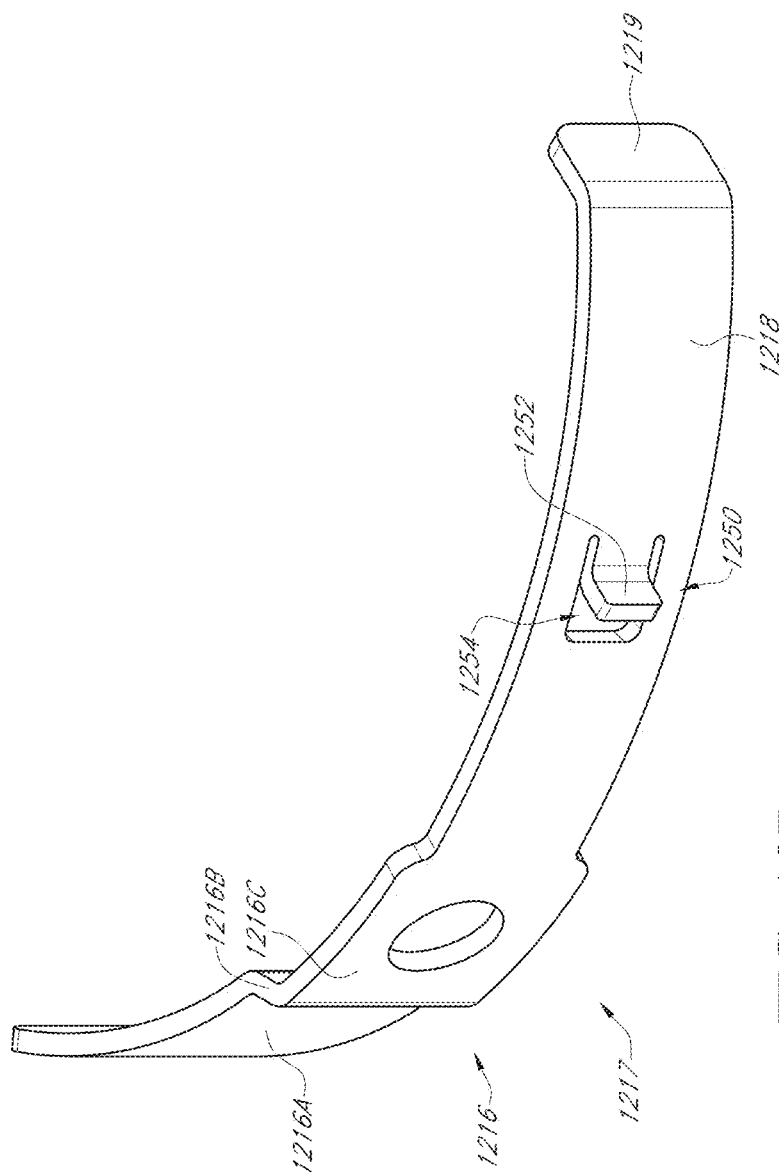
FIG. 12D is a top view of the tab of FIG. 12C in a rounded configuration.

The extension 1218 may include a flange 1252 formed within a recess 1254 for forming a raised portion 1250. The recess 1254 may be centrally located within the extension 1218 such that it does not extend to any of the tab's outer edges. The recess 1254 may include three generally rectangular spaces 1254A, 1254B, 1254C that define the flange 1252, which may be rectangular in shape. The first space 1254A may be formed at the distal end of the flange 1252 with the second space 1254B and third space 1254C extending from one side of the first space along the lateral edges of the flange to its proximal end. The corners of the flange 1252 and recess 1254 may be rounded. The flange 1252 may be bent upward (as shown in FIG. 12D) at its proximal end to form a raised portion 1250 for engaging one of the slots 1229 of channel 1220 when the tab 1217 is inserted into the opening 1226.

The raised portion 1250 of the tab 1217 may be elongate and shaped to complement the shape of the slots 1229. The tab 1217 may be able to flex upward and downward for engaging and disengaging the slots 1229. The tab 1217 may be configured such that it is biased upward within the channel 1220 when assembled with the band body 1202 so that the raised portion 1250 may engage a slot 1229 when no pressure is applied. The tab 1217 may be flexible so that it can be deflected downward to disengage from the slot 1229. The tab 1217 may be made sufficiently flexible by manufacturing it from a thin piece of material. The slots 1229 may be large enough to accommodate a tool, such as a flat head screwdriver, which could be used to apply downward pressure to the raised portion 1250 and disengage the tab 1217 from the channel 1220. The distal end of the extension 1218 of the tab 1217 may be bent downward to form a lip 1219 extending away from the tab.

The base 1216 may include a proximal section 1216A, a middle section 1216B, and a distal section 1216C. The sections 1216A, 1216B, 1216C may be integral with each other and of the same width. The distal section 1216C may be raised above the proximal section 1216A by bending the tab 1217 along the edges of the middle section 1216B such that the middle section 1216B forms an angled surface extending from the proximal section 1216A upward to the distal section 1216C. The tab 1217 may be coupled with the band body 1202 using a hole 1215 formed in the distal section 1216C of the tab. The hole 1215 may be circular and may be located in the center of the distal section 1216C. The entire tab 1217 may be slightly bent into a curved shape, as shown in FIG. 12D, which generally complements the circumference of the rounded band body 1202.

Figure 12E:
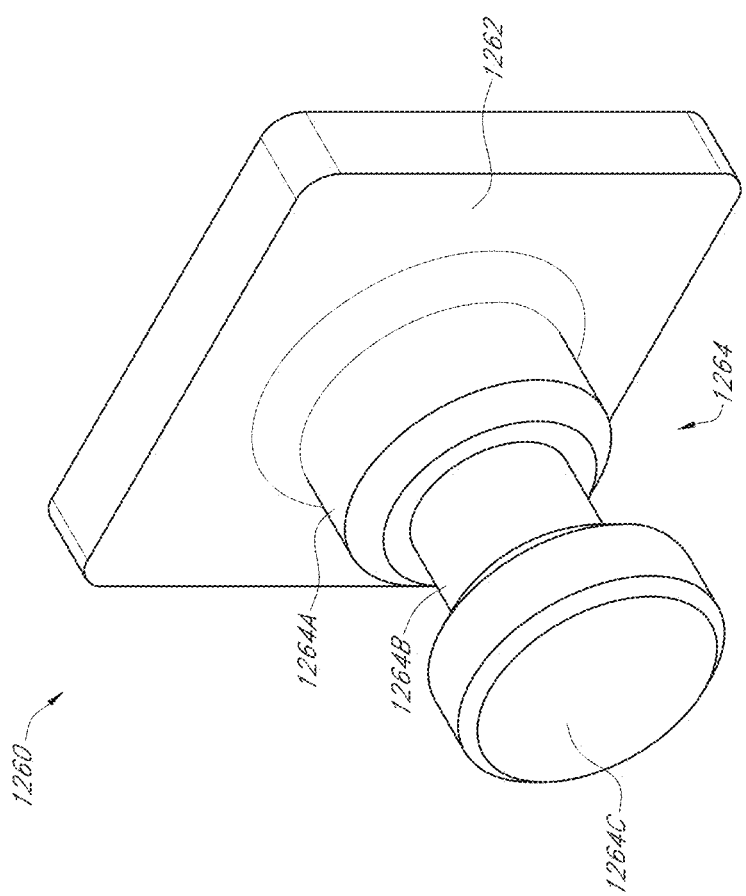
FIG. 12E is a perspective view of an embodiment of a pin that may be used with the band of FIGS. 12A-12B.

FIG. 12E is a perspective view of an embodiment of a pin 1260 that may be used with the band body 1202. The tab 1217 may be coupled with the band body 1202 via the pin 1260. The pin 1260 may be metal or another rigid material. The pin 1260 may include a base 1262 coupled with a protrusion 1264. The base 1262 may be rectangular in shape and the protrusion 1264 may be generally rounded in shape. The base 1262 and protrusion 1264 may be integral and they may be manufactured from a single piece of monolithic material or manufactured then joined together. The protrusion 1264 may include three sections 1264A, 1264B, 1264C extending from the base 1262 to a distal end. Each section may be generally cylindrical in shape. The first section 1264A may be coupled with the base 1262 on one end and coupled with the second section 1264B on the other end. The second section 1264B may be coupled to the first section 1264A on one end and coupled with the third section 1264C on the other end. The diameter of the first and third sections 1264A, 1264C may be greater than the diameter of the second section 1264B. The diameter of the first and third sections 1264A, 1264C may be equal. The width and length of the base 1262 may be greater than the any of the diameters of the three sections 1264A, 1264B, 1264C. The proximal and distal ends of the sections 1264A, 1264B, 1264C may form the end of cylinders, the edges of which may be beveled.

The sections 1264A, 1264B, 1264C may be sized to allow for the pin 1260 to couple the tab 1217 to the band body 1202. In some embodiments, the hole 1215 of the tab 1217 may be aligned with the hole 1210 of the band body 1202 to form a continuous channel therethrough. The holes 1215, 1210 may receive the protrusion 1264 of the pin 1260. The base 1262 of the pin 1260 may butt against an outer surface of the tab 1217, such as an outer surface of the distal section 1216C of the tab 1217. The protrusion 1264 may then extend through the holes 1215, 1210 such that the third section 1264C extends beyond the holes 1215, 1210 to secure the tab 1217 to the band body 1202. In some embodiments, the outer width of the third section 1264C may be the same as the widths of the holes 1215, 1210. In some embodiments, the outer width of the third section 1264C may be slightly smaller than the widths of the holes 1215, 1210. In other embodiments, the outer width of the third section 1264C may be larger than the widths of the holes 1215, 1210 such that the third section 1264C cannot easily be removed once inserted through the holes 1215, 1210. In some embodiments, the protrusion 1264 may be flexible to allow the protrusion 1264 to partially deform to fit through the holes 1215, 1210. In some embodiments, the protrusion 1264 may be a rubber or other flexible material that allows the protrusion 1264 to fit through the holes. Further details of assembly of the pin 1260 with the tab 1217 and band body 1202 are described herein, for example with respect to FIG. 12G.

Figure 12F:
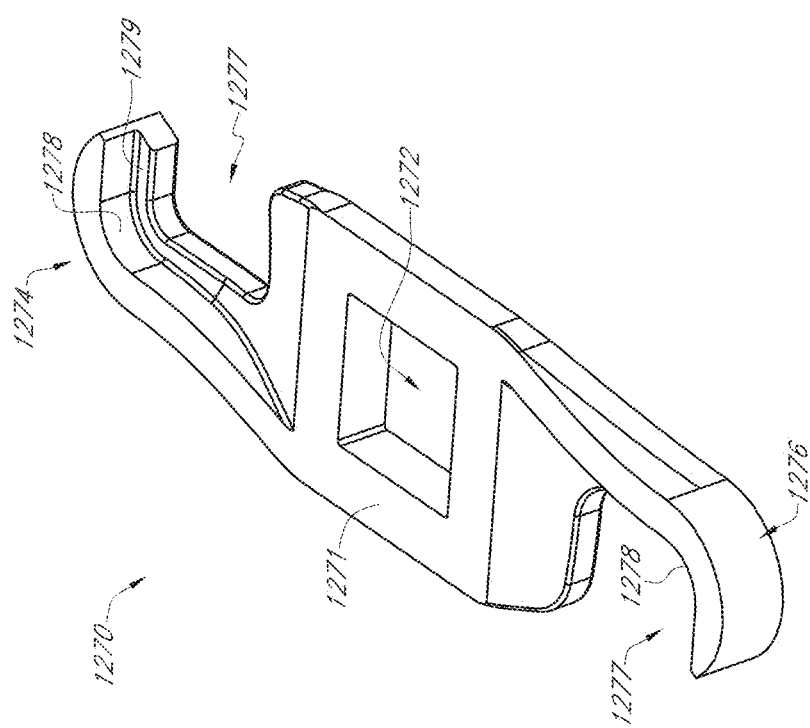
FIG. 12F is a perspective view of an embodiment of a tool that may be used with the band of FIGS. 12A-12B.
Figure 12H:
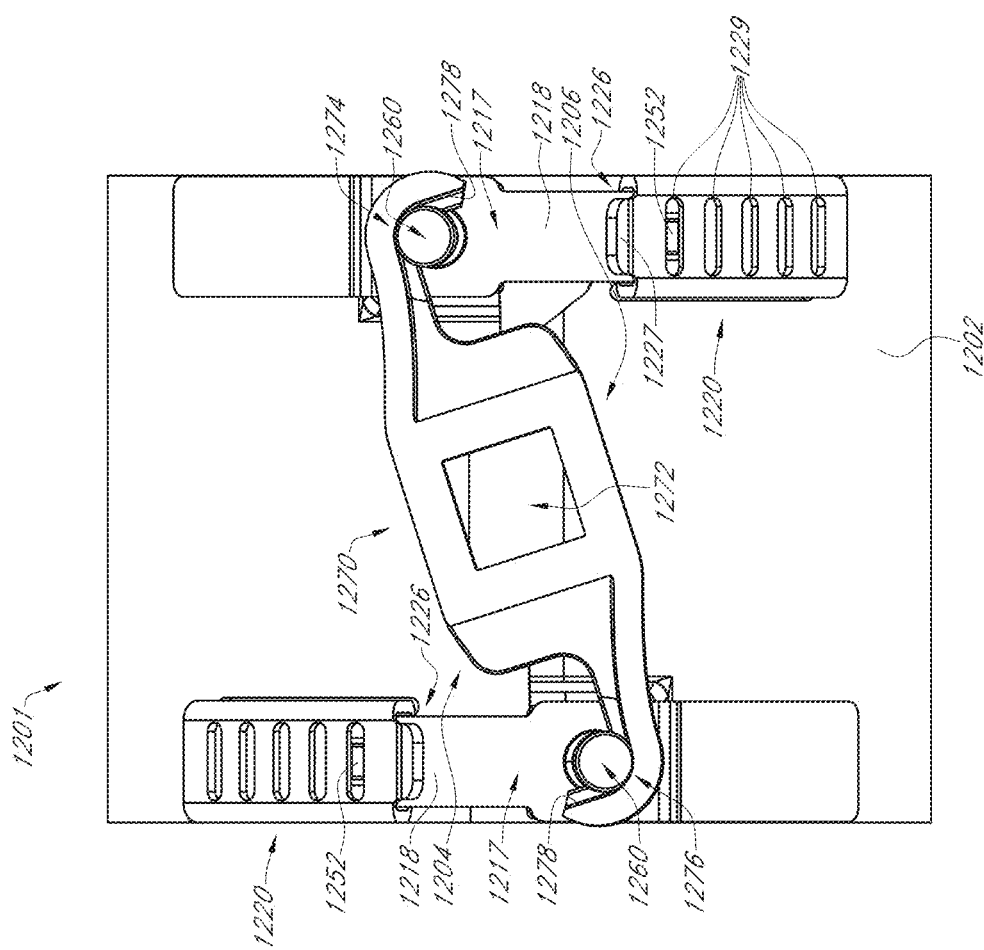
FIG. 12H is a top view of an embodiment of a clamp formed from the components of FIGS. 12A-12E and engaged by the tool of FIG. 12F.

FIG. 12F depicts an embodiment of a tool 1270 for closing a clamp. The tool 1270 may be used with the components of a clamp depicted in FIGS. 12A-12E that are shown assembled in FIG. 12H. However, the tool 1270 may be used with any suitable clamp. As shown in FIG. 12F, the tool 1270 may include a head 1271 which may be coupled to the end of a handle (not shown) for applying torque. The head 1271 may include an opening 1272 for receiving a handle. The opening 1272 may be substantially rectangular. The opening 1272 may have a decreasing width from one side of the tool 1270 to the opposite side. The tool 1270 may include a first sidewall 1274 and a second sidewall 1276 positioned on opposite ends of the head 1271. Each sidewall 1274, 1276 may define a cavity 1277 for receiving arcuate projections 1264 as shown in FIGS. 12G and 12H. The arcuate projections may be on the pins 1260.

The cavities 1277 may have rounded portions 1278 configured to contact arcuate projections 1264. The cavities 1277 and the rounded portions 1278 formed by the first and second sidewalls 1274, 1276 may face opposite directions from each other. Applying torque to the tool 1270 may rotate the head 1271 about the arcuate projections 1264 so that contact of the arcuate projections with the rounded portions 1278 of the cavities 1277 biases the arcuate projections 1264 in opposite directions to close the clamp. By biasing the arcuate projections 1264 in opposite directions, the tool 1270 may be used to tighten clamps which have arcuate projections, such as the pins 1260, on each end of a band. Each sidewall 1274, 1276 may include a lip 1279 on respective bottoms side of the tool 1270. As shown in FIG. 12G, the lips 1279 may engage the third section 1264C of pins 1260, which may restrict the tool 1270 from sliding upward along the arcuate surface of the pins 1260 and off of the assembly.

FIG. 12G is a perspective view of an embodiment of the assembly of one of the pins 1260 with the band body 1202 and one of the tabs 1217 as well as its engagement with a portion of the tool 1270. Thus, only a portion of the assembly is detailed in this view. It is understood that the description of this portion of the assembly applies equally to the other portion of the assembly that is not visible. As shown, the protrusion 1264 of the pin 1260 may be inserted through both the hole 1210 formed in the band body 1202 and the hole 1215 formed in the tab 1217. The shapes of the holes 1210 and 1215 may complement the shape of the first section 1264A and may form a snug fit that restricts the band body 1202 and/or tab 1217 from sliding off the pin 1260. The shape of the third section 1264C may also complement the shape of holes 1210 and 1215 and may form a snug fit with the band body 1202 and tab 1217 that does not entirely restrict the third section from passing through either hole 12010, 1215. The base 1262 of the pin 1260 may prevent the pin 1260 from passing entirely through the hole 1210 in the band body 1202. The shape of the base 1262 may complement the shape of the raised corner 1212 of the band body 1202 such that the base is received under the raised corner 1212. Thus, the pin 1260 may secure the band body 1202 and tab 1217 together. When assembled, the first section 1264A of the protrusion 1264 may sit within aligned holes 1210 and 1215 such that the tab 1217 is positioned above and in contact with the band body 1202. The second section 1264B may sit exposed above tab 1217 and band body 1202 and may come in contact with the lateral edge of the lip 1279 of the tool 1270 when engaged. The third section 1264C may also sit above the tab 1217 and the band body 1202. A lower edge and/or surface of the third section 1264C may contact an upper surface or surfaces of the lip 1279 such that the tool 1270 is restricted from sliding upward and off of the assembly when engaged. The rounded surfaces of the second section 1264B and third section 1264C may contact the inner rounded portion 1278 of the sidewall 1274 of the tool 1270 such that the tool 1270 may rotate around the pin 1260 and move or otherwise bias the pin 1260 to close the clamp. The clamp may be the clamp 1201 as described with respect to FIG. 12H.

FIG. 12H is a top view of an embodiment of a clamp 1201 formed from the various components of FIGS. 12A-12E and engaged by the tool 1270. As shown in FIG. 12H, when the rounded band body 1202 and rounded tabs 1217 (i.e. in their "rounded" configurations described above) are assembled with respective pins 1260, the extensions 1218 of respective tabs 1217 may be inserted into the respective openings 1226 of the opposing channels 1220 on opposite ends of the band 1200. This may secure the first and second ends 1204, 1206 of the band 1200 together. The clamp 1201 may be assembled such that the tabs 1217 are inserted into their respective opposing channels 1220 and secured by engagement of respective raised portions 1250 through one of the slots 1229, which may be done prior to placing the clamp 1201 around any pipe. As shown, the flanges 1252 of the raised portions 1250 may extend through respective slots 1229.

The tool 1270 may be engaged with the clamp 1201 such that rounded portions 1278 of respective first and second sidewalls 1274, 1276 are engaged with corresponding rounded surfaces of respective pins 1260. Application of torque to the tool 1270, for example by a handle inserted into the opening 1272, may be used to bring the first and second ends 1204, 1206 of the band body 1202 closer together. This may further extend the extensions 1218 of tabs 1217 further into the openings 1226 of the channels 1220 and cause the flanges 1252 of the raised portions 1254 to engage with various other slots 1229 further away from the ends 1204, 1206 of the band, resulting in tightening of the clamp 1201.

Figures 13A, 13B:
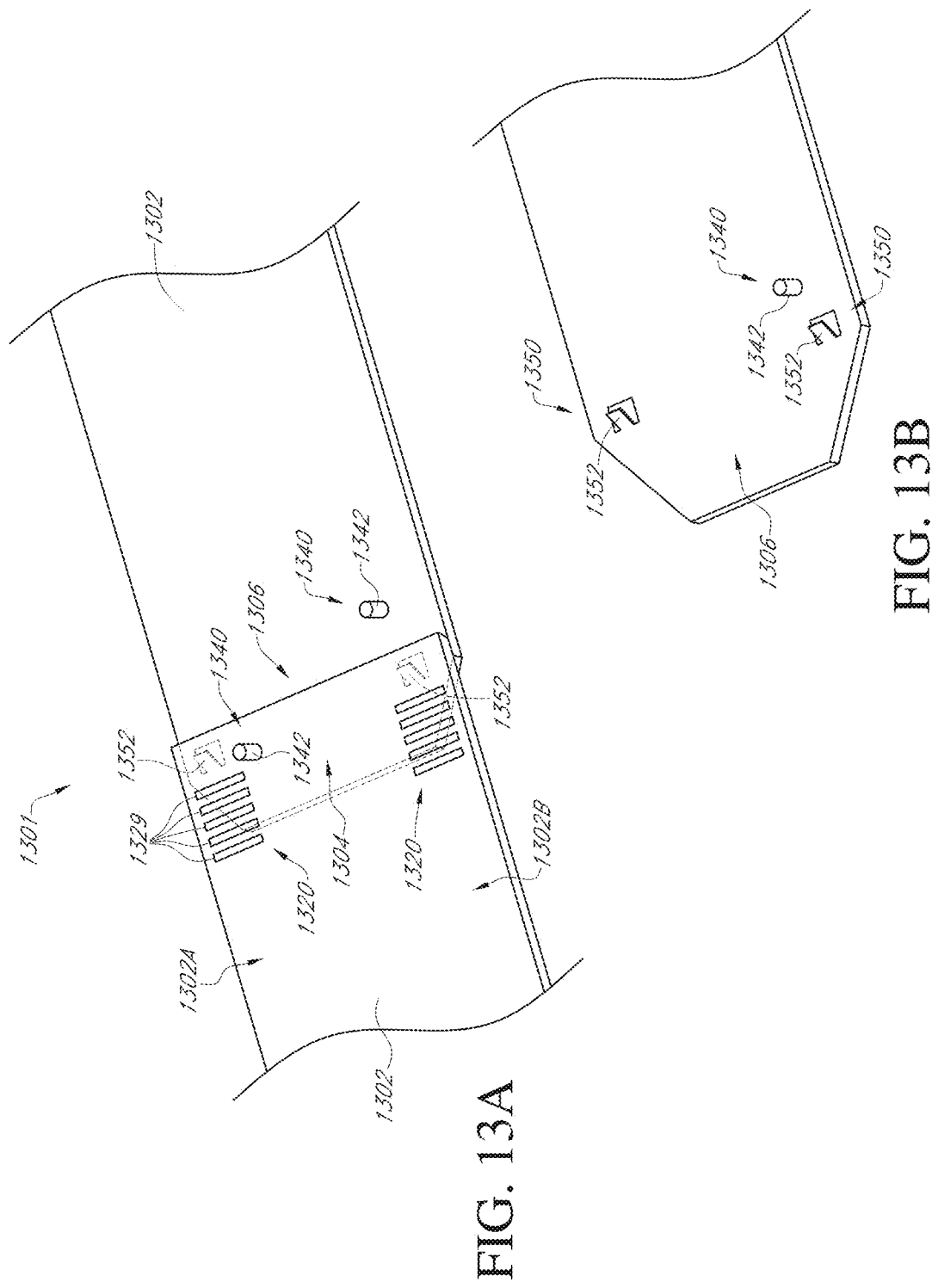
FIG. 13A is a top view of another embodiment of a locking mechanism that may be used with the various clamps described herein.
FIG. 13B is a top view of a portion of the locking mechanism of FIG. 13A.

FIGS. 13A and 13B depict an embodiment of a locking mechanism 1301 for securing the first end 1304 and second end 1306 of a band 1302. The band 1302 may have the same or similar features as other bands described herein. The components of the locking mechanism 1301 may be formed from the same or similar materials. The band 1302 may be manufactured from a monolithic piece of material. The band 1302 may be manufactured from a flat sheet of metal or other suitable material. The material may be any rigid material that may be bent or otherwise shaped into a final configuration.

The band 1302 may have a first outer edge region 1302A and a second outer edge region 1302B. The band 1302 may be configured such that each outer edge region 1302A, 1302B comprises portions of the locking mechanism 1301. As shown, similar parts of each mechanism portion may be located on the same end 1304, 1306 of the band 1302 (for example, slots both on one end and raised tabs both on the opposite end). In some embodiments, the mechanism portions may be located on opposite ends 1304, 1306 (for example, first slots and a first raised tab on one end, with second slots and a second raised tab on the opposite end). FIG. 13A shows the first and second ends 1304, 1306 joined together.

The first end 1304 of the band 1302 may have engagement areas 1320 formed within each outer edge region 1302A, 1302B of the band 1302. The engagement areas 1320 may include one or more slots 1329. The slots 1329 may be openings through the band 1302. The slots 1329 may be elongate, parallel to each other, and extend in a direction transversely to the band 1302. The slots 1329 may be aligned across from each other on opposite outer edge regions 1302A, 1302B of the band. The engagement areas 1320 may include a series of the slots 1329 configured to receive corresponding securement features, such as raised tabs 1352 described below.

One or both ends of the band 1306 may include one or more securement features 1350. As shown in FIG. 13B, the second end 1306 of the band 1306 may include two securement features 1350. The securement features 1350 may be aligned across from each other on opposite outer edge regions 1302A, 1302B of the band. The securement features 1350 may engage with corresponding engagement areas 1320 on the opposite end of the band 1302. The securement features 1350 may include raised tabs 1352. As shown, the raised tabs 1352 may extend upward and away from the second end 1306 of the band 1302. The raised tabs 1352 may be formed by making cutouts in the band 1302 to define the raised tabs 1352 and subsequently bending or otherwise raising the raised tabs 1352 into the ramped configurations shown. Each securement feature 1350 may be aligned with the engagement area 1320 on the same outer edge region 1302A, 1302B so that when the second end 1304 of the band 1302 is brought beneath the first end 1304 of the band, the securement features 1350 may engage one of the slots 1329, securing the band 1302 into a locked configuration. The dashed line in FIG. 13A represents the second end 1306 of the band 1302 which is hidden beneath the first end 1304 of the band.

The band 1302 may include one or more gripping elements 1340. The gripping elements 1340 may have the same or similar features as other gripping elements described herein, for example the gripping elements 640 and 440. As shown, the band 1302 may include two gripping elements 1340 positioned on opposite ends 1304, 1306 of the band. The gripping elements 1340 may be positioned along the width of the band 1302 generally between the engagement areas 1320. In some embodiments, the gripping elements 1340 may be located in other positions. The gripping elements 1340 may include arcuate projections 1342. The arcuate projections 1342 may have the same or similar features as other arcuate projections described herein, for example the arcuate projections 442 and 642. The arcuate projections 1342 may be coupled with and extending away from opposite outer edge portions 1302A, 1302B of the band 1302. The arcuate projections 1342 may be configured for gripping with a tool, for example the tool 700 or the tool 1270, to facilitate tightening and locking the band.

FIGS. 14A-14E are various views of another embodiment of a gasket 1000E having a collapsible membrane section 1016E with an inner wedge 1030. FIG. 14A is a perspective view, FIG. 14B is a side view, FIG. 14C is a cross-section view taken along the lines A-A as shown in FIG. 14B, FIG. 14D is a top view, and FIG. 14E is a cross-section view taken along the line B-B as shown in FIG. 14D.

The gasket 1000E may have the same or similar features and/or functionalities as any of the other gaskets described herein, such as the gasket 1000A, 1000B, 1000C, 1000D, and vice versa. The gasket 1000E therefore includes a top end 1001E and bottom end 1003E, etc.

Further, the gasket 1000E includes inner wedges 1030. Each of the inner wedges 1030 may be located on or otherwise with a corresponding membrane section 1016E. As shown there may be eight wedges 1030 corresponding to eight membranes 1016E. In some embodiments, there may be more or fewer than eight wedges 1030 and membranes 1016E. In some embodiments, there may be fewer or more wedges 1030 than membranes 1016E. The wedges 1030 may be located radially inward of the corresponding membrane 1016E. In some embodiments, the wedge 1030 may be a radially inward portion of the membrane 1016E, for example a thicker section of the membrane 1016E. The membrane 1016E may surround the wedge 1030, for example on two adjacent circumferential sides of the wedge 1030. Thus two smaller membrane sections 1016E may be formed on opposite sides of the wedge 1030 in between the wedge 1030 and opposing edges of opposing gasket wall sections.

The wedges 1030 may form flat spots. For example, radially inner surfaces 1031 (see e.g. FIGS. 14A, 14C-14E) of the wedges 1030 may be flat or generally flat. In some embodiments, the wedges 1030 may have rounded or other shaped contours on the inner surfaces 1031. The wedges 1030 may have one or more inner surfaces 1031 that are located radially farther inward than adjacent surfaces of other features of the gasket 1000E, such as the wall sections or features thereof. The gasket 1000E may include annular first, second and third inner seals 1061, 1062, 1063, as described herein. The wedges 1030 may extend radially farther inward than the inner seals 1061, 1062, 1063. In some embodiments, the wedges 1030 may extend radially inward less or the same as the inner seals 1061, 1062, 1063. In some embodiments, each or some of the wedges 1030 may extend radially inward different amounts compared to other wedges 1030.

The wedges 1030 may extend axially. The wedges 1030 may extend axially along a corresponding one of the membrane sections 1016E. The wedges 1030 may extend for a portion of the axial length of the corresponding membrane 1016E. The wedges 1030 may extend axially about the same axial distance as the inner seals, for example from the first inner seal 1061 to the third inner seal 1063. There may be fewer or more than three inner seals 1061, 1062, 1063 and the wedge 1030 may extend axially about the same axial distance from the first inner seal to the last inner seal. In some embodiments, the wedge 1030 may extend axially longer than the lowest inner seal, for example beyond the inner seal 1063 toward the middle portion of the gasket 1000E. The wedges 1030 may extend axially along the entire membrane 1016E. The wedges 1030 may extend axially for a distance that is shorter than the entire axial length of the membrane 1016E. In some embodiments, the wedge 1030 may extend axially shorter than the lowest inner seal, for example ending before the inner seal 1063.

The wedges 1030 may have square or rectangular cross-sections wherein a side of the square or rectangular shape can form the inner surfaces 1031 of the wedges 1030, which can be flat or generally flat. The wedges 1030 may have other cross-sectional shapes. The wedges 1030 may be formed integrally with the gasket 100E, for example the wedges 1030 may be integral with the corresponding membrane 1016E. The wedges 1030 may be formed from the same material as the membrane 1016E and wall sections of the gasket 1000E. A mold may be used to form the gasket 1000E as a single, monolithic part. In one arrangement, the wedges 1030 can extend from or be coupled or placed against an apex of the V-shaped gap 1017D. In one embodiment, the wedge 1030 can be a separate component that is placed against the apex of the V-shaped gap 1017D In use, the flared top and bottom ends 1001E, 1003E of the gasket 1000E may allow for a pipe or other tube to be inserted into the gasket 1000E. For example, the pipes could be inserted into the ends of the gasket 1000E without having to fold down, bend, or otherwise reconfigure the ends of the gasket 1000E, as is required with typical gasket installations, thus saving time and money with installations using the gasket 1000E and the other flared-end gaskets described herein. With the gasket 1000E, the pipes may or may not contact the wedges 1030 before a clamp or other feature compresses the gasket 1000E onto the pipes. When the gasket 1000E is compressed, for example with a clamp over two pipes, the membrane 1016E may collapse around the corresponding wedge 1030. The wedge 1030 may contact adjacent edges of the adjacent sidewalls of the compressed gasket 1000E, for example with adjacent edges of adjacent ends of the inner seals 1061, 1062, 1063 that face the wedge 1030. The wedge 1030 may therefore facilitate with sealing the gasket 1000E around the pipe. For example, the wedge 1030 may ensure a sealing engagement of the gasket 1000E in the areas around the corresponding membranes 1016E.

FIGS. 15A-15B are top and cross-section views respectively of another embodiment of a gasket 1000F having an outwardly tapered top end 1001 and an outwardly tapered bottom end 1003. The gasket 1000F may have the same or similar features and/or functionalities as other gaskets described herein such as the gasket 1000, and vice versa, except as otherwise noted.

FIG. 15A is a top view of an embodiment of the gasket 1000F. FIG. 15B is a cross-section view of the gasket 1000F as taken along the line 15B-15B indicated in FIG. 15A. Referring to FIGS. 15A and 15B, the gasket 1000F may have a top end 1001 opposite a bottom end 1003. The gasket may have a middle portion 1002 in between the top and bottom ends 1001, 1003. The middle portion 1002 may be located equidistant from the top and bottom ends 1001, 1003. The top and bottom ends 1001, 1003 may be wider than the middle portion 1002. The top end 1001 may have an inner width W1 as indicated. An upper side (as oriented) of the middle portion 1002 may have an inner width W2 as indicated. The width W1 may be greater than the width W2. The bottom end 1003 may have an inner width W4 as indicated. A lower side (as oriented) of the middle portion 1002 may have an inner width W3 as indicated. The width W4 may be greater than the width W3. The widths W2 and W3 may be equal or approximately equal. The widths W1 and W4 may be equal or approximately equal.

The shape of the gasket 1000F, for example as seen in the side cross-section view of FIG. 15B, may approximate an hourglass shape. In some embodiments, the gasket 1000F may have two frustoconical shapes extending away from the middle portion 1002 to the top and bottom ends 1001 and 1003. The large width or diameters of the top and bottom ends 1001 and 1003 may facilitate with securing the gasket 1000F to the pipe ends. For example, the larger opening at the top and bottom ends 1001 and 1003 may be larger than the outer width or diameter of the pipes to which the gasket 1000F is being secured. After the gasket 1000F is secured to two adjacent pipe ends, the gasket 1000, such as the ends 1001 and 1003 and/or other portions of the gasket 1000, may then collapse on the two pipe ends, for example upon pressure from a clamp, to provide a tighter seal about the pipe. Thus the gasket 1000F may provide simpler installation about a pipe while still providing sealing capability. The gasket 100F may not include the membrane sections described elsewhere herein, such as the membrane sections 1016.

The gasket 1000F may include a rounded sidewall 1010F. The sidewall 1010F includes an outer surface 1012F and an inner surface 1014F. The gasket 1000F may include a channel 1015. The rounded sidewall 1010F may define the channel 1015. For instance, the inner surface 1014F may define the channel 1015. The channel 1015 may extend along the interior of the gasket 1000 from the top end 1001 to the bottom end 1003. The channel 1015 may extend in the direction indicated by the arrow 1050, as shown in FIG. 15B.

The gasket 1000F may also include a ridge 1018. The ridge 1018 may be coupled with an interior surface of the sidewall 1010F. The ridge 1018 may be coupled with the inner surface 1014F of the sidewall 1010F. The ridge 1018 may extend circumferentially around the interior of the channel 1015. The ridge 1018 may extend continuously around the interior of the channel 1015. There may also be discontinuities in the ridge 1018 (not shown). The ridge 1018 may be located in a plane generally perpendicular to the direction indicated by the arrow 1050. The ridge 1018 may form a ring extending from the inner surface 1014F of the sidewall 1010F toward the interior of the channel 1015. The ridge 1018 may separate upper and lower portions of the sidewall 1010F, as shown. In some embodiments, the sidewall 1010F may be continuous from top end 1001 to bottom end 1003 with the ridge 1018 extending inwardly therefrom. In some embodiments, the ridge 1018 may be located approximately at the middle of the gasket 1000 from the top to the bottom of the gasket 1000, relative to the direction arrow 1050. In some embodiments, the ridge 1018 may be located at or approximately at the middle portion 1002 of the gasket 1000. In some embodiments, the ridge 1018 may be located in between or approximately in between the top and bottom ends 1001, 1003 of the gasket 1000.

Two pipes may be inserted into opposite ends of the gasket 1000F such that the edges of the pipes may abut opposite sides of the ridge 1018. The ridge 1018 may therefore provide a surface or surfaces upon which two adjacent pipe ends may contact when installed, for example in the assembly 10 described with respect to FIG. 1. The ridge 1018 may have a variety of other suitable shapes and configurations, including those which may be required by construction regulations or codes. The ridge 1018 may be formed from the same or similar materials as other portions of the gasket 1000. In some embodiments, the ridge 1018 is formed from a rubber material. However, the ridge 1018 may any other suitable material, or combinations thereof.

These are merely examples and other configurations may be implemented for the gasket 1010F. As mentioned, the gasket 1000F may include any of the features described herein with respect to other embodiments of the gasket. For instance, the gasket 1000F may include one or more inner seals 1061, etc. As further example, the sidewall 1010F may taper radially outward from the middle portion 1002 to the top and/or bottom ends 1001, 1003 in a straight direction, in a curved direction, etc. In some embodiments, only a portion of the sidewall 1010F may taper outward, such as end portions or regions of the sidewall 1010F that are near the top and bottom ends 1001, 1003. In some embodiments, the sidewall 1010F may continuously taper outward from the middle portion 1002 to the top and/or bottom ends 1001, 1003. For example, for every distance measured along the direction 1050 from the middle portion 1002, each successive width of the gasket 1000F may be greater than the preceding measured width. In some embodiments, the taper may be discontinuous. For example, for every distance measured along the direction 1050 from the middle portion 1002, each successive width of the gasket 1000F may not be greater than one or more preceding measured widths.

The outwardly-tapered ends 1001, 1003 may facilitate with receiving pipe ends therein. The ends 1001, 1003 of the gasket 1000F may compress together upon assembly with pipe ends, e.g. due to pressure inwardly exerted by a clamp on the out surfaces 1012F of the ends 1001, 1003. The outward taper of the ends 1001, 1003 may be configured to provide a seal for the pipes even in the absence of the membrane sections 1016. For example, the widths W1, W2, W3 and/or W4 may be sized relative to an intended pipe end outer diameter such that compression of the ends 1001, 1003 and/or of the sidewalls 1010F will allow the gasket 1010F to compress upon the pipes to seal the connection without leaving voids, or otherwise sufficiently sealed to perform the intended function of the gasket 1010F.

FIGS. 16A-16D are various views of another embodiment of a gasket 1000I having an inner seal 1060I, a ridge 1018I, an outwardly tapered top end 1001I, and an outwardly tapered bottom end 1003I. FIG. 16A is a perspective view, FIG. 16B is a side view, FIG. 16C is a cross-section view taken along the lines A-A as shown in FIG. 16B, FIG. 16D is a detail view showing an enlarged view of the inner seal 1060I.

The gasket 1000I may have the same or similar features and/or functionalities as any of the other gaskets described herein and vice versa. The gasket 1000I includes a top end 1001I, bottom end 1003I, middle portion 1002I, and sidewall 1010I etc. The top end 1001I may be opposite the bottom end 1003I. The gasket 1000I may have a middle portion 1002I in between the top and bottom ends 1001I, 1003I. The top and bottom ends 1001I, 1003I may be wider than the middle portion 1002I. The shape of the gasket 1000I, for example, as seen in the side cross-section view of FIG. 16B, may approximate an hourglass shape. In some embodiments, the gasket 1000I may have two frustoconical shapes extending away from the middle portion 1002I to the top and bottom ends 1001I and 1003I. The opening at the top and bottom ends 1001I, 1003I may be larger than the outer width or diameter of the pipes to which the gasket 1000I is being secured. After the gasket 1000I is secured to two adjacent pipe ends, the gasket 1000I, such as the ends 1001I and 1003I and/or other portions of the gasket 1000I, may then collapse on the two pipe ends, for example upon pressure from a clamp, to provide a tighter seal about the pipe. Thus the gasket 1000I may provide simpler installation about a pipe while still providing sealing capability.

As shown in FIGS. 16A and 16C, the sidewall 1010I has an inner surface 1014I and an outer surface 1012I. The ridge 1018I may form a ring extending from the inner surface 1014I of the sidewall 1010I. The ridge 1018I may have the same or similar features as other ridges described herein. As shown, the ridge 1018I may extend continuously around the interior of the gasket 1000I. There may also be discontinuities in the ridge 1018I.

The gasket 1000I may also include an inner seal 1060I. The inner seal 1060I may extend circumferentially around an inner surface or surfaces of the gasket 1000I. As shown, the inner seal 1060I may extend circumferentially around the inner surfaces of the gasket near the top and bottom ends 1001I, 1003I. The inner seal 1060I may be a protrusion along an inner surface or surfaces of the sidewall 1010I that provides a sealing function to the gasket when assembled about a pipe end. There may also be discontinuities in the inner seal 1060I (not shown). In some embodiments, there may be one, two, three, four, or more inner seals 1060I.

The inner seal 1060I may include a first inner seal 1061I, a second inner seal 1062I, and a third inner seal 1063I. The first inner seal 1061I, second inner seal 1062I, and third inner seal 1063I may be portions of the inner seal 1060I. The first inner seal 1061I may be located along an inner surface 1014I of the sidewall 1010I closer to the top or bottom ends 1001I, 1003I. The first inner seal 1061I may be located near or at the top and/or bottom end 1001I, 1003I. In some embodiments, the first inner seal 1061I may be offset from the top and/or bottom end 1001I, 1003I. The second inner seal 1062I may be located along an inner surface 1014I of the sidewall 1010I closer to the middle portion 1002I than the first inner seal 1061I. The third inner seal 1063I may be located along an inner surface 1014I of the sidewall 1010I closer to the middle portion 1002I than the first and second inner seals 1061I, 1062I. The second inner seal 1062I may be located in between the first and third inner seals 1061I, 1063I.

The inner seal 1060I may have various shapes. As shown in FIG. 16D, the inner seals 1061I, 1062I, 1063I may come to a point or have a triangular shaped cross-section. In some embodiments, the inner seals 1061I, 1062I, 1063I may be rounded, flat, etc. or a combination of shapes. In some embodiments, the first inner seal 1061I may have a different shape than second inner seal 1062I and/or third inner seal 1063I. In some embodiments, the second inner seal 1062I may have a different shape than first inner seal 1061I and/or third inner seal 1063I.

As shown in FIG. 16D, the first inner seal 1061I may be larger than the second and third inner seals 1062I, 1063I. In some embodiments, the second inner seal 1062I or the third inner seal 1063I may be larger. In some embodiments, the inner seal portions may all be the same or similar sizes. In other embodiments, the inner seal portions may be a variety of sizes with some or no inner seal portions being the same size.

FIGS. 17A-17D are various views of another embodiment of a gasket 1000J having scalloped portions 1066, a ridge 1018J, an outwardly tapered top end 1001J, and an outwardly tapered bottom end 1003J. FIG. 17A is a perspective view, FIG. 17B is a detail view showing an enlarged view of the scalloped portion 1066, FIG. 17C is a side view, FIG. 16D is a cross-section view taken along the lines A-A as shown in FIG. 17C.

The gasket 1000J may have the same or similar features and/or functionalities as any of the other gaskets described herein and vice versa. The gasket 1000J includes a top end 1001J, bottom end 1003J, middle portion 1002J, and sidewall 1010J etc. The top end 1001J may be opposite the bottom end 1003J. The gasket 1000J may have a middle portion 1002J in between the top and bottom ends 1001J, 1003J. The top and bottom ends 1001J, 1003J may be wider than the middle portion 1002J. The shape of the gasket 1000J, for example, as seen in the side cross-section view of FIG. 17C, may approximate an hourglass shape. In some embodiments, the gasket 1000J may have two frustoconical shapes extending away from the middle portion 1002I to the top and bottom ends 1001I and 1003I. The opening at the top and bottom ends 1001J, 1003J may be larger than the outer width or diameter of the pipes to which the gasket 1000J is being secured. After the gasket 1000J is secured to two adjacent pipe ends, the gasket 1000J, such as the ends 1001J and 1003J and/or other portions of the gasket 1000J, may then collapse on the two pipe ends, for example upon pressure from a clamp, to provide a tighter seal about the pipe. Thus the gasket 1000J may provide simpler installation about a pipe while still providing sealing capability.

As shown in FIGS. 17A and 17B, the sidewall 1010J may have a portion that is scalloped 1066. The scalloped portion 1066 may at least partially collapse. "Collapse" here may be as described above. The scalloped portion 1066 may collapse, for example upon pressure from a clamp, to provide a tighter seal about the pipe. The scalloped portion 1066 may extend continuously around the circumference of the gasket 1000J. In some embodiments, the scalloped portion 1066 may extend for only a portion of the circumference of the gasket 1000J. The scalloped portion 1066 may extend from the middle portion 1002J to the top and/or bottom ends 1001J, 1003J. The scalloped portion 1066 may extend to the ridge 1018J. In some embodiments, the scalloped portion 1066 may not extend to the ridge 1018J. The ridge 1018J may form a ring extending from the inner surface of the sidewall 1010J. The ridge 1018J may have the same or similar features as other ridges described herein. As shown, the ridge 1018J may extend continuously around the interior of the gasket 1000J. There may also be discontinuities in the ridge 1018J.

FIGS. 18A-18D are various views of another embodiment of a gasket 1000K having an outer seal 1060K and a ridge 1018K. FIG. 18A is a perspective view, FIG. 18B is a side view, FIG. 18C is a cross-section view taken along the lines A-A as shown in FIG. 18B, FIG. 18D is a detail view showing an enlarged view of the outer seal 1060K.

The gasket 1000K may have the same or similar features and/or functionalities as any of the other gaskets described herein and vice versa. The gasket 1000K includes a top end 1001K, bottom end 1003K, middle portion 1002K, and sidewall 1010K etc. The top end 1001K may be opposite the bottom end 1003K. The gasket 1000K may have a middle portion 1002K in between the top and bottom ends 1001K, 1003K. As shown in FIG. 18C, the middle portion 1002K may have the same or similar width or diameter as the top and bottom ends 1001K, 1003K. In some embodiments, the gasket may be hourglass-shaped or otherwise taper outward near the top and bottom ends.

As shown in FIGS. 18A and 18C, the sidewall 1010K has an inner surface 1014K and an outer surface 1012K. The ridge 1018K may form a ring extending from the inner surface 1014K of the sidewall 1010K. The ridge 1018K may have the same or similar features as other ridges described herein. As shown, the ridge 1018K may extend continuously around the interior of the gasket 1000K. There may also be discontinuities in the ridge 1018K.

The gasket 1000K may also include an outer seal 1060K. The outer seal 1060K may extend circumferentially around an outer surface or surfaces of the gasket 1000K. As shown, the outer seal 1060K may extend circumferentially around the outer surfaces of the gasket near the top and bottom ends 1001K, 1003K. The outer seal 1060K may be a protrusion along an outer surface or surfaces of the sidewall 1010K that provides a sealing function when assembled about a pipe end. The outer seal 1060K may provide a similar sealing function as the embodiments of inner seals described herein. There may also be discontinuities in the outer seal 1060K (not shown). In some embodiments, there may be one, two, three, four, or more outer seals 1060K. In some embodiments, the gasket may have inner and outer seals. In some embodiments, the gasket may have an outer seal near the top end and an inner seal near the bottom, or vice versa. In some embodiments, the gasket may have an outer seal and inner seal near the same end. In some embodiments, the inner and/or outer seals may be near the middle portion of the gasket.

The outer seal 1060K may include a first outer seal 1061K, a second outer seal 1062K, and a third outer seal 1063K. The first outer seal 1061K, second outer seal 1062K, and third outer seal 1063K may be portions of the outer seal 1060K. The first outer seal 1061K may be located along an outer surface 1012K of the sidewall 1010K closer to the top or bottom ends 1001K, 1003K. The first outer seal 1061K may be located near or at the top and/or bottom end 1001K, 1003K. In some embodiments, the first outer seal 1061K may be offset from the top and/or bottom end 1001K, 1003K. The second outer seal 1062K may be located along an outer surface 1012K of the sidewall 1010K closer to the middle portion 1002K than the first outer seal 1061K. The third outer seal 1063K may be located along an outer surface 1012K of the sidewall 1010K closer to the middle portion 1002K than the first and second outer seals 1061K, 1062K. The second outer seal 1062K may be located in between the first and third outer seals 1061K, 1063K.

The outer seal 1060K may have various shapes. As shown in FIG. 18D, the outer seals 1061K, 1062K, 1063K may be rounded. In some embodiments, the outer seals 1061K, 1062K, 1063K may come to a point or have a triangular shaped cross-section. In some embodiments, the first outer seal 1061K may have a different shape than second outer seal 1062K and/or third outer seal 1063K. In some embodiments, the second outer seal 1062K may have a different shape than first outer seal 1061K and/or third outer seal 1063K.

As shown in FIG. 18D, the first, second, and third outer seals 1061K, 1062K, 1063K may have the same or similar size. In some embodiments, the first outer seal 1061K may be larger than the second and third outer seals 1062K, 1063K. In some embodiments, the second outer seal 1062K or the third outer seal 1063K may be larger. In some embodiments, the outer seal portions may be a variety of sizes with some or no outer seal portions being the same size.

FIGS. 19A-19D are various views of another embodiment of a gasket 1000L having radial bulges 1067, an inner seal 1060L, and a ridge 1018L. FIG. 19A is a perspective view, FIG. 19B is a side view, FIG. 19C is a cross-section view taken along the lines A-A as shown in FIG. 19B, and FIG. 19D is a detail view showing an enlarged view of the radial bulges 1067 and inner seal 1060L.

The gasket 1000L may have the same or similar features and/or functionalities as any of the other gaskets described herein and vice versa. The gasket 1000L includes a top end 1001L, bottom end 1003L, middle portion 1002L, and sidewall 1010L etc. As shown in FIG. 19C, the middle portion 1002L may have the same or similar width or diameter as the top and bottom ends 1001L, 1003L. In some embodiments, the gasket may be hourglass-shaped or otherwise taper outward near the top and bottom ends. The ridge 1018L may form a ring extending from the inner surface of the sidewall 1010L. The ridge 1018L may have the same or similar features as other ridges described herein. As shown, the ridge 1018L may extend continuously around the interior of the gasket 1000L. There may also be discontinuities in the ridge 1018L.

As shown in FIGS. 19A-19D, the sidewall 1010L may have one or more radial bulges 1067. The radial bulge(s) 1067 may at least partially collapse. "Collapse" here may be as described above. The radial bulge(s) 1067 may collapse, for example upon pressure from a clamp, to provide a tighter seal about the pipe. The radial bulge(s) 1067 may extend continuously around the circumference of the gasket 1000L. In some embodiments, the radial bulge(s) 1067 may extend for only a portion of the circumference of the gasket 1000L. In some embodiments, there may be discontinuities in the radial bulges 1067.

As shown in FIG. 19D, there may be two radial bulges 1067A and 1067B. The radial bulges 1067A, 1067A may have a rounded cross-section. The radial bulges 1067A, 1067B define inner gaps 1068A, 1068B. In some embodiments, the radial bulge may be shaped so that the rounded portion protrudes inwardly instead of outwardly as shown.

In some embodiments, the radial bulges 1067 may have a different cross-sectional shape, for example, angled, flat, triangular, etc. or a combination of shapes.

The first radial bulge 1067 may be located offset from the top and/or bottom end 1001L, 1003L. In some embodiments, the first radial bulge 1067 may be near at the top and/or bottom end 1001L, 1003L. In some embodiments, the middle or apex of the radial bulge 1067 may be located near or at the top and/or bottom end 1001L, 1003L.

The gasket 1000L may also include an inner seal 1060L. The inner seal 1060L may extend circumferentially around an inner surface or surfaces of the gasket 1000L. The inner seal 1060L may be a protrusion along an inner surface or surfaces of the sidewall 1010L that provides a sealing function to the gasket when assembled about a pipe end. There may also be discontinuities in the inner seal 1060L (not shown).

The inner seal 1060L may include a first inner seal 1061L, second inner seal 1062L, third inner seal 1063L, fourth inner seal 1064L, and fifth inner seal 1065L. The first inner seal 1061L may be located along an inner surface of the sidewall 1010L closer to the top or bottom ends 1001L, 1003L. The first inner seal 1061L may be located near or at the top and/or bottom end 1001L, 1003L. In some embodiments, the first inner seal 1061L may be offset from the top and/or bottom end 1001L, 1003L. As shown in FIG. 19D, the first inner seal 1061L may be located at or near the end of the first radial bulge 1067A. The second inner seal 1062L may be located along an inner surface 1014L of the first radial bulge 1067 and protrude into the inner gap 1068A. The third inner seal 1063L may be located between the first and second radial bulges 1067A, 1067B. The fourth inner seal 1064L may be located along an inner surface of the second radial bulge 1067B and protrude into the inner gap 1068B. The fifth inner seal 1065L may be located at the end of the second radial bulge 1067B. In some embodiments, there may be one or more inner seals along the inner surface of the radial bulge, for example, there may be two inner seals protruding into an inner gap defined by a radial bulge. In some embodiments, there may be only inner seals located at the ends or in between radial bulges. In some embodiments, there may be only inner seals located along the inner surface of the radial bulge. In some embodiments, there may be outer seals located along the outer surface 1012L.

As shown in FIG. 19D, second and fourth inner seals 1062L, 1064L have a flat protrusion. In some embodiments, the second and fourth inner seals 1062L, 1064L may be rounded, come to a point, etc. or have a combination of shapes. The first, third, and fourth inner seals 1061L, 1063L, 1065L have a flat protrusion. In some embodiments, the first, third, and fourth inner seals 1061L, 1063L, 1065L may be rounded, come to a point, etc. or have a combination of shapes.

Figure 20A:
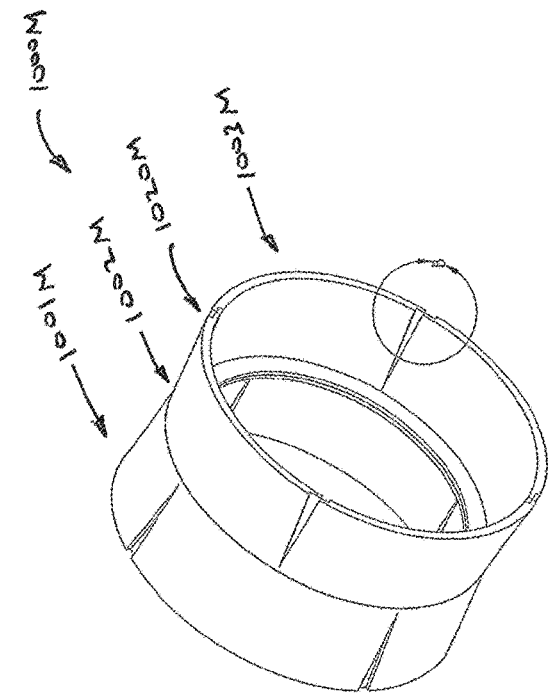
FIGS. 20A-20D are various views of another embodiment of a gasket having a collapsible sidewall and outwardly tapered ends.
Figure 20B:
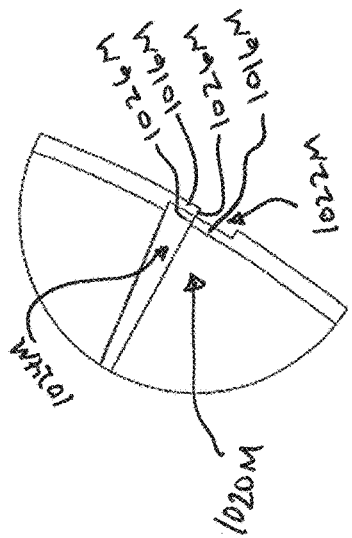
Figure 20C:
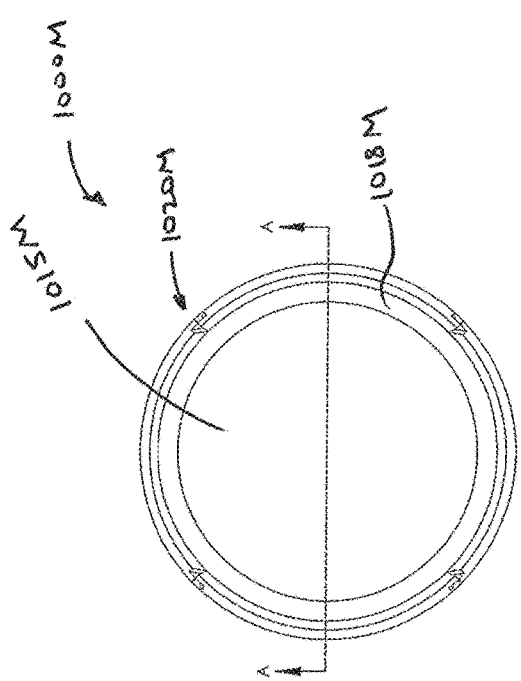
Figure 20D:
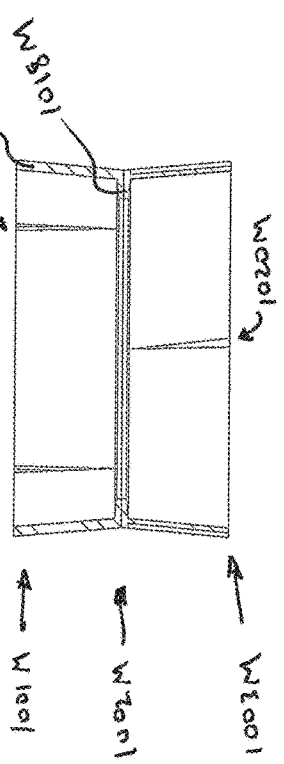

FIGS. 20A-20D are various views of another embodiment of a gasket 1000M having collapsible joints 1020M and a ridge 1018M, which may be described as above. FIG. 20A is a perspective view, FIG. 20B is a detail view showing an enlarged view of a collapsible membrane 1016M, FIG. 20C is a side view, FIG. 20D is a cross-section view taken along the lines A-A as shown in FIG. 20C.

The gasket 1000M may have the same or similar features and/or functionalities as any of the other gaskets described herein and vice versa. The gasket 1000M includes a top end 1001M, bottom end 1003M, middle portion 1002M, sidewall 1010M, and ridge 1018M, etc. The gasket 1000M may include a channel 1015M, which may extend along the interior of the gasket 1000M from the top end 1001M to the bottom end 1003M. The top and bottom ends 1001M, 1003M may be wider than the middle portion 1002M. The shape of the gasket 1000M, for example, as seen in the side cross-section view of FIG. 20D, may approximate an hourglass shape. In some embodiments, the gasket 1000M may have two frustoconical shapes extending away from the middle portion 1002M to the top and bottom ends 1001M and 1003M. The opening at the top and bottom ends 1001M, 1003M may be larger than the outer width or diameter of the pipes to which the gasket 1000M is being secured. After the gasket 1000M is secured to two adjacent pipe ends, the gasket 1000M, such as the ends 1001M and 1003M and/or other portions of the gasket 1000M, may then collapse on the two pipe ends, for example upon pressure from a clamp, to provide a tighter seal about the pipe. Thus, the gasket 1000M may provide simpler installation about a pipe while still providing sealing capability.

The gasket 1000M may include one or more collapsible joints 1020M similar to the collapsible joints 1020-2 described in FIG. 10L. As shown in FIGS. 20A and 20C, gasket 1000M may include four collapsible joints 1020M at the top end 1001M. As shown, there may be two collapsible joints 1020M at the top end 1001M located opposite each other. As shown, the collapsible joints 1020M at the top end 1001M may be positioned so that they are staggered from the collapsible joints 1020M at the bottom end 1003M. In some embodiments, there may be fewer or more collapsible joints 1020M and/or located in other positions. Each joint 1020M may include one or more of the collapsible membranes 1016M. The adjacent membranes 1016M may be separate and be moveable relative to each other. The membranes 1016M may at least partially collapse at the joint 1020M. The membranes 1016M may completely collapse at the joint 1020M. The membranes 1016M may independently collapse. "Collapse" here may be as described above.

The joint 1020M may include an outer gap 1022M and/or an inner gap 1024M. The outer gap 1022M may be on the exterior of the gasket 1000M. The inner gap 1024M may be on the interior. The inner gap 1022M and the outer gap 1024M may be connected when the membranes 1016M are separated. The inner gap 1024M may therefore face a channel on the inside of the gasket 1000M, such as the channel 1015M described above. The gaps 1022M, 1024M may provide spaces such that the joint 1020M may bend or flex at one or more edges 1026M to collapse the membrane 1016M. "Collapse" here may be as described above. The shape of the gaps 1022M, 1024M may be tapered or otherwise angled from an end of the gasket 1000M toward the ridge 1018M. The membranes 1016M may be triangular, as shown in FIG. 20D, or they may be other angled shapes, such as trapezoidal, etc. The membranes 1016M and edges 1026M may be similarly tapered or angled. For example, the gaps 1022M, 1024M may be triangular or wedge shaped, as shown in FIGS. 20A and 20B. In some embodiments, the gaps 1022M, 1024M may be trapezoidal or other angled shapes. In some embodiments, the gaps 1022M, 1024M may be partially rounded. The membrane 1016M may extend to ridge 1018M, as best seen in FIGS. 20A and 20D. In other embodiments, the membrane 1016M may extend through the ridge 1018M. In some embodiments, the membrane 1016M may not extend to the ridge 1018M.

Figure 21A:
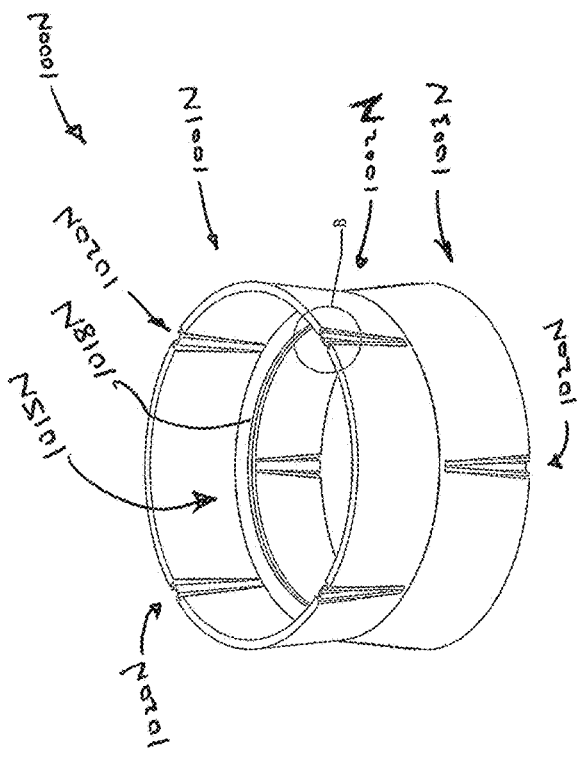
FIGS. 21A-21D are various views of another embodiment of a gasket having a collapsible sidewall and outwardly tapered ends.
Figure 21B:
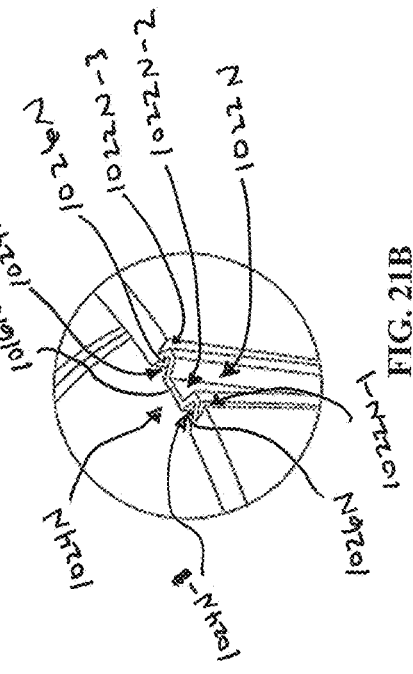
Figure 21C:
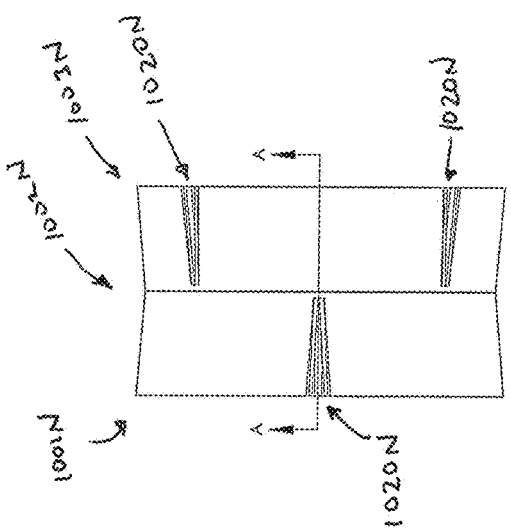
Figure 21D:
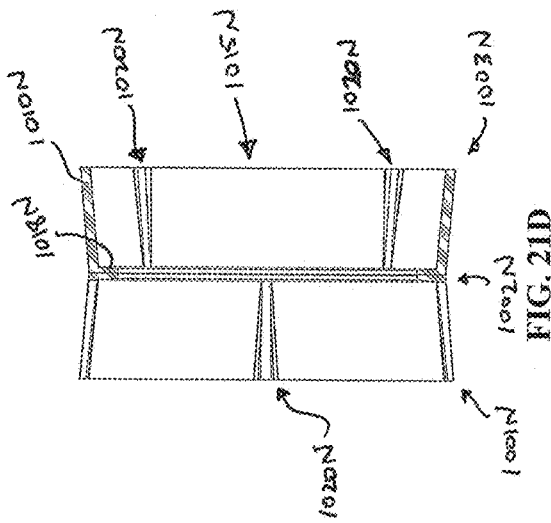

FIGS. 21A-21D are various views of another embodiment of a gasket 1000N having collapsible joints 1020N and a ridge 1018N, which may be described as above. FIG. 21A is a perspective view, FIG. 21B is a detail view showing an enlarged view of a collapsible membrane 1016N, FIG. 21C is a side view, FIG. 21D is a cross-section view taken along the lines A-A as shown in FIG. 21C.

The gasket 1000N may have the same or similar features and/or functionalities as any of the other gaskets described herein and vice versa. The gasket 1000N includes a top end 1001N, bottom end 1003N, middle portion 1002N, sidewall 1010N, and ridge 1018N, etc. The gasket 1000N may include a channel 1015N, which may extend along the interior of the gasket 1000N from the top end 1001N to the bottom end 1003N. The top and bottom ends 1001N, 1003N may be wider than the middle portion 1002N. The shape of the gasket 1000N, for example, as seen in the side cross-section view of FIG. 21C, may approximate an hourglass shape. In some embodiments, the gasket 1000N may have two frustoconical shapes extending away from the middle portion 1002N to the top and bottom ends 1001N and 1003N. The opening at the top and bottom ends 1001N, 1003N may be larger than the outer width or diameter of the pipes to which the gasket 1000N is being secured. After the gasket 1000N is secured to two adjacent pipe ends, the gasket 1000N, such as the ends 1001N and 1003N and/or other portions of the gasket 1000N, may then collapse on the two pipe ends, for example upon pressure from a clamp, to provide a tighter seal about the pipe. Thus, the gasket 1000N may provide simpler installation about a pipe while still providing sealing capability.

The gasket 1000N may include one or more collapsible joints 1020N. As shown in FIG. 21A, gasket 1000N may include four collapsible joints 1020N at the top end 1001N. As shown, there may be two collapsible joints 1020N at the top end 1001N located opposite each other. As shown, the collapsible joints 1020N at the top end 1001N may be positioned so that they are staggered from the collapsible joints 1020N at the bottom end 1003N. In some embodiments, there may be fewer or more collapsible joints 1020N and/or located in other positions. Each joint 1020N may include one or more of the collapsible membranes 1016N. The membrane 1016N may have the same or similar features as other membranes described herein, for example the membrane 1016. The membranes 1016N may at least partially collapse at the joint 1020N. The membranes 1016N may completely collapse at the joint 1020N. "Collapse" here may be as described above.

The joint 1020N may include an outer gap 1022N and/or inner gap 1024N. The outer gap 1022 may be on the exterior of the gasket 1000N. The inner gap 1024N may be on the interior. The inner gap 1024N may therefore face a channel on the inside of the gasket 1000N, such as the channel 1015N described above. The shape of the gaps 1022N, 1024N may be defined by the membrane 1016N. For instance, the joint 1020N may be roughly W-shaped.

The outer gap 1022N may include three gap portions 1022N-1, 1022N-2, 1022N-3. In some embodiments, the outer gap may include fewer or more outer gap portions. The outer gap portion 1022N-2 may be positioned in between outer gap portions 1022-1, 1022-3. As shown in FIG. 21B, there may be flat portions, extending radially along the circumference of the gasket 1000N, that separate outer gap portion 1022N-2 from outer gap portions 1022N-1, 1022N-3. The outer gap portion 1022N-2 may include a flat portion of the membrane 1016N that extends radially along the circumference of the gasket 1000N. The outer gap portion 1022N-2 may extend farther in the radial direction than the outer gap portions 1022N-1, 1022N-3, for example, the outer gap portion 1022N-2 may be wider at the top end 1001N than the outer gap portions 1022N-1, 1022N-3.

The joint 1020N may include an inner gap 1024N. The inner gap 1024N may include two inner gap portions 1024N-1, 1024N-2. The inner gap portions 1024N-1, 1024N-2 may be separated by a flat portion of the membrane 1016N that extends radially along the circumference of the gasket 1000N between two edges 1026N. The membrane 1016N may fold or otherwise collapse along one or more of the edges 1026N. The edges 1026N may be pre-formed in the membrane 1016N for shape memory of the membrane 1016N such that the membrane 1016N will have a propensity to collapse along the edges 1026N and/or in the same direction. "Collapse" here may be as described above. In some embodiments, the membrane 1016N may independently collapse at the edges 1026N. In some embodiments, the membrane 1016N may partially collapse at one or more edges 1026N. In some embodiments, the membrane 1016N may completely collapse at one or more edges 1026N.

The gaps 1022N-1, 1022N-2, 1022N-3, 1024N-1, 1024N-2 may provide spaces such that the joint 1020N may bend or flex at the edges 1026N to collapse the membrane 1016N. "Collapse" here may be as described above. The gaps 1022N-1, 1022N-2, 1022N-3, 1024N-1, 1024N-2 extend longitudinally from one end of the gasket 1000N towards the ridge 1018N. As shown, the outer gap portion 1022N-2 may have a trapezoidal shape. In some embodiments, the outer gap portion 1022N-2 may have a triangular, wedge, or other angled shape. The outer gap portions 1022N-1, 1022N-3 may have a triangular, wedge, or other angled shape.

The shape of the gaps 1022N-1, 1022N-2, 1022N-3, 1024N-1, 1024N-2 may be generally straight from an end of the gasket 1000N toward the ridge 1018N. The membrane 1016N may be similarly straight. In some embodiments, the shape of the gaps 1022N-1, 1022N-2, 1022N-3, 1024N-1, 1024N-2 may be tapered or angled from an end of the gasket 1000N toward the ridge 1018N. The tapered gaps 1022N, 1024N may allow for more compression of the membrane section 1016N near the end of the gasket as compared to a middle portion, as described above. The membrane 1016N may extend from one end of the gasket 1000N towards the ridge 1018N. The ridge 1018N may therefore be uninterrupted or continuous, as shown. In some embodiments, the membrane 1016N may extend from one end of the gasket to the other end so that the ridge 1018N may therefore be interrupted or discontinuous.

As seen in FIG. 21C, the outer gaps 1022N-1, 1022N-2, 1022N-3 can form a flat surface 1021N at an end of the V-shaped collapsible joint 1020N. The flat surface 1021N can extend generally perpendicular to a longitudinal axis of the V-shaped gap 1017N. The flat surface 1021N can help the gasket 1000N to form a more effective seal when collapsed.

FIGS. 22-22G are various views of another embodiment of a gasket 1000P. FIG. 22 is a top view. FIG. 22A is a side cross-section view as taken along the line A-A as indicated in FIG. 22. FIG. 22B is cross-section view as taken along the line B-B as indicated in FIG. 22. FIG. 22C is a detail view of the area C as indicated in FIG. 22A. FIG. 22D is a detail view of the area D as indicated in FIG. 22. FIG. 22E is a detail view of the area E as indicated in FIG. 22B. FIG. 22F is a side view of the gasket 1000P. FIG. 22G is a perspective view of the gasket 1000P.

The gasket 1000P may have the same or similar features and/or functionalities as the other gaskets described herein except as otherwise noted. The gasket 1000P may therefore have a top end 1001P opposite a bottom end 1003P with openings at the ends 1001P, 1003P that open to a channel 1015P extending axially through the gasket 1000P. A middle portion 1002 may be located generally in between the top and bottom ends 1001P, 1003P. A rounded sidewall 1010P may extend circumferentially about the gasket 1000P and define the channel 1051P and openings at the top and bottom ends 1001P, 1003P.

The gasket 1000P may include one or more collapsible portions 1019. As shown, there may be four portions 1019 at the top end 1001P and four portions 1019 at the bottom end 1003P. There may be one, two, three, five or more portions 1019 at one or both of the top and bottom ends 1001P, 1003P. The portions 1019 may include a collapsible membrane 1016P. The portions 1019 may include one or more wedges 1030P. The portions 1019 may include both one or more of the collapsible membranes 1016P and one or more of the wedges 1030P. The membrane 1016P and wedge 1030P may have the same or similar features and/or functionalities as the other membranes and wedges, respectively, as described herein except as otherwise noted.

As shown in FIG. 22C, the wedge 1030P may be located on a radially inward surface or surfaces of the membrane 1016P. The wedge 1030P may protrude therefrom radially inward toward the channel 1015P. Alternatively or in addition, in some embodiments, the wedge 1030P may be located on a radially outward surface or surfaces of the membrane 1016P and protrude radially outward away from the gasket 1000P. The membrane 1016P may extend on one or, as shown, both circumferential sides of the wedge 1030P. The wedge 1030P may extend axially from the top end 1001P toward the middle portion 1002. The wedge 1030P may have a constant, decreasing or increasing circumferential width along the axial length of the wedge 1030P. The wedge 1030P may have a constant, decreasing or increasing radial thickness along the axial length of the wedge 1030P. As shown, the wedge 1030P may have a decreasing radial thickness along the axial length of the wedge 1030P in a direction from the end 1001P of the gasket toward the middle portion 1002. The wedge 1030P may therefore be angled as viewed from the side (e.g. as viewed in FIG. 22E), for example five or more, ten or more, fifteen or more degrees. Other angles may be implemented. The wedge 1030P may therefore protrude into the channel 1015 more at the end openings of the gasket 1000P, as compared to a portion of the wedge 1030P that is located axially closer to the middle portion 1002. This protrusion may be measured relative to an inner surface of the sidewall. The protrusion may be measured relative to the axis defined by the gasket 1000P. A portion of the wedge 1030P may therefore protrude farther from the membrane 1016P than another portion of the wedge 1030P. A portion of the wedge 1030P located axially closer to the ends 1001P, 1003P may therefore protrude farther from the membrane 1016P than another portion of the wedge 1030P located closer to the middle portion 1002 of the gasket 1000P. The wedge 1030P may therefore taper in radial thickness, which may be linearly tapered or taper in other manners. In some embodiments, the wedge 1030P may taper linearly at an angle. In some embodiments, this taper and/or angle of the wedge 1030P may be reversed. The radial thickness of the wedge 1030P may thus decrease or increase axially along the length of the wedge 1030P (e.g. toward or away from the middle portion or the ends). The angle of the wedge 1030P may be more than, less than, or equal to the angle of the sidewall 1010P, for example the hourglass shape of the sidewall 1010P. These angles may be measured relative to the axis shown in FIG. 22F. An example of an angled sidewall 1010P is shown in FIGS. 22B and 22F where the sidewall 1010P has an example angle of about five degrees to provide for a larger opening at the ends 1001P, 1003P. Thus the wedge 1030P may be angled based on the sidewall 1010P angle to ensure robust capture and sealing of the pipe ends when the gasket 1000P is installed.

The gasket 1000P may include one or more inner seals 1060P. The inner seal 1060P may include one or more annular seals, such as first, second and third inner seals 1061P, 1062P, 1063P. The seals 1061P, 1062P, 1063P may be annular inner seals extending along the inside of the gasket 1000P at or near the ends 1001P, 1003P of the gasket 1000P. There may be one, two, four or more seals 1061P, 1062P, 1063P at these locations. In some embodiments, one or more of the seals 1061P, 1062P, 1063P may be located along the outside of the gasket 1000P.

The wedge 1030P may interrupt the first and second seals 1061P, 1062P such that the first and second seals 1061P, 1062P are discontinuous. The third seal 1063P may be continuous. In some embodiments, all of the seals may be discontinuous. The wedge 1030P may extend axially from an end of the gasket 1000P in between adjacent portions of the first and second seals 1061P, 1062P. The wedge 1030P may extend axially continuously along this length. The wedge 1030P may have more than one portion. The wedge 1030P may be interrupted by a transverse portion of the membrane 1016P. The wedge 1030P may therefore include a first wedge portion located axially closer to the end 1001P and a second wedge portion located axially farther from the end 1001P. An embodiment of the axis is shown in FIG. 22F.

In some embodiments, the wedge 1030P may continue below (closer to the middle portion 1002) the third inner seal. This portion of the wedge 1030P may taper in radial thickness, as described. In some embodiments, the membrane 1016P may continue below (closer to the middle portion 1002) the third inner seal.

There may be a fourth and fifth inner seal 1064P, 1065P located axially closer to the middle portion 1002 relative to the first, second and third inner seals 1061P, 1062P, 1063P. The fourth and fifth inner seals 1064P, 1065P may be adjacent each other. The fourth and fifth inner seals 1064P, 1065P may be located axially in between the middle portion 1002 and the end 1001P.

The bottom half of the gasket 1000P may have the same or similar features as the top half of the gasket 100P. The collapsible portions 1019 on the bottom end 1003P may be rotated angularly about the axis relative to the portions 1019 at the top end 1001P. This angle may be forty-five degrees or other angles.

As shown in FIG. 22D, there may be one or more inner gaps 1024P located between the wedge 1030P and circumferentially adjacent portions of the sidewall 1010P. The inner gap 1024P may be defined on three sides by a portion of the sidewall 1010P, the membrane 1016P and the wedge 1030P. The inner gap 1024P may open to the channel 1015P. There may be two inner gaps 1024 with one on each circumferential side of the wedge 1030P. There may be an outer gap 1022P. The outer gap 1022P may be an inward protrusion or recess in the outer surface of the gasket sidewall 1010P. The membrane 1016P may protrude inward slightly to bias the collapsible portion 1019 inward such that the portion 1019 collapses inward when installed and compressed (e.g. by a clamp) about two pipe ends.

The membrane 1016P may have the wedge 1030P located on a radially inward surface of the membrane 1016P, and in some embodiments be biased inward as shown. In some embodiments the membrane 1016P may not be biased inward. The inner gap 1024P may collapse or partially collapse upon assembling and compressing the gasket 1000P about two pipe ends. The wedge 1030P may contact or at least move closer toward the adjacent sidewall 1010P portions upon assembling. The membrane 1016P may collapse or partially collapse, for example fold, to allow the wedge 1030P and the sidewall 1010P to move closer together.

In some embodiments, there may be portions of the sidewall 1010P separated by the membrane section 1016P but not having the wedge 1030P therebetween, such that the membrane section 1016P collapses or partially collapses to allow those portions of the sidewall 1010P to move closer together, or contact each other, after assembly and compression of the gasket 1000P. For example, there may be a membrane section 1016P1 located axially below (closer to the middle portion 1002 than) the membrane section 1016P located closer to the ends 1001P, 1003P, as described herein. The outer gap 1022P may collapse or partially collapse upon assembly as well. The membrane section 1016P1 does not contain a wedge thereon. In some embodiments, the membrane section 1016P1 may contain a wedge, as described herein for the membrane section 1016P. The lower membrane section 1016P1 may be separated from the upper membrane sections 1016P. The sidewall 1010P may separate the two membrane sections 1016P and 1016P1. In some embodiments, the membrane section 1016P may extend continuously downward such that the membrane sections 1016P and 1016P1 form a single continuous membrane section. The membrane section 1016P1 may extend downward and reduce in circumferential width in that direction. The membrane section 1016P1 may narrow to a point or vertex as shown.

The top end 1001P and bottom end 1003P may flare outward, for example in an hourglass shape. The width of the openings at the ends 1001P, 1003P may be greater than the width at the middle portion 1002. The middle portion 1002 may be flat or generally flat as shown in FIG. 22F. The width of the middle portion 1002 may therefore be constant or generally constant along an axial length thereof. The first, second, and third seals 1061P, 1062P, 1063P may be located along an outwardly angled portion of the sidewall 1010P, such as at the ends 1001P, 1003P. The fourth and fifth seals 1064P, 1065P may be located along the flat or constant width portion of the gasket 1000P. Other axial locations for the seals may be implemented.

As shown in FIG. 22E, the wedge 1030P may have a rounded inner surface that faces the channel 1015P, for example with the radius as shown. In some embodiments, the wedge 1030P may be flat on this inner surface. The wedge 1030P may have a rounded shape that matches that of the seals that extend adjacent to the wedge 1030P. In some embodiments, the portion of the wedge 1030P closest to the end 1001P may be flat and an axially adjacent portion of the wedge 1030P (in the direction toward the middle portion) may be rounded. The wedge 1030P may not extend axially across the third inner seal 1063P as described.

In some embodiments, the gasket 1000P may have membranes 1016P in other shapes and/or locations. The membranes 1016P may be rectangular, square, rounded, circular, or other shapes. The membranes 1016P may be located at the ends 1001P, 1003P, closer to the middle portion 1002, in other locations, or combinations thereof. In some embodiments, there may be voids in the sidewall 1010P of the gasket 1000P that provide a collapsing function. In some embodiments, the sidewall 1010P may be straight, for example not angled, with a diameter that is just slightly larger than the pipe. There may be two or more annular seals 1060, such as two or more sealing rings. The gasket 1000P may have provisions for the gasket 1000P facing inward to collapse. The gasket 1000P may have provisions for the gasket 1000P facing outward to collapse. The gasket 1000P may have provisions for the gasket 1000P facing inward and outward to collapse, as described. For example the gaps and/or wedges may be inwardly facing, outwardly facing, or both.

The above discussion is presented to enable a person skilled in the art to make and use one or more of the described embodiments. The general principles described herein may be applied to embodiments and applications other than those detailed above without departing from the spirit and scope of the disclosure. Indeed, the described embodiments are not intended to be limited to the particular embodiments shown or described above, but are to be accorded the widest scope consistent with the principles and features disclosed or suggested herein.

This disclosure extends beyond the specifically disclosed embodiments to other alternative embodiments and/or other uses of the embodiments, as well as to certain modifications, combinations, sub-combinations and/or equivalents thereof. This disclosure expressly contemplates that various features and aspects of the disclosed embodiments can be combined with, or substituted for, one another. For example, any of the first and second pipes 110, 120, the clamps 100, 200, the locking mechanisms 201, 301, 401, 601, 801, 901, 1101, 1201, 1301, and the gaskets 1000, 1000A, 1000B, 1000C, 1000D, may be used with each other in any suitable combination. As further example, any of the first and second pipes 110, 120, the clamps 100, 200, the locking mechanisms 201, 301, 401, 601, 801, 901, 1101, 1201, 1301, and the gaskets 1000, 1000A, 1000B, 1000C, 1000D, may be used with other pipes (or fluid conveying elements), clamps, locking mechanisms, and gaskets not explicitly described herein.

In one aspect, a no hub clamp comprises two elongated main bands configured to surround two adjacent pipe ends, the main bands connected by transverse ties, the main bands having a first end and a second end, wherein the first and second ends are brought together to surround the adjacent pipe ends, the first end having a tunnel configured to receive therein a tab from the second end, the tab connected to the second end, the tab having a ridge projecting therefrom, the tunnel having a series of grooves configured to receive the ridge to securely connect the two ends of the main bands, the tab having an angled projection on one end that biases the ridge through the groove when the clamp is in a locked state.

In another aspect, a no hub clamp comprises an elongated main band configured to surround two adjacent pipe ends, the main band having a first end and a second end, wherein the first and second ends are brought together to surround the adjacent pipe ends, the first end having a tunnel configured to receive therein a tab from the second end, the tab connected to the second end, the tab having a ridge projecting therefrom, the tunnel having a series of grooves configured to receive the ridge to securely connect the two ends of the main bands, the tab having an angled projection on one end that biases the ridge through the groove when the clamp is in a locked state, the ends of the main band having pins configured to be received by a tool for tightening the clamp.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

The processes described and/or shown herein are illustrative only. A person of skill in the art will understand that the steps, decisions, and processes described herein may be performed in an order other than that described herein. Thus, the particular descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A gasket comprising:
   a rounded sidewall defining a channel therethrough, the channel defining a central axis, the sidewall comprising a top end, a middle portion, and a bottom end opposite the top end;

a membrane section at the top end of the sidewall extending axially toward the middle portion and connecting two circumferentially separated portions of the sidewall adjacent to the membrane section, the membrane section having a smaller radial thickness than that of the two circumferentially separated portions of the sidewall adjacent to the membrane section; and a wedge located on a radially inward surface of the membrane section, the wedge protruding from the membrane section toward the channel and extending axially along the membrane section.

2. The gasket of claim 1, wherein a first portion of the wedge has a larger radial thickness than a second portion of the wedge.

3. The gasket of claim 1, wherein the wedge tapers in radial thickness along the axial length of the wedge.

4. The gasket of claim 1, wherein at least a portion of the wedge has a larger radial thickness than the membrane section.

5. The gasket of claim 1, wherein a circumferential width of the wedge is less than a circumferential width of the membrane section such that an inner gap is located adjacent two circumferential sides of the wedge.

6. The gasket of claim 1, wherein the top end defines a first inner width, the bottom end defines a second inner width, and the middle portion defines a third inner width, and wherein the third inner width is less than each of the first and second inner widths.

7. The gasket of claim 1, wherein the gasket comprises a plurality of the membrane sections and a plurality of the wedges, each membrane section of the plurality of membrane sections located at the top end of the sidewall, and each membrane section comprising a corresponding one of the plurality of wedges.

8. The gasket of claim 1, further comprising:
a second membrane section at the bottom end of the sidewall extending axially toward the middle portion and connecting two circumferentially separated portions of the sidewall adjacent to the second membrane section, the second membrane section having a smaller radial thickness than that of the two circumferentially separated portions of the sidewall adjacent to the second membrane section; and a second wedge located on a radially inward surface of the second membrane section, the second wedge protruding from the second membrane section toward the channel and extending axially along the second membrane section.

9. The gasket of claim 8, wherein the gasket comprises a plurality of the second membrane sections and a plurality of the second wedges, each second membrane section of the plurality of second membrane sections located at the bottom end of the sidewall, and each second membrane section comprising a corresponding one of the plurality of second wedges.

10. The gasket of claim 8, wherein a first portion of the second wedge has a larger radial thickness than a second portion of the second wedge.

11. The gasket of claim 1, wherein there are three of the membrane sections and three corresponding wedges, and further comprising:
three second membrane sections at the bottom end of the sidewall extending axially toward the middle portion and each connecting two circumferentially separated portions of the sidewall adjacent to each of the three second membrane sections, the second membrane sections each having a smaller radial thickness than that of the two circumferentially separated portions of the sidewall adjacent to the respective second membrane section; and three second wedges each located on a radially inward surface of a corresponding one of the three second membrane sections, the three second wedges protruding from the corresponding second membrane section toward the channel and extending axially along the corresponding second membrane section.

12. The gasket of claim 1, further comprising an annular seal extending circumferentially along an inner surface of the sidewall.

13. The gasket of claim 12, wherein the annular seal is located near the top end of the gasket.

14. The gasket of claim 12, wherein the annular seal is interrupted by the membrane section such that the annular seal extends along the two circumferentially separated portions of the sidewall adjacent to the first membrane section.

15. The gasket of claim 12, wherein the annular seal is located closer to the middle portion relative to the membrane section such that the annular seal is extending continuously circumferentially along the inner surface of the sidewall.

16. The gasket of claim 12, wherein the gasket comprises a plurality of the annular seals extending circumferentially along the inner surface of the sidewall, wherein at least one of the annular seals is interrupted by the membrane section and at least one of the annular seals is extending continuously circumferentially along the inner surface of the sidewall.

17. The gasket of claim 16, wherein there are three of the annular seals, wherein two of the annular seals are interrupted by the membrane section and one of the annular seals is extending continuously circumferentially along the inner surface of the sidewall.

18. The gasket of claim 16, wherein the plurality of the annular seals are located at the top end of the gasket and are spaced axially relative to each other.

19. The gasket of claim 16, wherein the plurality of annular seals are located at the top end of the gasket, and further comprising a second plurality of annular seals located at the bottom end of the gasket.

20. The gasket of claim 19, further comprising
a second membrane section at the bottom end of the sidewall extending axially toward the middle portion and connecting two circumferentially separated portions of the sidewall adjacent to the second membrane section, the second membrane section having a smaller radial thickness than that of the two circumferentially separated portions of the sidewall adjacent to the second membrane section; and a second wedge located on a radially inward surface of the second membrane section, the second wedge protruding from the second membrane section toward the channel and extending axially along the second membrane section, wherein at least one of the second plurality of annular seals is interrupted by the second membrane section and at least one of the second plurality of annular seals is extending continuously circumferentially along the inner surface of the sidewall.

* * * * *